(12) United States Patent
Song

(10) Patent No.: US 7,012,906 B1
(45) Date of Patent: *Mar. 14, 2006

(54) PILOT SIGNALS FOR SYNCHRONIZATION AND/OR CHANNEL ESTIMATION

(75) Inventor: Young-Joon Song, Kyongki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,446

(22) Filed: Mar. 14, 2000

Related U.S. Application Data

(63) Continuation-in-part of application No. 09/373,703, filed on Aug. 13, 1999, now Pat. No. 6,791,960, and a continuation-in-part of application No. 09/376,373, filed on Aug. 18, 1999, now Pat. No. 6,721,299.

(60) Provisional application No. 60/136,763, filed on May 28, 1999.

(30) Foreign Application Priority Data

| Mar. 15, 1999 | (KR) | 1999/8630 |
| Apr. 12, 1999 | (KR) | 1999/12856 |
| Apr. 12, 1999 | (KR) | 1999/12857 |
| Apr. 30, 1999 | (KR) | 1999/15722 |
| May 28, 1999 | (KR) | 1999/19505 |
| May 28, 1999 | (KR) | 1999/19506 |
| May 29, 1999 | (KR) | 1999/19610 |
| Jun. 19, 1999 | (KR) | 1999/23140 |
| Jun. 19, 1999 | (KR) | 1999/23141 |
| Jun. 22, 1999 | (KR) | 1999/23568 |
| Jun. 24, 1999 | (KR) | 1999/23937 |
| Jul. 2, 1999 | (KR) | 1999/26689 |
| Aug. 18, 1999 | (KR) | 1999/34212 |

(51) Int. Cl.
*H04B 7/216* (2006.01)
*H04J 3/06* (2006.01)

(52) U.S. Cl. .............. 370/335; 370/509; 375/149; 375/150

(58) Field of Classification Search ........ 370/335, 370/320, 342, 350, 500, 510, 512, 514, 509, 370/503; 375/354, 356, 357, 362, 368, 149, 375/150
See application file for complete search history.

(56) References Cited

U.S. PATENT DOCUMENTS 5,774,462 A * 6/1998 Ishikawa et al. ............ 370/350

(Continued)

FOREIGN PATENT DOCUMENTS

JP 10-505477 5/1998

(Continued)

OTHER PUBLICATIONS

TS S1.11 V1.1.0, Mar. 1999, 3GPP "Physical Channels and Mapping of Transport Channels onto Physical Channels", pp. 1-33.

(Continued)

*Primary Examiner*—Andy Lee
(74) *Attorney, Agent, or Firm*—Fleshner & Kim, LLP

(57) ABSTRACT

The frame words of the preferred embodiment are especially suitable for frame synchronization and/or channel estimation. By adding the autocorrelation and cross-correlation functions of frame words, double maximum values equal in magnitude and opposite polarity at zero and middle shifts are obtained. This property can be used to slot- by-slot, double-check frame synchronization timing, single frame synchronization and/or channel estimation and allows reduction of the synchronization search time. Further, the present invention allows a simpler construction of a correlator circuit for a receiver.

8 Claims, 53 Drawing Sheets

| Frame Synchronization Words | | |
|---|---|---|
| L=15, Slot No. | 1 2 3 4 ................... 15 | |
| | $C_1$ = (1 0 0 0 1 1 1 1 0 1 0 1 1 0 0) | |
| | $C_2$ = (1 0 1 0 0 1 1 0 1 1 1 0 0 0 0) | |
| | $C_3$ = (1 1 0 0 0 1 0 0 1 1 0 1 0 1 1) | |
| | $C_4$ = (0 0 1 0 1 0 0 0 0 1 1 1 0 1 1) | |
| | $C_5$ = (1 1 1 0 1 0 1 1 0 0 1 0 0 0 1) | |
| | $C_6$ = (1 1 0 1 1 1 0 0 0 0 1 0 1 0 0) | |
| | $C_7$ = (1 0 0 1 1 0 1 0 1 1 1 1 0 0 0) | |
| | $C_8$ = (0 0 0 0 1 1 1 0 1 1 0 0 1 0 1) | |

U.S. PATENT DOCUMENTS

| | | | |
|---|---|---|---|
| 5,812,593 A * | 9/1998 | Kaku | 375/150 |
| 5,889,768 A * | 3/1999 | Storm et al. | 370/320 |
| 5,901,180 A * | 5/1999 | Aslanis et al. | 370/480 |
| 5,978,416 A * | 11/1999 | Watanabe et al. | 375/350 |
| 5,982,763 A * | 11/1999 | Sato | 370/342 |
| 6,128,486 A | 10/2000 | Keskitalo et al. | 455/422 |
| 6,356,605 B1 * | 3/2002 | Hosur et al. | 375/347 |
| 6,480,526 B1 * | 11/2002 | Shoki et al. | 375/148 |

FOREIGN PATENT DOCUMENTS

| | | |
|---|---|---|
| JP | 10327126 A | 12/1998 |
| WO | WO 95/34154 A2 | 5/1995 |
| WO | WO 97/02666 | 1/1997 |
| WO | WO 00/00912 A1 | 6/1998 |
| WO | WO 00/05902 A2 | 7/1999 |

OTHER PUBLICATIONS

TS 25.211 V2.0.1, Jun. 1999, 3GPP "Physical Channels and Mapping of Transport Channels onto Physical Channels", pp. 1-41.

Kohno, Ryuji, Hideki Imai, Mitsutoshi Hatori, and Subbarayan Pasupathy, "Combination of an Adaptive Array Antenna and a Canceller or Interference for Direct-Sequence Spread-Spectrum Multiple-Access System," IEEE Journal on Selected Areas in Communications vol. 8, No. 4, May 1990, pp. 675-682.

Kammeyer, K.D., "Nachrictenübertragung," B.G. Teubner, Stuttgart, 1996, ISBN 3-519-16142-7, pp. 621-632.

* cited by examiner

FIG. 2
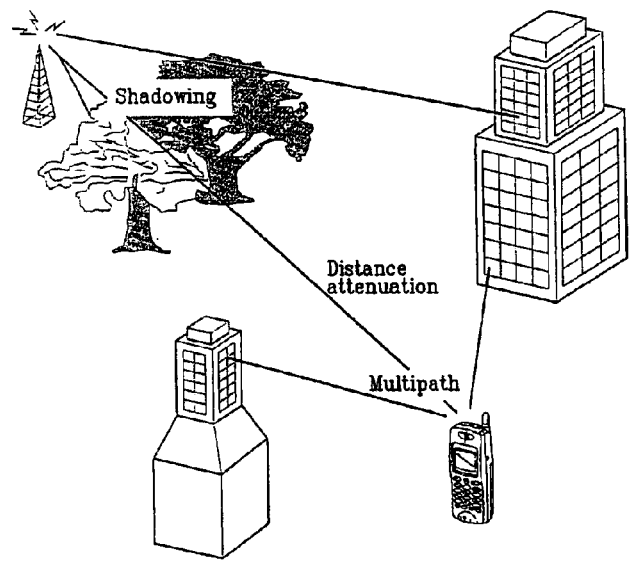
FIG. 3
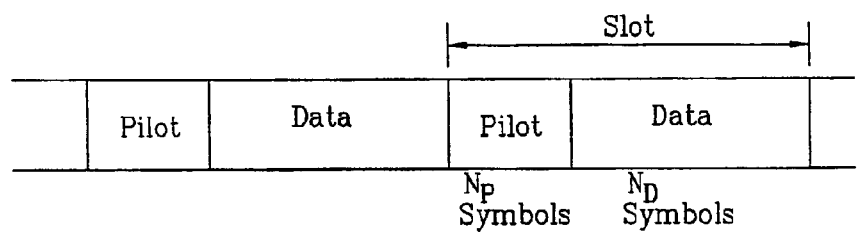
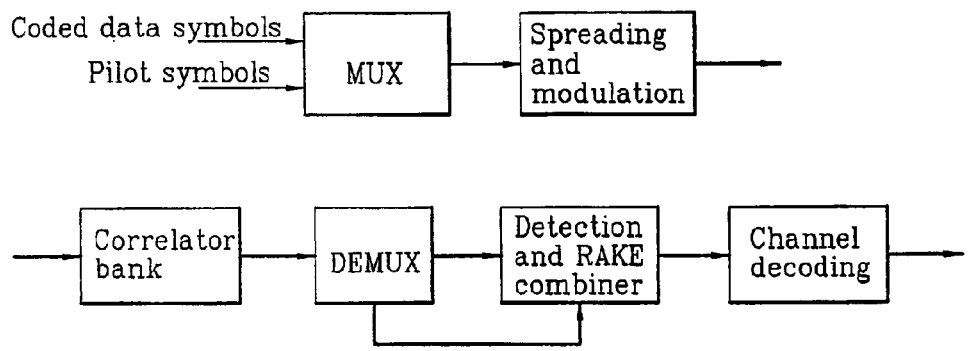

| Channel Bit Rate(kbps) | Channel Symbol Rate(ksps) | SF | Bits/Frame | Bits/Slot | $N_{pilot}$ | $N_{TPC}$ | $N_{TFCI}$ | $N_{FBI}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | [6] | [2] | [0] | [2] |
| 16 | 16 | 256 | 160 | 10 | [5] | [1] | [2] | [2] |

| | \multicolumn{6}{c|}{$N_{pilot}=6$} | \multicolumn{8}{c|}{$N_{pilot}=8$} |
|---|---|---|---|---|---|---|---|---|---|---|---|---|---|---|
| Bit # | 0 | 1 | 2 | 3 | 4 | 5 | 0 | 1 | 2 | 3 | 4 | 5 | 6 | 7 |
| slot #1 | 1 | 1 | 1 | 1 | 1 | 1 | 1 | 1 | 1 | 1 | 1 | 1 | 1 | 1 |
| 2 | 1 | 1 | 1 | 1 | 0 | 1 | 1 | 1 | 1 | 1 | 1 | 0 | 1 | 1 |
| 3 | 1 | 0 | 1 | 1 | 0 | 1 | 1 | 0 | 1 | 1 | 1 | 0 | 1 | 1 |
| 4 | 1 | 1 | 0 | 1 | 0 | 1 | 1 | 1 | 1 | 0 | 1 | 0 | 1 | 1 |
| 5 | 1 | 1 | 0 | 1 | 1 | 1 | 1 | 1 | 1 | 0 | 1 | 1 | 1 | 1 |
| 6 | 1 | 1 | 0 | 1 | 1 | 1 | 1 | 1 | 1 | 0 | 1 | 1 | 1 | 1 |
| 7 | 1 | 0 | 1 | 1 | 0 | 0 | 1 | 0 | 1 | 1 | 1 | 0 | 1 | 0 |
| 8 | 1 | 1 | 0 | 1 | 0 | 1 | 1 | 1 | 1 | 0 | 1 | 0 | 1 | 1 |
| 9 | 1 | 1 | 1 | 1 | 0 | 0 | 1 | 1 | 1 | 1 | 1 | 0 | 1 | 0 |
| 10 | 1 | 0 | 1 | 1 | 0 | 1 | 1 | 0 | 1 | 1 | 1 | 0 | 1 | 1 |
| 11 | 1 | 1 | 1 | 1 | 1 | 0 | 1 | 1 | 1 | 1 | 1 | 1 | 1 | 0 |
| 12 | 1 | 0 | 1 | 1 | 0 | 1 | 1 | 0 | 1 | 1 | 1 | 0 | 1 | 1 |
| 13 | 1 | 0 | 0 | 1 | 0 | 1 | 1 | 0 | 1 | 0 | 1 | 0 | 1 | 1 |
| 14 | 1 | 1 | 0 | 1 | 0 | 0 | 1 | 1 | 1 | 0 | 1 | 0 | 1 | 0 |
| 15 | 1 | 0 | 1 | 1 | 0 | 0 | 1 | 0 | 1 | 1 | 1 | 0 | 1 | 0 |
| 16 | 1 | 0 | 0 | 1 | 0 | 0 | 1 | 0 | 1 | 0 | 1 | 0 | 1 | 0 |

| 25 | | 26 | | 27 |
|---|---|---|---|---|
| DPCCH | DPDCH | DPCCH | DPDCH | DPCCH |
| TFCI $N_{TFCI}$ bits | Data 1 $N_{data1}$ bits | TPC $N_{TPC}$ bits | Data 2 $N_{data2}$ bits | Pilot $N_{Pilot}$ bits |

$T_{slot}$ 0.625ms, $10 \cdot 2^k$ bits (k=0..7)

| Slot #1 | Slot #2 | | Slot #i | | Slot #16 |

$T_f$ = 10ms

| Frame #1 | Frame #2 | | Frame #i | | Frame #72 |

$T_{super}$ = 720ms

| Symbol rate | 8ksps | | 16,32,64,128ksps | | | | 256,512,1024ksps | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 11 | 11 | 11 | 11 | 11 | 11 | 11 | 11 | 11 | 11 | 11 | 11 | 11 | 10 |
| 2 | 11 | 11 | 11 | 11 | 11 | 01 | 11 | 10 | 11 | 10 | 11 | 10 | 11 | 01 |
| 3 | 11 | 10 | 11 | 01 | 11 | 01 | 11 | 10 | 11 | 01 | 11 | 11 | 11 | 01 |
| 4 | 11 | 01 | 11 | 10 | 11 | 01 | 11 | 11 | 11 | 01 | 11 | 00 | 11 | 10 |
| 5 | 11 | 10 | 11 | 10 | 11 | 11 | 11 | 11 | 11 | 00 | 11 | 01 | 11 | 10 |
| 6 | 11 | 10 | 11 | 10 | 11 | 11 | 11 | 11 | 11 | 11 | 11 | 01 | 11 | 10 |
| 7 | 11 | 01 | 11 | 01 | 11 | 00 | 11 | 10 | 11 | 11 | 11 | 01 | 11 | 10 |
| 8 | 11 | 00 | 11 | 10 | 11 | 01 | 11 | 01 | 11 | 00 | 11 | 10 | 11 | 00 |
| 9 | 11 | 00 | 11 | 11 | 11 | 00 | 11 | 11 | 11 | 10 | 11 | 00 | 11 | 01 |
| 10 | 11 | 10 | 11 | 01 | 11 | 01 | 11 | 01 | 11 | 11 | 11 | 11 | 11 | 00 |
| 11 | 11 | 10 | 11 | 11 | 11 | 10 | 11 | 10 | 11 | 10 | 11 | 11 | 11 | 10 |
| 12 | 11 | 11 | 11 | 01 | 11 | 01 | 11 | 01 | 11 | 10 | 11 | 10 | 11 | 00 |
| 13 | 11 | 10 | 11 | 00 | 11 | 01 | 11 | 10 | 11 | 01 | 11 | 11 | 11 | 10 |
| 14 | 11 | 11 | 11 | 10 | 11 | 00 | 11 | 00 | 11 | 10 | 11 | 10 | 11 | 00 |
| 15 | 11 | 00 | 11 | 01 | 11 | 00 | 11 | 01 | 11 | 10 | 11 | 00 | 11 | 00 |
| 16 | 11 | 00 | 11 | 00 | 11 | 00 | 11 | 10 | 11 | 00 | 11 | 00 | 11 | 00 |

FIG. 12A

| Frame Synchronization Words |
|---|
| Slot Number    1 2 3 4 5 . . . . . . . . . . . . . . . L |
| $C_1$ = (1 1 0 1 1 1 1 1 0 0 1 0 0 0 0 0) |
| $C_2$ = (1 0 0 0 1 0 1 0 0 1 1 1 0 1 0 1) |
| $C_3$ = (1 1 0 1 1 1 0 0 0 0 1 0 0 0 1 1) |
| $C_4$ = (0 1 1 1 0 1 1 0 1 0 0 0 1 0 0 1) |
| $C_5$ = (1 0 1 1 0 0 0 0 0 1 0 0 1 1 1 1) |
| $C_6$ = (1 1 1 0 0 1 0 1 0 0 0 1 1 0 1 0) |
| $C_7$ = (0 1 0 0 0 0 1 1 1 0 1 1 1 1 0 0) |
| $C_8$ = (1 1 1 0 1 0 0 1 0 0 0 1 0 1 1 0) |

FIG. 12B

| $R(\tau)$  $\tau$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $R_E(\tau)$ | 16 | 4 | 0 | 4 | 0 | -4 | 0 | -4 | -16 | -4 | 0 | -4 | 0 | 4 | 0 | 4 |
| $R_F(\tau)$ | 16 | -4 | 0 | -4 | 0 | 4 | 0 | 4 | -16 | 4 | 0 | 4 | 0 | -4 | 0 | -4 |
| $R_G(\tau)$ | 16 | 4 | 0 | -4 | 0 | 4 | 0 | -4 | -16 | -4 | 0 | 4 | 0 | -4 | 0 | 4 |
| $R_H(\tau)$ | 16 | -4 | 0 | 4 | 0 | -4 | 0 | 4 | -16 | 4 | 0 | -4 | 0 | 4 | 0 | -4 |

$R_1$ (columns 1-8), $R_2$ (columns 9-16)

FIG. 14A

|  | $N_{pilot} = 5$ | | | | | $N_{pilot} = 6$ | | | | | |
|---|---|---|---|---|---|---|---|---|---|---|---|
| Bit # | 0 | 1 | 2 | 3 | 4 | 0 | 1 | 2 | 3 | 4 | 5 |
| Slot #1 | 1 | 1 | 1 | 1 | 0 | 1 | 1 | 1 | 1 | 1 | 0 |
| 2 | 1 | 0 | 1 | 1 | 1 | 1 | 1 | 0 | 1 | 1 | 1 |
| 3 | 0 | 0 | 1 | 0 | 1 | 1 | 0 | 0 | 1 | 0 | 1 |
| 4 | 1 | 0 | 1 | 1 | 1 | 1 | 1 | 0 | 1 | 1 | 1 |
| 5 | 1 | 1 | 1 | 1 | 0 | 1 | 1 | 1 | 1 | 1 | 0 |
| 6 | 1 | 0 | 1 | 1 | 1 | 1 | 1 | 0 | 1 | 1 | 1 |
| 7 | 1 | 1 | 1 | 0 | 1 | 1 | 1 | 1 | 1 | 0 | 1 |
| 8 | 1 | 0 | 1 | 0 | 0 | 1 | 1 | 0 | 1 | 0 | 0 |
| 9 | 0 | 0 | 1 | 0 | 1 | 1 | 0 | 0 | 1 | 0 | 1 |
| 10 | 0 | 1 | 1 | 0 | 0 | 1 | 0 | 1 | 1 | 0 | 0 |
| 11 | 1 | 1 | 1 | 1 | 0 | 1 | 1 | 1 | 1 | 1 | 0 |
| 12 | 0 | 1 | 1 | 0 | 0 | 1 | 0 | 1 | 1 | 0 | 0 |
| 13 | 0 | 0 | 1 | 0 | 1 | 1 | 0 | 0 | 1 | 0 | 1 |
| 14 | 0 | 1 | 1 | 0 | 0 | 1 | 0 | 1 | 1 | 0 | 0 |
| 15 | 0 | 0 | 1 | 1 | 0 | 1 | 0 | 0 | 1 | 1 | 0 |
| 16 | 0 | 1 | 1 | 1 | 1 | 1 | 0 | 1 | 1 | 1 | 1 |

FIG. 14B

|  | $N_{pilot} = 7$ | | | | | | | $N_{pilot} = 8$ | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #1 | 1 | 1 | 1 | 1 | 1 | 0 | 1 | 1 | 1 | 1 | 1 | 1 | 1 | 1 | 0 |
| 2 | 1 | 1 | 0 | 1 | 1 | 1 | 1 | 1 | 1 | 1 | 0 | 1 | 1 | 1 | 1 |
| 3 | 1 | 0 | 0 | 1 | 0 | 1 | 1 | 1 | 0 | 1 | 0 | 1 | 0 | 1 | 1 |
| 4 | 1 | 1 | 0 | 1 | 1 | 1 | 1 | 1 | 1 | 1 | 0 | 1 | 1 | 1 | 1 |
| 5 | 1 | 1 | 1 | 1 | 1 | 0 | 1 | 1 | 1 | 1 | 1 | 1 | 1 | 1 | 0 |
| 6 | 1 | 1 | 0 | 1 | 1 | 1 | 1 | 1 | 1 | 1 | 0 | 1 | 1 | 1 | 1 |
| 7 | 1 | 1 | 1 | 1 | 0 | 1 | 1 | 1 | 1 | 1 | 1 | 0 | 1 | 1 |
| 8 | 1 | 1 | 0 | 1 | 0 | 0 | 1 | 1 | 1 | 1 | 0 | 1 | 0 | 1 | 0 |
| 9 | 1 | 0 | 0 | 1 | 0 | 1 | 1 | 1 | 0 | 1 | 0 | 1 | 0 | 1 | 1 |
| 10 | 1 | 0 | 1 | 1 | 0 | 0 | 1 | 1 | 0 | 1 | 1 | 1 | 0 | 1 | 0 |
| 11 | 1 | 1 | 1 | 1 | 1 | 0 | 1 | 1 | 1 | 1 | 1 | 1 | 1 | 1 | 0 |
| 12 | 1 | 0 | 1 | 1 | 0 | 0 | 1 | 1 | 0 | 1 | 1 | 1 | 0 | 1 | 0 |
| 13 | 1 | 0 | 0 | 1 | 0 | 1 | 1 | 1 | 0 | 1 | 0 | 1 | 0 | 1 | 1 |
| 14 | 1 | 0 | 1 | 1 | 0 | 0 | 1 | 1 | 0 | 1 | 1 | 1 | 0 | 1 | 0 |
| 15 | 1 | 0 | 0 | 1 | 1 | 0 | 1 | 1 | 0 | 1 | 0 | 1 | 1 | 1 | 0 |
| 16 | 1 | 0 | 1 | 1 | 1 | 1 | 1 | 1 | 0 | 1 | 1 | 1 | 1 | 1 | 1 |

FIG. 14C

| $N_{pilot}$ | Pilot bit position # | Corresponding word of length 16 |
|---|---|---|
| 5 | 0 | $C_1$ |
|   | 1 | $C_2$ |
|   | 3 | $C_3$ |
|   | 4 | $C_4$ |
| 6 | 1 | $C_1$ |
|   | 2 | $C_2$ |
|   | 4 | $C_3$ |
|   | 5 | $C_4$ |
| 7 | 1 | $C_1$ |
|   | 2 | $C_2$ |
|   | 4 | $C_3$ |
|   | 5 | $C_4$ |
| 8 | 1 | $C_1$ |
|   | 3 | $C_2$ |
|   | 5 | $C_3$ |
|   | 7 | $C_4$ |

FIG. 14E

|  | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT | 16 | 4 | 0 | 4 | 0 | −4 | 0 | −4 | −16 | −4 | 0 | −4 | 0 | 4 | 0 | 4 |
| $A_2$ POINT | 16 | −4 | 0 | −4 | 0 | 4 | 0 | 4 | −16 | 4 | 0 | 4 | 0 | −4 | 0 | −4 |
| $A_3$ POINT | 16 | 4 | 0 | 4 | 0 | −4 | 0 | −4 | −16 | −4 | 0 | −4 | 0 | 4 | 0 | 4 |
| $A_4$ POINT | 16 | −4 | 0 | −4 | 0 | 4 | 0 | 4 | −16 | 4 | 0 | 4 | 0 | −4 | 0 | −4 |
| B POINT | 64 | 0 | 0 | 0 | 0 | 0 | 0 | 0 | −64 | 0 | 0 | 0 | 0 | 0 | 0 | 0 |

FIG. 14F

|  | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT +$A_2$ POINT | 32 | 0 | 0 | 0 | 0 | 0 | 0 | 0 | −32 | 0 | 0 | 0 | 0 | 0 | 0 | 0 |
| $A_3$ POINT +$A_4$ POINT | 32 | 0 | 0 | 0 | 0 | 0 | 0 | 0 | −32 | 0 | 0 | 0 | 0 | 0 | 0 | 0 |
| $A_1$ POINT +$A_4$ POINT | 32 | 0 | 0 | 0 | 0 | 0 | 0 | 0 | −32 | 0 | 0 | 0 | 0 | 0 | 0 | 0 |
| $A_2$ POINT +$A_3$ POINT | 32 | 0 | 0 | 0 | 0 | 0 | 0 | 0 | −32 | 0 | 0 | 0 | 0 | 0 | 0 | 0 |

| | $R_x(0)$ | $R_x(1)$ | $R_x(2)$ | $R_x(3)$ | $R_x(4)$ | $R_x(5)$ | $R_x(6)$ | $R_x(7)$ | $R_x(8)$ | $R_x(9)$ | $R_x(10)$ | $R_x(11)$ | $R_x(12)$ | $R_x(13)$ | $R_x(14)$ | $R_x(15)$ |
|---|---|---|---|---|---|---|---|---|---|---|---|---|---|---|---|---|
| $A_1$ POINT | 16 | -4 | -4 | 8 | 0 | -4 | 0 | 0 | -4 | 0 | 0 | -4 | 0 | 8 | -4 | -4 |
| $A_2$ POINT | 16 | 0 | 0 | -4 | -4 | -4 | 0 | 0 | 12 | 0 | 0 | -4 | -4 | -4 | 0 | 0 |
| $A_3$ POINT | 16 | 4 | 0 | 0 | 4 | 8 | 8 | 0 | 0 | 0 | 8 | 8 | 4 | 0 | 0 | 4 |
| $A_4$ POINT | 16 | 0 | 4 | -4 | 0 | 0 | -4 | 4 | 0 | 4 | -4 | 0 | 0 | -4 | 4 | 0 |
| B POINT | 64 | 0 | 0 | 0 | 0 | 0 | 4 | 4 | 8 | 4 | 4 | 0 | 0 | 0 | 0 | 0 |

FIG. 15A

| | $N_{pilot}=4$ | | $N_{pilot}=8$ | | | | $N_{pilot}=16$ | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 11 | 11 | 11 | 11 | 11 | 10 | 11 | 11 | 11 | 10 | 11 | 11 | 11 | 01 |
| 2 | 11 | 10 | 11 | 10 | 11 | 11 | 11 | 10 | 11 | 11 | 11 | 01 | 11 | 11 |
| 3 | 11 | 00 | 11 | 00 | 11 | 01 | 11 | 00 | 11 | 01 | 11 | 11 | 11 | 01 |
| 4 | 11 | 10 | 11 | 10 | 11 | 11 | 11 | 10 | 11 | 11 | 11 | 10 | 11 | 00 |
| 5 | 11 | 11 | 11 | 11 | 11 | 10 | 11 | 11 | 11 | 10 | 11 | 00 | 11 | 01 |
| 6 | 11 | 10 | 11 | 10 | 11 | 11 | 11 | 10 | 11 | 11 | 11 | 01 | 11 | 00 |
| 7 | 11 | 11 | 11 | 11 | 11 | 01 | 11 | 11 | 11 | 01 | 11 | 00 | 11 | 10 |
| 8 | 11 | 10 | 11 | 10 | 11 | 00 | 11 | 10 | 11 | 00 | 11 | 01 | 11 | 11 |
| 9 | 11 | 00 | 11 | 00 | 11 | 01 | 11 | 00 | 11 | 01 | 11 | 00 | 11 | 10 |
| 10 | 11 | 01 | 11 | 01 | 11 | 00 | 11 | 01 | 11 | 00 | 11 | 10 | 11 | 00 |
| 11 | 11 | 11 | 11 | 11 | 11 | 10 | 11 | 11 | 11 | 10 | 11 | 00 | 11 | 10 |
| 12 | 11 | 01 | 11 | 01 | 11 | 00 | 11 | 01 | 11 | 00 | 11 | 01 | 11 | 11 |
| 13 | 11 | 00 | 11 | 00 | 11 | 01 | 11 | 00 | 11 | 01 | 11 | 11 | 11 | 10 |
| 14 | 11 | 01 | 11 | 01 | 11 | 00 | 11 | 01 | 11 | 00 | 11 | 10 | 11 | 11 |
| 15 | 11 | 00 | 11 | 00 | 11 | 10 | 11 | 00 | 11 | 10 | 11 | 11 | 11 | 01 |
| 16 | 11 | 01 | 11 | 01 | 11 | 11 | 11 | 01 | 11 | 11 | 11 | 10 | 11 | 00 |

FIG. 15B

| Symbol rate | Symbol # | Channel | Corresponding word of length L=16 |
|---|---|---|---|
| $N_{pilot}=4$ | 1 | I-CH | $C_1$ |
| | | Q-CH | $C_2$ |
| $N_{pilot}=8$ | 1 | I-CH | $C_1$ |
| | | Q-CH | $C_2$ |
| | 3 | I-CH | $C_3$ |
| | | Q-CH | $C_4$ |
| $N_{pilot}=16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

FIG. 16A

| Symbol # | 0 | 1 | 2 | 3 |
|---|---|---|---|---|
| Slot #1 | 11 | 11 | 11 | 10 |
| 2 | 11 | 10 | 11 | 11 |
| 3 | 11 | 00 | 11 | 01 |
| 4 | 11 | 10 | 11 | 11 |
| 5 | 11 | 11 | 11 | 10 |
| 6 | 11 | 10 | 11 | 11 |
| 7 | 11 | 11 | 11 | 01 |
| 8 | 11 | 10 | 11 | 00 |
| 9 | 11 | 00 | 11 | 01 |
| 10 | 11 | 01 | 11 | 00 |
| 11 | 11 | 11 | 11 | 10 |
| 12 | 11 | 01 | 11 | 00 |
| 13 | 11 | 00 | 11 | 01 |
| 14 | 11 | 01 | 11 | 00 |
| 15 | 11 | 00 | 11 | 10 |
| 16 | 11 | 01 | 11 | 11 |

FIG. 16B

| Symbol # | Channel | Corresponding word of length 16 |
|---|---|---|
| 1 | I-CH | $C_1$ |
| 1 | Q-CH | $C_2$ |
| 3 | I-CH | $C_3$ |
| 3 | Q-CH | $C_4$ |

FIG. 16C

| Symbol rate | $N_{pilot}=8$ | | | | $N_{pilot}=16$ | | | | | | | |
|---|---|---|---|---|---|---|---|---|---|---|---|---|
| Symbol # | 0 | 1 | 2 | 3 | 0 | 1 | 2 | 3 | 4 | 5 | 6 | 7 |
| Slot #1 | 11 | 11 | 11 | 10 | 11 | 11 | 11 | 10 | 11 | 11 | 11 | 01 |
| 2 | 11 | 10 | 11 | 11 | 11 | 10 | 11 | 11 | 11 | 01 | 11 | 11 |
| 3 | 11 | 00 | 11 | 01 | 11 | 00 | 11 | 01 | 11 | 11 | 11 | 01 |
| 4 | 11 | 10 | 11 | 11 | 11 | 10 | 11 | 11 | 11 | 10 | 11 | 00 |
| 5 | 11 | 11 | 11 | 10 | 11 | 11 | 11 | 10 | 11 | 00 | 11 | 01 |
| 6 | 11 | 10 | 11 | 11 | 11 | 10 | 11 | 11 | 11 | 01 | 11 | 00 |
| 7 | 11 | 11 | 11 | 01 | 11 | 11 | 11 | 01 | 11 | 00 | 11 | 10 |
| 8 | 11 | 10 | 11 | 00 | 11 | 10 | 11 | 00 | 11 | 01 | 11 | 11 |
| 9 | 11 | 00 | 11 | 01 | 11 | 00 | 11 | 01 | 11 | 00 | 11 | 10 |
| 10 | 11 | 01 | 11 | 00 | 11 | 01 | 11 | 00 | 11 | 10 | 11 | 00 |
| 11 | 11 | 11 | 11 | 10 | 11 | 11 | 11 | 10 | 11 | 00 | 11 | 10 |
| 12 | 11 | 01 | 11 | 00 | 11 | 01 | 11 | 00 | 11 | 01 | 11 | 11 |
| 13 | 11 | 00 | 11 | 01 | 11 | 00 | 11 | 01 | 11 | 11 | 11 | 10 |
| 14 | 11 | 01 | 11 | 00 | 11 | 01 | 11 | 00 | 11 | 10 | 11 | 11 |
| 15 | 11 | 00 | 11 | 10 | 11 | 00 | 11 | 10 | 11 | 11 | 11 | 01 |
| 16 | 11 | 01 | 11 | 11 | 11 | 01 | 11 | 11 | 11 | 10 | 11 | 00 |

FIG. 16D

| Symbol rate | Symbol # | Channel | Corresponding word of length L=16 |
|---|---|---|---|
| $N_{pilot}=8$ | 1 | I-CH | $C_1$ |
| | | Q-CH | $C_2$ |
| | 3 | I-CH | $C_3$ |
| | | Q-CH | $C_4$ |
| $N_{pilot}=16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

| Parameters | Downlink |
|---|---|
| Slot per frame | 16 |
| Number of bits in the DPCCH (Pilot/TPC/TFCI) | 4/2/0 |
| Number of bits in the DPDCH per each slot | 4 |
| Spreading Factor (DPDCH) | 512 |
| Spreading factor (DPCCH) | 512 |
| Modulation | QPSK |
| 3dB bandwidth | 4.096MHz |
| Shaping filter | Root raised cosine (roll off 0.22) |
| Power amplifier | Ideal |
| Propagation channel | AWGN |

FIG. 19A

| | Npilot = 4 | | Npilot = 8 | | | | Npilot = 16 | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 01 | 10 | 11 | 00 | 00 | 10 | 11 | 00 | 00 | 10 | 11 | 11 | 00 | 10 |
| 2 | 00 | 10 | 11 | 01 | 00 | 11 | 11 | 01 | 00 | 11 | 11 | 01 | 00 | 00 |
| 3 | 10 | 10 | 11 | 11 | 00 | 01 | 11 | 11 | 00 | 01 | 11 | 11 | 00 | 10 |
| 4 | 00 | 10 | 11 | 01 | 00 | 11 | 11 | 01 | 00 | 11 | 11 | 10 | 00 | 11 |
| 5 | 01 | 10 | 11 | 00 | 00 | 10 | 11 | 00 | 00 | 10 | 11 | 11 | 00 | 01 |
| 6 | 00 | 10 | 11 | 01 | 00 | 11 | 11 | 01 | 00 | 11 | 11 | 10 | 00 | 00 |
| 7 | 01 | 10 | 11 | 11 | 00 | 10 | 11 | 11 | 00 | 10 | 11 | 00 | 00 | 01 |
| 8 | 00 | 10 | 11 | 10 | 00 | 11 | 11 | 10 | 00 | 11 | 11 | 01 | 00 | 00 |
| 9 | 10 | 10 | 11 | 11 | 00 | 01 | 11 | 11 | 00 | 01 | 11 | 00 | 00 | 01 |
| 10 | 11 | 10 | 11 | 10 | 00 | 00 | 11 | 10 | 00 | 00 | 11 | 10 | 00 | 11 |
| 11 | 01 | 10 | 11 | 00 | 00 | 10 | 11 | 00 | 00 | 10 | 11 | 00 | 00 | 01 |
| 12 | 11 | 10 | 11 | 10 | 00 | 00 | 11 | 10 | 00 | 00 | 11 | 01 | 00 | 00 |
| 13 | 10 | 10 | 11 | 11 | 00 | 01 | 11 | 11 | 00 | 01 | 11 | 00 | 00 | 10 |
| 14 | 11 | 10 | 11 | 10 | 00 | 00 | 11 | 10 | 00 | 00 | 11 | 01 | 00 | 11 |
| 15 | 10 | 10 | 11 | 00 | 00 | 01 | 11 | 00 | 00 | 01 | 11 | 11 | 00 | 10 |
| 16 | 11 | 10 | 11 | 01 | 00 | 00 | 11 | 01 | 00 | 00 | 11 | 10 | 00 | 11 |

FIG. 19B

| Symbol rate | Symbol # | Channel | Corresponding word of length 16 |
|---|---|---|---|
| Npilot = 4 | 0 | I – CH | $-C_1$ |
| | | Q – CH | $C_2$ |
| Npilot = 8 | 1 | I – CH | $-C_3$ |
| | | Q – CH | $C_4$ |
| | 3 | I – CH | $C_1$ |
| | | Q – CH | $-C_2$ |
| Npilot = 16 | 1 | I – CH | $-C_3$ |
| | | Q – CH | $C_4$ |
| | 3 | I – CH | $C_1$ |
| | | Q – CH | $-C_2$ |
| | 5 | I – CH | $-C_7$ |
| | | Q – CH | $C_8$ |
| | 7 | I – CH | $C_5$ |
| | | Q – CH | $-C_6$ |

FIG. 19C

| Symbol # | 0 | 1 | 2 | 3 |
|---|---|---|---|---|
| Slot #1 | 11 | 11 | 00 | 01 |
| 2 | 11 | 10 | 00 | 00 |
| 3 | 11 | 00 | 00 | 10 |
| 4 | 11 | 10 | 00 | 00 |
| 5 | 11 | 11 | 00 | 01 |
| 6 | 11 | 10 | 00 | 00 |
| 7 | 11 | 11 | 00 | 10 |
| 8 | 11 | 10 | 00 | 11 |
| 9 | 11 | 00 | 00 | 10 |
| 10 | 11 | 01 | 00 | 11 |
| 11 | 11 | 11 | 00 | 01 |
| 12 | 11 | 01 | 00 | 11 |
| 13 | 11 | 00 | 00 | 10 |
| 14 | 11 | 01 | 00 | 11 |
| 15 | 11 | 00 | 00 | 01 |
| 16 | 11 | 01 | 00 | 00 |

FIG. 19D

| Symbol rate | Channel | Corresponding word of length 16 |
|---|---|---|
| 1 | I – CH | $C_1$ |
| | Q – CH | $C_2$ |
| 3 | I – CH | $-C_3$ |
| | Q – CH | $-C_4$ |

FIG. 19E

| Symbol # | $N_{pilot} = 8$ | | | | $N_{pilot} = 16$ | | | | | | | |
|---|---|---|---|---|---|---|---|---|---|---|---|---|
| | 0 | 1 | 2 | 3 | 0 | 1 | 2 | 3 | 4 | 5 | 6 | 7 |
| Slot #1 | 11 | 00 | 00 | 10 | 11 | 00 | 00 | 10 | 11 | 11 | 00 | 10 |
| 2 | 11 | 01 | 00 | 11 | 11 | 01 | 00 | 11 | 11 | 01 | 00 | 00 |
| 3 | 11 | 11 | 00 | 01 | 11 | 11 | 00 | 01 | 11 | 11 | 00 | 10 |
| 4 | 11 | 01 | 00 | 11 | 11 | 01 | 00 | 11 | 11 | 10 | 00 | 11 |
| 5 | 11 | 00 | 00 | 10 | 11 | 00 | 00 | 10 | 11 | 11 | 00 | 01 |
| 6 | 11 | 01 | 00 | 11 | 11 | 01 | 00 | 11 | 11 | 10 | 00 | 00 |
| 7 | 11 | 11 | 00 | 10 | 11 | 11 | 00 | 10 | 11 | 00 | 00 | 01 |
| 8 | 11 | 10 | 00 | 11 | 11 | 10 | 00 | 11 | 11 | 01 | 00 | 00 |
| 9 | 11 | 11 | 00 | 01 | 11 | 11 | 00 | 01 | 11 | 00 | 00 | 01 |
| 10 | 11 | 10 | 00 | 00 | 11 | 10 | 00 | 00 | 11 | 10 | 00 | 11 |
| 11 | 11 | 00 | 00 | 10 | 11 | 00 | 00 | 10 | 11 | 00 | 00 | 01 |
| 12 | 11 | 10 | 00 | 00 | 11 | 10 | 00 | 00 | 11 | 01 | 00 | 00 |
| 13 | 11 | 11 | 00 | 01 | 11 | 11 | 00 | 01 | 11 | 00 | 00 | 10 |
| 14 | 11 | 10 | 00 | 00 | 11 | 10 | 00 | 00 | 11 | 01 | 00 | 11 |
| 15 | 11 | 00 | 00 | 01 | 11 | 00 | 00 | 01 | 11 | 11 | 00 | 10 |
| 16 | 11 | 01 | 00 | 00 | 11 | 01 | 00 | 00 | 11 | 10 | 00 | 11 |

FIG. 19F

| Symbol rate | Symbol # | Channel | Corresponding word of length 16 |
|---|---|---|---|
| $N_{pilot} = 8$ | 1 | I − CH | $-C_3$ |
| | | Q − CH | $C_4$ |
| | 3 | I − CH | $C_1$ |
| | | Q − CH | $-C_2$ |
| $N_{pilot} = 16$ | 1 | I − CH | $-C_3$ |
| | | Q − CH | $C_4$ |
| | 3 | I − CH | $C_1$ |
| | | Q − CH | $-C_2$ |
| | 5 | I − CH | $-C_7$ |
| | | Q − CH | $C_8$ |
| | 7 | I − CH | $C_5$ |
| | | Q − CH | $-C_6$ |

FIG. 20A

| Sequence | Autocorrelation |
|---|---|
| $C_1$ = (1 1 0 1 1 1 1 1 0 0 1 0 0 0 0 0) | 16  4  0  4  0 -4  0 -4 -16 -4  0 -4  0  4  0  4 |
| $C_2$ = (1 0 0 0 1 0 1 0 0 1 1 1 0 1 0 1) | 16 -4  0 -4  0  4  0  4 -16  4  0  4  0 -4  0 -4 |
| $C_3$ = (1 1 1 1 1 0 1 1 0 0 0 0 0 1 0 0) | 16  4  0  4  0 -4  0 -4 -16 -4  0 -4  0  4  0  4 |
| $C_4$ = (0 1 0 1 0 0 0 1 1 0 1 0 1 1 1 0) | 16 -4  0 -4  0  4  0  4 -16  4  0  4  0 -4  0 -4 |
| $C_5$ = (0 0 1 1 1 0 1 1 1 0 0 0 1 0 0) | 16  4  0 -4  0  4  0 -4 -16 -4  0  4  0 -4  0  4 |
| $C_6$ = (0 0 1 0 0 1 0 1 1 1 0 1 1 0 1 0) | 16 -4  0  4  0 -4  0  4 -16  4  0 -4  0  4  0 -4 |
| $C_7$ = (0 1 1 0 0 0 0 1 0 0 0 1 1 1 1) | 16  4  0 -4  0  4  0 -4 -16 -4  0  4  0 -4  0  4 |
| $C_8$ = (1 0 1 1 1 0 1 0 0 1 0 0 0 1 0 1) | 16 -4  0  4  0 -4  0  4 -16  4  0 -4  0  4  0 -4 |
| $C_9$ = (0 0 1 1 0 1 1 1 1 1 0 0 1 0 0 0) | 16  4  0  4  0 -4  0 -4 -16 -4  0 -4  0  4  0  4 |
| $C_{10}$ = (0 0 1 0 1 0 0 1 1 1 0 1 0 1 1 0) | 16 -4  0 -4  0  4  0  4 -16  4  0  4  0 -4  0 -4 |
| $C_{11}$ = (1 1 0 0 0 0 0 1 0 0 1 1 1 1 1 0) | 16  4  0  4  0 -4  0 -4 -16 -4  0 -4  0  4  0  4 |
| $C_{12}$ = (1 0 1 1 1 0 0 1 0 1 0 0 0 1 1 0) | 16 -4  0 -4  0  4  0  4 -16  4  0  4  0 -4  0 -4 |
| $C_{13}$ = (0 1 0 0 0 0 1 1 1 0 1 1 1 1 0 0) | 16  4  0 -4  0  4  0 -4 -16 -4  0  4  0 -4  0  4 |
| $C_{14}$ = (1 0 0 0 1 0 0 1 0 1 1 1 0 1 1 0) | 16 -4  0  4  0 -4  0  4 -16  4  0 -4  0  4  0 -4 |
| $C_{15}$ = (0 0 0 0 1 0 0 0 0 1 1 1 1 0 1 1 1) | 16  4  0 -4  0  4  0 -4 -16 -4  0  4  0 -4  0  4 |
| $C_{16}$ = (1 0 0 1 0 0 0 1 0 1 1 0 1 1 1 0) | 16 -4  0  4  0 -4  0  4 -16  4  0 -4  0  4  0 -4 |

FIG. 20B

| $R(\tau)$  $\tau$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $R_E(\tau)$ | 16 | 4 | 0 | 4 | 0 | -4 | 0 | -4 | -16 | -4 | 0 | -4 | 0 | 4 | 0 | 4 |
| $R_F(\tau)$ | 16 | -4 | 0 | -4 | 0 | 4 | 0 | 4 | -16 | 4 | 0 | 4 | 0 | -4 | 0 | -4 |
| $R_G(\tau)$ | 16 | 4 | 0 | -4 | 0 | 4 | 0 | -4 | -16 | -4 | 0 | 4 | 0 | -4 | 0 | 4 |
| $R_H(\tau)$ | 16 | -4 | 0 | 4 | 0 | -4 | 0 | 4 | -16 | 4 | 0 | -4 | 0 | 4 | 0 | -4 |

FIG. 20C

| Bit # | Npilot = 6 | | | | | | Npilot = 8 | | | | | | | |
|---|---|---|---|---|---|---|---|---|---|---|---|---|---|---|
| | 0 | 1 | 2 | 3 | 4 | 5 | 0 | 1 | 2 | 3 | 4 | 5 | 6 | 7 |
| Slot #1 | 1 | 1 | 1 | 1 | 1 | 0 | 1 | 1 | 1 | 1 | 1 | 1 | 1 | 0 |
| 2 | 1 | 1 | 0 | 1 | 1 | 1 | 1 | 1 | 1 | 0 | 1 | 1 | 1 | 1 |
| 3 | 1 | 0 | 0 | 1 | 1 | 0 | 1 | 0 | 1 | 0 | 1 | 1 | 1 | 0 |
| 4 | 1 | 1 | 0 | 1 | 1 | 1 | 1 | 1 | 1 | 0 | 1 | 1 | 1 | 1 |
| 5 | 1 | 1 | 1 | 1 | 1 | 0 | 1 | 1 | 1 | 1 | 1 | 1 | 1 | 0 |
| 6 | 1 | 1 | 0 | 1 | 0 | 0 | 1 | 1 | 1 | 0 | 1 | 0 | 1 | 0 |
| 7 | 1 | 1 | 1 | 1 | 1 | 0 | 1 | 1 | 1 | 1 | 1 | 1 | 1 | 0 |
| 8 | 1 | 1 | 0 | 1 | 1 | 1 | 1 | 1 | 1 | 0 | 1 | 1 | 1 | 1 |
| 9 | 1 | 0 | 0 | 1 | 0 | 1 | 1 | 0 | 1 | 0 | 1 | 0 | 1 | 1 |
| 10 | 1 | 0 | 1 | 1 | 0 | 0 | 1 | 0 | 1 | 1 | 1 | 0 | 1 | 0 |
| 11 | 1 | 1 | 1 | 1 | 0 | 1 | 1 | 1 | 1 | 1 | 1 | 0 | 1 | 1 |
| 12 | 1 | 0 | 1 | 1 | 0 | 0 | 1 | 0 | 1 | 1 | 1 | 0 | 1 | 0 |
| 13 | 1 | 0 | 0 | 1 | 0 | 1 | 1 | 0 | 1 | 0 | 1 | 0 | 1 | 1 |
| 14 | 1 | 0 | 1 | 1 | 1 | 1 | 1 | 0 | 1 | 1 | 1 | 1 | 1 | 1 |
| 15 | 1 | 0 | 0 | 1 | 0 | 1 | 1 | 0 | 1 | 0 | 1 | 0 | 1 | 1 |
| 16 | 1 | 0 | 1 | 1 | 0 | 0 | 1 | 0 | 1 | 1 | 1 | 0 | 1 | 0 |

FIG. 20D

| $N_{pilots}$ | Pilot bit position # | Corresponding word of length 16 |
|---|---|---|
| 6 | 1 | $C_1$ |
| | 2 | $C_2$ |
| | 4 | $C_3$ |
| | 5 | $C_4$ |
| 8 | 1 | $C_1$ |
| | 3 | $C_2$ |
| | 5 | $C_3$ |
| | 7 | $C_4$ |

FIG. 20E

| Symbol rate | 8ksps | | 16,32,64,128ksps | | | | 256,512,1024ksps | | | | | | | |
|---|---|---|---|---|---|---|---|---|---|---|---|---|---|---|
| Symbol # | 0 | 1 | 0 | 1 | 2 | 3 | 0 | 1 | 2 | 3 | 4 | 5 | 6 | 7 |
| Slot #1 | 11 | 11 | 11 | 11 | 11 | 10 | 11 | 11 | 11 | 10 | 11 | 00 | 11 | 01 |
| 2 | 11 | 10 | 11 | 10 | 11 | 11 | 11 | 10 | 11 | 11 | 11 | 00 | 11 | 10 |
| 3 | 11 | 00 | 11 | 00 | 11 | 10 | 11 | 00 | 11 | 10 | 11 | 11 | 11 | 11 |
| 4 | 11 | 10 | 11 | 10 | 11 | 11 | 11 | 10 | 11 | 11 | 11 | 10 | 11 | 11 |
| 5 | 11 | 11 | 11 | 11 | 11 | 10 | 11 | 11 | 11 | 10 | 11 | 10 | 11 | 01 |
| 6 | 11 | 10 | 11 | 10 | 11 | 00 | 11 | 10 | 11 | 00 | 11 | 01 | 11 | 00 |
| 7 | 11 | 11 | 11 | 11 | 11 | 10 | 11 | 11 | 11 | 10 | 11 | 10 | 11 | 01 |
| 8 | 11 | 10 | 11 | 10 | 11 | 11 | 11 | 10 | 11 | 11 | 11 | 11 | 11 | 00 |
| 9 | 11 | 00 | 11 | 00 | 11 | 01 | 11 | 00 | 11 | 01 | 11 | 11 | 11 | 10 |
| 10 | 11 | 01 | 11 | 01 | 11 | 00 | 11 | 01 | 11 | 00 | 11 | 11 | 11 | 01 |
| 11 | 11 | 11 | 11 | 11 | 11 | 01 | 11 | 11 | 11 | 01 | 11 | 00 | 11 | 00 |
| 12 | 11 | 01 | 11 | 01 | 11 | 00 | 11 | 01 | 11 | 00 | 11 | 01 | 11 | 00 |
| 13 | 11 | 00 | 11 | 00 | 11 | 01 | 11 | 00 | 11 | 01 | 11 | 01 | 11 | 10 |
| 14 | 11 | 01 | 11 | 01 | 11 | 11 | 11 | 01 | 11 | 11 | 11 | 10 | 11 | 11 |
| 15 | 11 | 00 | 11 | 00 | 11 | 01 | 11 | 00 | 11 | 01 | 11 | 01 | 11 | 10 |
| 16 | 11 | 01 | 11 | 01 | 11 | 00 | 11 | 01 | 11 | 00 | 11 | 00 | 11 | 11 |

FIG. 20F

| Symbol rate | 2048,4096ksps | | | | | | | | | | | | | | | |
|---|---|---|---|---|---|---|---|---|---|---|---|---|---|---|---|---|
| Symbol # | 0 | 1 | 2 | 3 | 4 | 5 | 6 | 7 | 8 | 9 | 10 | 11 | 12 | 13 | 14 | 15 |
| Slot #1 | 11 | 11 | 11 | 10 | 11 | 00 | 11 | 01 | 11 | 00 | 11 | 11 | 11 | 01 | 11 | 01 |
| 2 | 11 | 10 | 11 | 11 | 11 | 00 | 11 | 10 | 11 | 00 | 11 | 10 | 11 | 10 | 11 | 00 |
| 3 | 11 | 00 | 11 | 10 | 11 | 11 | 11 | 11 | 11 | 11 | 11 | 01 | 11 | 00 | 11 | 00 |
| 4 | 11 | 10 | 11 | 11 | 11 | 10 | 11 | 11 | 11 | 10 | 11 | 01 | 11 | 00 | 11 | 01 |
| 5 | 11 | 11 | 11 | 10 | 11 | 10 | 11 | 01 | 11 | 01 | 11 | 01 | 11 | 01 | 11 | 10 |
| 6 | 11 | 10 | 11 | 00 | 11 | 01 | 11 | 00 | 11 | 10 | 11 | 00 | 11 | 00 | 11 | 00 |
| 7 | 11 | 11 | 11 | 10 | 11 | 10 | 11 | 01 | 11 | 10 | 11 | 00 | 11 | 10 | 11 | 00 |
| 8 | 11 | 10 | 11 | 11 | 11 | 11 | 11 | 00 | 11 | 11 | 11 | 11 | 11 | 11 | 11 | 01 |
| 9 | 11 | 00 | 11 | 01 | 11 | 11 | 11 | 10 | 11 | 11 | 11 | 00 | 11 | 10 | 11 | 10 |
| 10 | 11 | 01 | 11 | 00 | 11 | 11 | 11 | 01 | 11 | 11 | 11 | 01 | 11 | 01 | 11 | 11 |
| 11 | 11 | 11 | 11 | 01 | 11 | 00 | 11 | 00 | 11 | 00 | 11 | 10 | 11 | 11 | 11 | 11 |
| 12 | 11 | 01 | 11 | 00 | 11 | 01 | 11 | 00 | 11 | 01 | 11 | 10 | 11 | 11 | 11 | 10 |
| 13 | 11 | 00 | 11 | 01 | 11 | 01 | 11 | 10 | 11 | 10 | 11 | 10 | 11 | 10 | 11 | 01 |
| 14 | 11 | 01 | 11 | 11 | 11 | 10 | 11 | 11 | 11 | 01 | 11 | 11 | 11 | 11 | 11 | 11 |
| 15 | 11 | 00 | 11 | 01 | 11 | 01 | 11 | 10 | 11 | 01 | 11 | 11 | 11 | 01 | 11 | 11 |
| 16 | 11 | 01 | 11 | 00 | 11 | 00 | 11 | 11 | 11 | 00 | 11 | 00 | 11 | 00 | 11 | 10 |

FIG. 20G

| Symbol rate | Symbol # | Channel | Corresponding word of length 16 |
|---|---|---|---|
| 8ksps | 1 | I – CH | $C_1$ |
| | | Q – CH | $C_2$ |
| 16, 32, 64, 128ksps | 1 | I – CH | $C_1$ |
| | | Q – CH | $C_2$ |
| | 3 | I – CH | $C_3$ |
| | | Q – CH | $C_4$ |
| 256, 512, 1024ksps | 1 | I – CH | $C_1$ |
| | | Q – CH | $C_2$ |
| | 3 | I – CH | $C_3$ |
| | | Q – CH | $C_4$ |
| | 5 | I – CH | $C_5$ |
| | | Q – CH | $C_6$ |
| | 7 | I – CH | $C_7$ |
| | | Q – CH | $C_8$ |
| 2048, 4096ksps | 1 | I – CH | $C_1$ |
| | | Q – CH | $C_2$ |
| | 3 | I – CH | $C_3$ |
| | | Q – CH | $C_4$ |
| | 5 | I – CH | $C_5$ |
| | | Q – CH | $C_6$ |
| | 7 | I – CH | $C_7$ |
| | | Q – CH | $C_8$ |
| | 9 | I – CH | $C_9$ |
| | | Q – CH | $C_{10}$ |
| | 11 | I – CH | $C_{11}$ |
| | | Q – CH | $C_{12}$ |
| | 13 | I – CH | $C_{13}$ |
| | | Q – CH | $C_{14}$ |
| | 15 | I – CH | $C_{15}$ |
| | | Q – CH | $C_{16}$ |

FIG. 20H

| Symbol # | 0 | 1 | 2 | 3 |
|---|---|---|---|---|
| Slot #1 | 11 | 11 | 11 | 10 |
| 2 | 11 | 10 | 11 | 11 |
| 3 | 11 | 00 | 11 | 10 |
| 4 | 11 | 10 | 11 | 11 |
| 5 | 11 | 11 | 11 | 10 |
| 6 | 11 | 10 | 11 | 00 |
| 7 | 11 | 11 | 11 | 10 |
| 8 | 11 | 10 | 11 | 11 |
| 9 | 11 | 00 | 11 | 01 |
| 10 | 11 | 01 | 11 | 00 |
| 11 | 11 | 11 | 11 | 01 |
| 12 | 11 | 01 | 11 | 00 |
| 13 | 11 | 00 | 11 | 01 |
| 14 | 11 | 01 | 11 | 11 |
| 15 | 11 | 00 | 11 | 01 |
| 16 | 11 | 01 | 11 | 00 |

FIG. 20I

| Symbol # | Channel | Corresponding word of length 16 |
|---|---|---|
| 1 | I-CH | $C_1$ |
| 1 | Q-CH | $C_2$ |
| 3 | I-CH | $C_3$ |
| 3 | Q-CH | $C_4$ |

FIG. 21
| Frame Synchronization Words | |
|---|---|
| L=15 , Slot No. | 1 2 3 4 .................................15 |
| | $C_1$ = (1 0 0 0 1 1 1 1 0 1 0 1 1 0 0) |
| | $C_2$ = (1 0 1 0 0 1 1 0 1 1 1 0 0 0 0) |
| | $C_3$ = (1 1 0 0 0 1 0 0 1 1 0 1 0 1 1) |
| | $C_4$ = (0 0 1 0 1 0 0 0 0 1 1 1 0 1 1) |
| | $C_5$ = (1 1 1 0 1 0 1 1 0 0 1 0 0 0 1) |
| | $C_6$ = (1 1 0 1 1 1 0 0 0 0 1 0 1 0 0) |
| | $C_7$ = (1 0 0 1 1 0 1 0 1 1 1 1 0 0 0) |
| | $C_8$ = (0 0 0 0 1 1 1 0 1 1 0 0 1 0 1) |
FIG. 22A
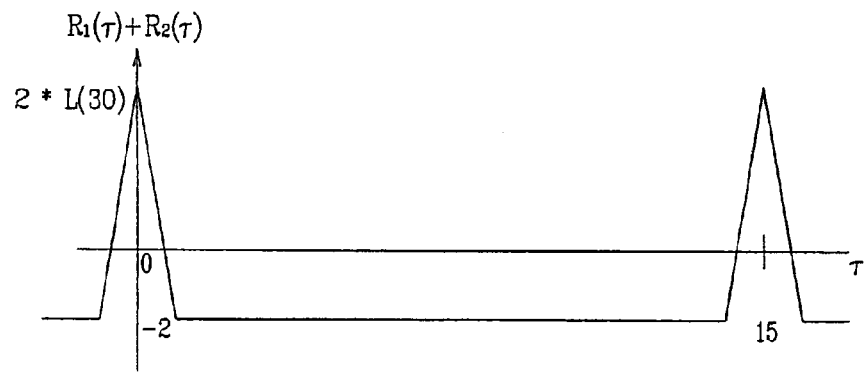
FIG. 22B
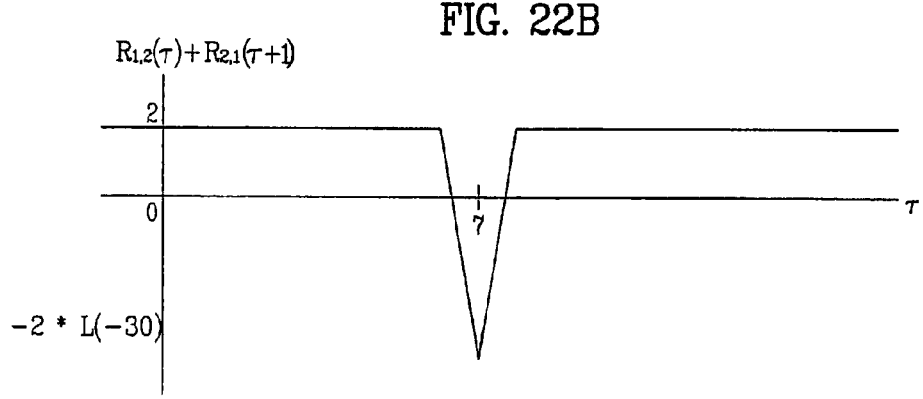

| Bit # | $N_{pilot}=2$ | | $N_{pilot}=3$ | | | $N_{pilot}=4$ | | | |
|---|---|---|---|---|---|---|---|---|---|
|  | 0 | 1 | 0 | 1 | 2 | 0 | 1 | 2 | 3 |
| Slot #1 | 1 | 1 | 1 | 1 | 1 | 1 | 1 | 1 | 1 |
| 2 | 0 | 0 | 0 | 1 | 0 | 1 | 0 | 1 | 0 |
| 3 | 0 | 1 | 0 | 1 | 1 | 1 | 0 | 1 | 1 |
| 4 | 0 | 0 | 0 | 1 | 0 | 1 | 0 | 1 | 0 |
| 5 | 1 | 0 | 1 | 1 | 0 | 1 | 1 | 1 | 0 |
| 6 | 1 | 1 | 1 | 1 | 1 | 1 | 1 | 1 | 1 |
| 7 | 1 | 1 | 1 | 1 | 1 | 1 | 1 | 1 | 1 |
| 8 | 1 | 0 | 1 | 1 | 0 | 1 | 1 | 1 | 0 |
| 9 | 0 | 1 | 0 | 1 | 1 | 1 | 0 | 1 | 1 |
| 10 | 1 | 1 | 1 | 1 | 1 | 1 | 1 | 1 | 1 |
| 11 | 0 | 1 | 0 | 1 | 1 | 1 | 0 | 1 | 1 |
| 12 | 1 | 0 | 1 | 1 | 0 | 1 | 1 | 1 | 0 |
| 13 | 1 | 0 | 1 | 1 | 0 | 1 | 1 | 1 | 0 |
| 14 | 0 | 0 | 0 | 1 | 0 | 1 | 0 | 1 | 0 |
| 15 | 0 | 0 | 0 | 1 | 0 | 1 | 0 | 1 | 0 |

FIG. 23B

| $N_{pilot}$ | Pilot bit position # | Corresponding word of length 15 |
|---|---|---|
| 2 | 0 | $C_1$ |
|  | 1 | $C_2$ |
| 3 | 0 | $C_1$ |
|  | 2 | $C_2$ |
| 4 | 1 | $C_1$ |
|  | 3 | $C_2$ |

FIG. 23C

|  | $N_{pilot} = 2$ | | $N_{pilot} = 3$ | | | $N_{pilot} = 4$ | | | |
|---|---|---|---|---|---|---|---|---|---|
| Bit # | 0 | 1 | 0 | 1 | 2 | 0 | 1 | 2 | 3 |
| Slot #1 | 1 | 1 | 1 | 1 | 1 | 1 | 1 | 1 | 1 |
| 2 | 1 | 0 | 0 | 1 | 0 | 1 | 0 | 1 | 0 |
| 3 | 1 | 1 | 0 | 1 | 1 | 1 | 0 | 1 | 1 |
| 4 | 1 | 0 | 0 | 1 | 0 | 1 | 0 | 1 | 0 |
| 5 | 1 | 0 | 1 | 1 | 0 | 1 | 1 | 1 | 0 |
| 6 | 1 | 1 | 1 | 1 | 1 | 1 | 1 | 1 | 1 |
| 7 | 1 | 1 | 1 | 1 | 1 | 1 | 1 | 1 | 1 |
| 8 | 1 | 0 | 1 | 1 | 0 | 1 | 1 | 1 | 0 |
| 9 | 1 | 1 | 0 | 1 | 1 | 1 | 0 | 1 | 1 |
| 10 | 1 | 1 | 1 | 1 | 1 | 1 | 1 | 1 | 1 |
| 11 | 1 | 1 | 0 | 1 | 1 | 1 | 0 | 1 | 1 |
| 12 | 1 | 0 | 1 | 1 | 0 | 1 | 1 | 1 | 0 |
| 13 | 1 | 0 | 1 | 1 | 0 | 1 | 1 | 1 | 0 |
| 14 | 1 | 0 | 0 | 1 | 0 | 1 | 0 | 1 | 0 |
| 15 | 1 | 0 | 0 | 1 | 0 | 1 | 0 | 1 | 0 |

FIG. 23D

| $N_{pilot}$ | Pilot bit position # | Corresponding word of length 15 |
|---|---|---|
| 2 | 1 | $C_1$ |
| 3 | 0 | $C_1$ |
|  | 2 | $C_2$ |
| 4 | 1 | $C_1$ |
|  | 3 | $C_2$ |

FIG. 23E

| | Npilot = 5 | | | | | Npilot = 6 | | | | | |
|---|---|---|---|---|---|---|---|---|---|---|---|
| Bit # | 0 | 1 | 2 | 3 | 4 | 0 | 1 | 2 | 3 | 4 | 5 |
| Slot #1 | 1 | 1 | 1 | 1 | 0 | 1 | 1 | 1 | 1 | 1 | 0 |
| 2 | 0 | 0 | 1 | 1 | 0 | 1 | 0 | 0 | 1 | 1 | 0 |
| 3 | 0 | 1 | 1 | 0 | 1 | 1 | 0 | 1 | 1 | 0 | 1 |
| 4 | 0 | 0 | 1 | 0 | 0 | 1 | 0 | 0 | 1 | 0 | 0 |
| 5 | 1 | 0 | 1 | 0 | 1 | 1 | 1 | 0 | 1 | 0 | 1 |
| 6 | 1 | 1 | 1 | 1 | 0 | 1 | 1 | 1 | 1 | 1 | 0 |
| 7 | 1 | 1 | 1 | 0 | 0 | 1 | 1 | 1 | 1 | 0 | 0 |
| 8 | 1 | 0 | 1 | 0 | 0 | 1 | 1 | 0 | 1 | 0 | 0 |
| 9 | 0 | 1 | 1 | 1 | 0 | 1 | 0 | 1 | 1 | 1 | 0 |
| 10 | 1 | 1 | 1 | 1 | 1 | 1 | 1 | 1 | 1 | 1 | 1 |
| 11 | 0 | 1 | 1 | 0 | 1 | 1 | 0 | 1 | 1 | 0 | 1 |
| 12 | 1 | 0 | 1 | 1 | 1 | 1 | 1 | 0 | 1 | 1 | 1 |
| 13 | 1 | 0 | 1 | 0 | 0 | 1 | 1 | 0 | 1 | 0 | 0 |
| 14 | 0 | 0 | 1 | 1 | 1 | 1 | 0 | 0 | 1 | 1 | 1 |
| 15 | 0 | 0 | 1 | 1 | 1 | 1 | 0 | 0 | 1 | 1 | 1 |

FIG. 23F

| | Npilot 7 | | | | | | | Npilot = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #1 | 1 | 1 | 1 | 1 | 1 | 0 | 1 | 1 | 1 | 1 | 1 | 1 | 1 | 1 | 0 |
| 2 | 1 | 0 | 0 | 1 | 1 | 0 | 1 | 1 | 0 | 1 | 0 | 1 | 1 | 1 | 0 |
| 3 | 1 | 0 | 1 | 1 | 0 | 1 | 1 | 1 | 0 | 1 | 1 | 1 | 0 | 1 | 1 |
| 4 | 1 | 0 | 0 | 1 | 0 | 0 | 1 | 1 | 0 | 1 | 0 | 1 | 0 | 1 | 0 |
| 5 | 1 | 1 | 0 | 1 | 0 | 1 | 1 | 1 | 1 | 1 | 0 | 1 | 0 | 1 | 1 |
| 6 | 1 | 1 | 1 | 1 | 1 | 0 | 1 | 1 | 1 | 1 | 1 | 1 | 1 | 1 | 0 |
| 7 | 1 | 1 | 1 | 1 | 0 | 0 | 1 | 1 | 1 | 1 | 1 | 1 | 0 | 1 | 0 |
| 8 | 1 | 1 | 0 | 1 | 0 | 0 | 1 | 1 | 1 | 1 | 0 | 1 | 0 | 1 | 0 |
| 9 | 1 | 0 | 1 | 1 | 1 | 0 | 1 | 1 | 0 | 1 | 1 | 1 | 1 | 1 | 0 |
| 10 | 1 | 1 | 1 | 1 | 1 | 1 | 1 | 1 | 1 | 1 | 1 | 1 | 1 | 1 | 1 |
| 11 | 1 | 0 | 1 | 1 | 0 | 1 | 1 | 1 | 0 | 1 | 1 | 1 | 0 | 1 | 1 |
| 12 | 1 | 1 | 0 | 1 | 1 | 1 | 1 | 1 | 1 | 1 | 0 | 1 | 1 | 1 | 1 |
| 13 | 1 | 1 | 0 | 1 | 0 | 0 | 1 | 1 | 1 | 1 | 0 | 1 | 0 | 1 | 0 |
| 14 | 1 | 0 | 0 | 1 | 1 | 1 | 1 | 1 | 0 | 1 | 0 | 1 | 1 | 1 | 1 |
| 15 | 1 | 0 | 0 | 1 | 1 | 1 | 1 | 1 | 0 | 1 | 0 | 1 | 1 | 1 | 1 |

FIG. 23G

| $N_{pilot}$ | Pilot bit position # | Corresponding word of length 15 |
|---|---|---|
| 5 | 0 | $C_1$ |
|  | 1 | $C_2$ |
|  | 3 | $C_3$ |
|  | 4 | $C_4$ |
| 6 | 1 | $C_1$ |
|  | 2 | $C_2$ |
|  | 4 | $C_3$ |
|  | 5 | $C_4$ |
| 7 | 1 | $C_1$ |
|  | 2 | $C_2$ |
|  | 4 | $C_3$ |
|  | 5 | $C_4$ |
| 8 | 1 | $C_1$ |
|  | 3 | $C_2$ |
|  | 5 | $C_3$ |
|  | 7 | $C_4$ |

| Channel Bit Rate(kbps) | Channel Symbol Rate(ksps) | SF | Bits/Frame | Bits/Slot | $N_{pilot}$ | $N_{TFCI}$ |
|---|---|---|---|---|---|---|
| 15 | 15 | 256 | 150 | 10 | 8 | 2 |

| Bit # | 0 | 1 | 2 | 3 | 4 | 5 | 6 | 7 |
|---|---|---|---|---|---|---|---|---|
| Slot #1 | 1 | 1 | 1 | 1 | 1 | 1 | 1 | 0 |
| 2 | 1 | 0 | 1 | 0 | 1 | 1 | 1 | 0 |
| 3 | 1 | 0 | 1 | 1 | 1 | 0 | 1 | 1 |
| 4 | 1 | 0 | 1 | 0 | 1 | 0 | 1 | 0 |
| 5 | 1 | 1 | 1 | 0 | 1 | 0 | 1 | 1 |
| 6 | 1 | 1 | 1 | 1 | 1 | 1 | 1 | 0 |
| 7 | 1 | 1 | 1 | 1 | 1 | 0 | 1 | 0 |
| 8 | 1 | 1 | 1 | 0 | 1 | 0 | 1 | 0 |
| 9 | 1 | 0 | 1 | 1 | 1 | 1 | 1 | 0 |
| 10 | 1 | 1 | 1 | 1 | 1 | 1 | 1 | 1 |
| 11 | 1 | 0 | 1 | 1 | 1 | 0 | 1 | 1 |
| 12 | 1 | 1 | 1 | 0 | 1 | 1 | 1 | 1 |
| 13 | 1 | 1 | 1 | 0 | 1 | 0 | 1 | 0 |
| 14 | 1 | 0 | 1 | 0 | 1 | 1 | 1 | 1 |
| 15 | 1 | 0 | 1 | 0 | 1 | 1 | 1 | 1 |

FIG. 24A

| Symbol # | $N_{pilot}=2$ | $N_{pilot}=4$ | | $N_{pilot}=8$ | | | | $N_{pilot}=16$ | | | | | | | |
|---|---|---|---|---|---|---|---|---|---|---|---|---|---|---|---|
| | 0 | 0 | 1 | 0 | 1 | 2 | 3 | 0 | 1 | 2 | 3 | 4 | 5 | 6 | 7 |
| Slot #1 | 11 | 11 | 11 | 11 | 11 | 11 | 10 | 11 | 11 | 11 | 10 | 11 | 11 | 11 | 10 |
| 2 | 00 | 11 | 00 | 11 | 00 | 11 | 10 | 11 | 00 | 11 | 10 | 11 | 11 | 11 | 00 |
| 3 | 01 | 11 | 01 | 11 | 01 | 11 | 01 | 11 | 01 | 11 | 01 | 11 | 10 | 11 | 00 |
| 4 | 00 | 11 | 00 | 11 | 00 | 11 | 00 | 11 | 00 | 11 | 00 | 11 | 01 | 11 | 10 |
| 5 | 10 | 11 | 10 | 11 | 10 | 11 | 01 | 11 | 10 | 11 | 01 | 11 | 11 | 11 | 11 |
| 6 | 11 | 11 | 11 | 11 | 11 | 11 | 10 | 11 | 11 | 11 | 10 | 11 | 01 | 11 | 01 |
| 7 | 11 | 11 | 11 | 11 | 11 | 11 | 00 | 11 | 11 | 11 | 00 | 11 | 10 | 11 | 11 |
| 8 | 10 | 11 | 10 | 11 | 10 | 11 | 00 | 11 | 10 | 11 | 00 | 11 | 10 | 11 | 00 |
| 9 | 01 | 11 | 01 | 11 | 01 | 11 | 10 | 11 | 01 | 11 | 10 | 11 | 00 | 11 | 11 |
| 10 | 11 | 11 | 11 | 11 | 11 | 11 | 11 | 11 | 11 | 11 | 11 | 11 | 00 | 11 | 11 |
| 11 | 01 | 11 | 01 | 11 | 01 | 11 | 01 | 11 | 01 | 11 | 01 | 11 | 11 | 11 | 10 |
| 12 | 10 | 11 | 10 | 11 | 10 | 11 | 11 | 11 | 10 | 11 | 11 | 11 | 00 | 11 | 10 |
| 13 | 10 | 11 | 10 | 11 | 10 | 11 | 00 | 11 | 10 | 11 | 00 | 11 | 01 | 11 | 01 |
| 14 | 00 | 11 | 00 | 11 | 00 | 11 | 11 | 11 | 00 | 11 | 11 | 11 | 00 | 11 | 00 |
| 15 | 00 | 11 | 00 | 11 | 00 | 11 | 11 | 11 | 00 | 11 | 11 | 11 | 10 | 11 | 01 |

FIG. 24B

| Symbol rate | Symbol # | Channel | Corresponding word of length 15 |
|---|---|---|---|
| $N_{pilot}=2$ | 0 | I-CH | $C_1$ |
| | | Q-CH | $C_2$ |
| $N_{pilot}=4$ | 1 | I-CH | $C_1$ |
| | | Q-CH | $C_2$ |
| $N_{pilot}=8$ | 1 | I-CH | $C_1$ |
| | | Q-CH | $C_2$ |
| | 3 | I-CH | $C_3$ |
| | | Q-CH | $C_4$ |
| $N_{pilot}=16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

FIG. 24C

| Symbol # | $N_{pilot}=4$ | | $N_{pilot}=8$ | | | | $N_{pilot}=16$ | | | | | | | |
|---|---|---|---|---|---|---|---|---|---|---|---|---|---|---|
| | 0 | 1 | 0 | 1 | 2 | 3 | 0 | 1 | 2 | 3 | 4 | 5 | 6 | 7 |
| Slot #1 | 01 | 10 | 11 | 00 | 00 | 10 | 11 | 00 | 00 | 10 | 11 | 00 | 00 | 10 |
| 2 | 10 | 10 | 11 | 00 | 00 | 01 | 11 | 00 | 00 | 01 | 11 | 10 | 00 | 10 |
| 3 | 11 | 10 | 11 | 11 | 00 | 00 | 11 | 11 | 00 | 00 | 11 | 10 | 00 | 11 |
| 4 | 10 | 10 | 11 | 10 | 00 | 01 | 11 | 10 | 00 | 01 | 11 | 00 | 00 | 00 |
| 5 | 00 | 10 | 11 | 11 | 00 | 11 | 11 | 11 | 00 | 11 | 11 | 01 | 00 | 10 |
| 6 | 01 | 10 | 11 | 00 | 00 | 10 | 11 | 00 | 00 | 10 | 11 | 11 | 00 | 00 |
| 7 | 01 | 10 | 11 | 10 | 00 | 10 | 11 | 10 | 00 | 10 | 11 | 01 | 00 | 11 |
| 8 | 00 | 10 | 11 | 10 | 00 | 11 | 11 | 10 | 00 | 11 | 11 | 10 | 00 | 11 |
| 9 | 11 | 10 | 11 | 00 | 00 | 00 | 11 | 00 | 00 | 00 | 11 | 01 | 00 | 01 |
| 10 | 01 | 10 | 11 | 01 | 00 | 10 | 11 | 01 | 00 | 10 | 11 | 01 | 00 | 01 |
| 11 | 11 | 10 | 11 | 11 | 00 | 00 | 11 | 11 | 00 | 00 | 11 | 00 | 00 | 10 |
| 12 | 00 | 10 | 11 | 01 | 00 | 11 | 11 | 01 | 00 | 11 | 11 | 00 | 00 | 01 |
| 13 | 00 | 10 | 11 | 10 | 00 | 11 | 11 | 10 | 00 | 11 | 11 | 11 | 00 | 00 |
| 14 | 10 | 10 | 11 | 01 | 00 | 01 | 11 | 01 | 00 | 01 | 11 | 10 | 00 | 01 |
| 15 | 10 | 10 | 11 | 01 | 00 | 01 | 11 | 01 | 00 | 01 | 11 | 11 | 00 | 11 |

FIG. 24D

| Symbol rate | Symbol # | Channel | Corresponding word of length 15 |
|---|---|---|---|
| $N_{pilot}=4$ | 0 | I-CH | $-C_1$ |
| | | Q-CH | $C_2$ |
| $N_{pilot}=8$ | 1 | I-CH | $-C_3$ |
| | | Q-CH | $C_4$ |
| | 3 | I-CH | $C_1$ |
| | | Q-CH | $-C_2$ |
| $N_{pilot}=16$ | 1 | I-CH | $-C_3$ |
| | | Q-CH | $C_4$ |
| | 3 | I-CH | $C_1$ |
| | | Q-CH | $-C_2$ |
| | 5 | I-CH | $-C_7$ |
| | | Q-CH | $C_8$ |
| | 7 | I-CH | $C_5$ |
| | | Q-CH | $-C_6$ |

FIG. 25A

| | $N_{pilot} = 8$ | | | | $N_{pilot} = 16$ | | | | | | | |
|---|---|---|---|---|---|---|---|---|---|---|---|---|
| Symbol # | 0 | 1 | 2 | 3 | 0 | 1 | 2 | 3 | 4 | 5 | 6 | 7 |
| Slot #1 | 11 | 11 | 11 | 10 | 11 | 11 | 11 | 10 | 11 | 11 | 11 | 10 |
| 2 | 11 | 00 | 11 | 10 | 11 | 00 | 11 | 10 | 11 | 11 | 11 | 00 |
| 3 | 11 | 01 | 11 | 01 | 11 | 01 | 11 | 01 | 11 | 10 | 11 | 00 |
| 4 | 11 | 00 | 11 | 00 | 11 | 00 | 11 | 00 | 11 | 01 | 11 | 10 |
| 5 | 11 | 10 | 11 | 01 | 11 | 10 | 11 | 01 | 11 | 11 | 11 | 11 |
| 6 | 11 | 11 | 11 | 10 | 11 | 11 | 11 | 10 | 11 | 01 | 11 | 01 |
| 7 | 11 | 11 | 11 | 00 | 11 | 11 | 11 | 00 | 11 | 10 | 11 | 11 |
| 8 | 11 | 10 | 11 | 00 | 11 | 10 | 11 | 00 | 11 | 10 | 11 | 00 |
| 9 | 11 | 01 | 11 | 10 | 11 | 01 | 11 | 10 | 11 | 00 | 11 | 11 |
| 10 | 11 | 11 | 11 | 11 | 11 | 11 | 11 | 11 | 11 | 00 | 11 | 11 |
| 11 | 11 | 01 | 11 | 01 | 11 | 01 | 11 | 01 | 11 | 11 | 11 | 10 |
| 12 | 11 | 10 | 11 | 11 | 11 | 10 | 11 | 11 | 11 | 00 | 11 | 10 |
| 13 | 11 | 10 | 11 | 00 | 11 | 10 | 11 | 00 | 11 | 01 | 11 | 01 |
| 14 | 11 | 00 | 11 | 11 | 11 | 00 | 11 | 11 | 11 | 00 | 11 | 00 |
| 15 | 11 | 00 | 11 | 11 | 11 | 00 | 11 | 11 | 11 | 10 | 11 | 01 |

FIG. 25B

| Symbol rate | Symbol # | Channel | Corresponding word of length 15 |
|---|---|---|---|
| $N_{pilot} = 8$ | 1 | I-CH | $C_1$ |
| | | Q-CH | $C_2$ |
| | 3 | I-CH | $C_3$ |
| | | Q-CH | $C_4$ |
| $N_{pilot} = 16$ | 1 | I-CH | $C_1$ |
| | | Q-CH | $C_2$ |
| | 3 | I-CH | $C_3$ |
| | | Q-CH | $C_4$ |
| | 5 | I-CH | $C_5$ |
| | | Q-CH | $C_6$ |
| | 7 | I-CH | $C_7$ |
| | | Q-CH | $C_8$ |

FIG. 25C

| Symbol # | $N_{pilot} = 8$ | | | | $N_{pilot} = 16$ | | | | | | | |
|---|---|---|---|---|---|---|---|---|---|---|---|---|
| | 0 | 1 | 2 | 3 | 0 | 1 | 2 | 3 | 4 | 5 | 6 | 7 |
| Slot #1 | 11 | 00 | 00 | 10 | 11 | 00 | 00 | 10 | 11 | 00 | 00 | 10 |
| 2 | 11 | 00 | 00 | 01 | 11 | 00 | 00 | 01 | 11 | 10 | 00 | 10 |
| 3 | 11 | 11 | 00 | 00 | 11 | 11 | 00 | 00 | 11 | 10 | 00 | 11 |
| 4 | 11 | 10 | 00 | 01 | 11 | 10 | 00 | 01 | 11 | 00 | 00 | 00 |
| 5 | 11 | 11 | 00 | 11 | 11 | 11 | 00 | 11 | 11 | 01 | 00 | 10 |
| 6 | 11 | 00 | 00 | 10 | 11 | 00 | 00 | 10 | 11 | 11 | 00 | 00 |
| 7 | 11 | 10 | 00 | 10 | 11 | 10 | 00 | 10 | 11 | 01 | 00 | 11 |
| 8 | 11 | 10 | 00 | 11 | 11 | 10 | 00 | 11 | 11 | 10 | 00 | 11 |
| 9 | 11 | 00 | 00 | 00 | 11 | 00 | 00 | 00 | 11 | 01 | 00 | 01 |
| 10 | 11 | 01 | 00 | 10 | 11 | 01 | 00 | 10 | 11 | 01 | 00 | 01 |
| 11 | 11 | 11 | 00 | 00 | 11 | 11 | 00 | 00 | 11 | 00 | 00 | 10 |
| 12 | 11 | 01 | 00 | 11 | 11 | 01 | 00 | 11 | 11 | 00 | 00 | 01 |
| 13 | 11 | 10 | 00 | 11 | 11 | 10 | 00 | 11 | 11 | 11 | 00 | 00 |
| 14 | 11 | 01 | 00 | 01 | 11 | 01 | 00 | 01 | 11 | 10 | 00 | 01 |
| 15 | 11 | 01 | 00 | 01 | 11 | 01 | 00 | 01 | 11 | 11 | 00 | 11 |

FIG. 25D

| Symbol rate | Symbol # | Channel | Corresponding word of length 15 |
|---|---|---|---|
| $N_{pilot} = 8$ | 1 | I-CH | $-C_3$ |
| | | Q-CH | $C_4$ |
| | 3 | I-CH | $C_1$ |
| | | Q-CH | $-C_2$ |
| $N_{pilot} = 16$ | 1 | I-CH | $-C_3$ |
| | | Q-CH | $C_4$ |
| | 3 | I-CH | $C_1$ |
| | | Q-CH | $-C_2$ |
| | 5 | I-CH | $-C_7$ |
| | | Q-CH | $C_8$ |
| | 7 | I-CH | $C_5$ |
| | | Q-CH | $-C_6$ |

| Parameters | Uplink |
|---|---|
| Number of slots per frame | 15 |
| Number of bits in the DPCCH(Pilot/TPC/TFCI/FBI) | 6/2/2/0 |
| Number of bits in the DPDCH per each slot | 10 |
| Spreading factor (DPDCH) | 256 |
| Spreading factor (DPCCH) | 256 |
| Modulation | HPSK |
| 3dB bandwidth | 3.84MHz |
| Shaping filter | Root raised cosine (roll off 0.22) |
| Power amplifier | Ideal |
| Propagation channel | AWGN |

FIG. 27

| Item | 15 slots | 16 slots |
|---|---|---|
| No. of slots per frame | 15 | 16 |
| No. of $N_{pilot}$ per slot | 1)Uplink 2,3,4,5,6,7,8 2)Downlink 2,4,8,16 | 1)Uplink 5,6,7,8 2)Downlink 4,8,16,32 |
| Slot-Slot possible? | Yes | Yes |
| Double-check possible? | Yes (Two correlators such as auto-correlator and cross-correlator are used) | Yes (Auto-correlator) |
| Single frame synchronization word can be used for frame synchronization? | Yes since a frame synchronization word has-1 out-of-phase coefficients | May not be feasible because of +4 or -4 out-of-phase coefficients. The +4 or -4 side lobes can be zero through some particular processing using preferred pair of frame synchronization words. |
| Frame synchronization words | All 8 frame synchronization words are made out of a single PN code | All 8 frame synchronization words have +4 or -4 out-of-phase coefficient and minus peak value at middle shift. |
| Autocorrelation function | $R(\tau)=15, \tau=0$ $R(\tau)=-1$, elsewhere | $R(\tau)=16, \tau=0$ $R(\tau)=-16, \tau=8$ $R(\tau)=0,+4$, or $-4$, elsewhere |

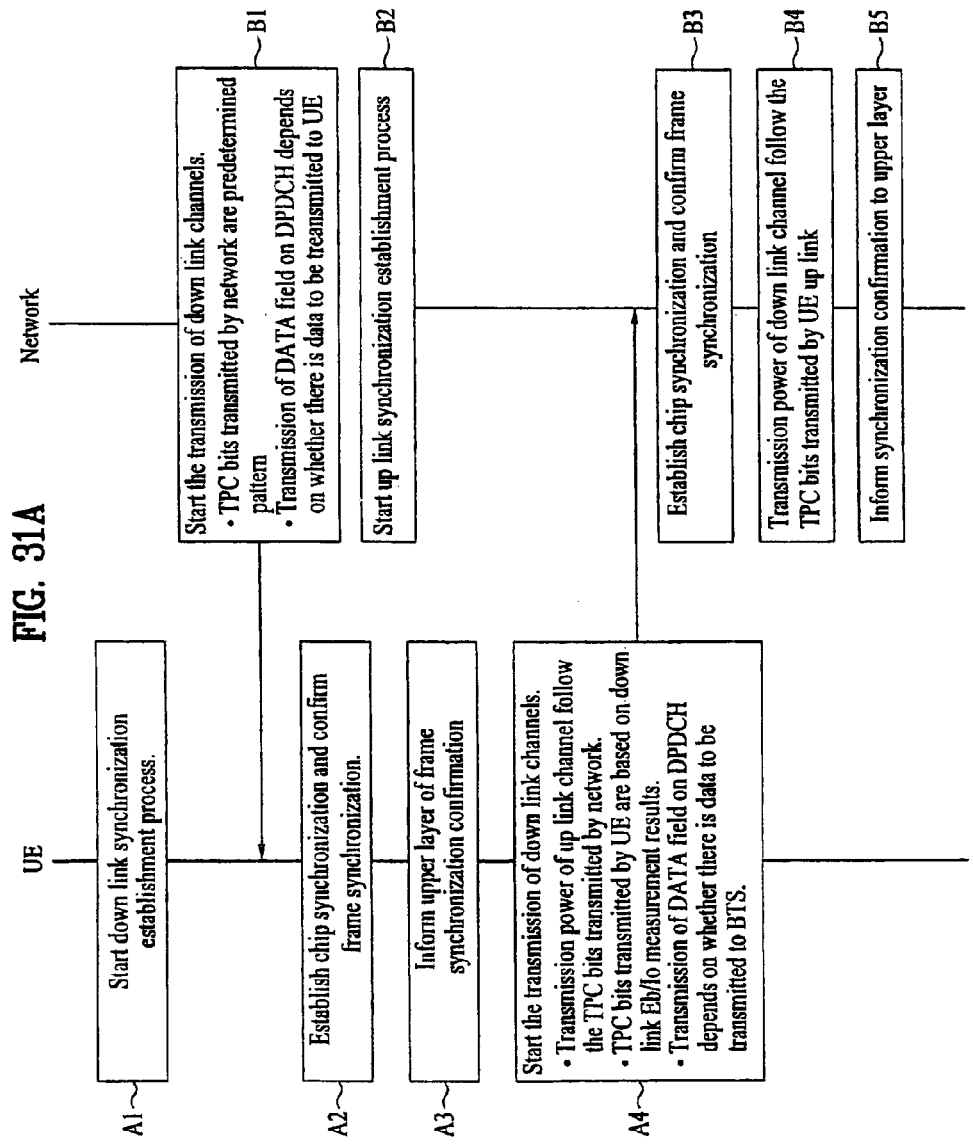

PILOT SIGNALS FOR SYNCHRONIZATION AND/OR CHANNEL ESTIMATION

This application claims the benefit of U.S. Provisional Application No. 60/136,763 filed May 28, 1999 and this application is also a continuation-in-part of application Ser. No. 09/373,703 now U.S. Pat. No. 6,791,960 and Ser. No. 09/376,373 now U.S. Pat. No. 6,721,299 filed Aug. 13, 1999 and Aug. 18, 1999, respectively, and application Ser. No. 09/825,444, now U.S. Pat. No. 6,804,264 Ser. Nos. 09/525,448, and 09/525,447, all filed Mar. 14, 2000, whose entire disclosure is incorporated herein by reference therein.

BACKGROUND OF THE INVENTION

1. Field of the Invention

The present invention relates to communication systems, and more particularly, wireless communication systems, preferably, wide band code division multiple access (W-CDMA) communication systems.

2. Background of the Related Art

The use of code division multiple access (CDMA) modulation techniques is one of several techniques for facilitating communications in which a large number of systems are present. FIG. 1 generally illustrates a system 10, which uses CDMA modulation techniques in communication between user equipment (UE) 12a and 12b, each UE including a cellular telephone, and base stations (BTS) 14a and 14b. A base station controller (BSC) 16 typically includes an interface and processing circuitry for providing system control to the BTS 14a, 14b. The BSC 16 controls the routing of telephone calls from the public switched telephone network (PSTN) to the appropriate BTS for transmission to the appropriate UE. The BSC 16 also controls the routing of calls from the UEs, via at least one BTS to the PSTN. The BSC 16 may direct calls between UEs via the appropriate BTS since UEs do not typically communicate directly with one another. The BSC 16 may be coupled to the BTS 14a and 14b by various means including dedicated telephone lines, optical fiber links or by microwave communication links.

The arrows 13a–13d define the possible communication links between the BTS 14a and UEs 12a and 12b. The arrows 15a–15d define the possible communication links between the BTS 14ba and UEs 12a and 12b. In the reverse channel or uplink (i.e., from UE to BTS), the UE signals is received by BTS 14a and/or BTS 14b, which, after demodulation and combining, pass the signal forward to the combining point, typically to the BSC 16. In the forward channel or downlink (i.e., from BTS to UE), the BTS signals are received by UE 12a and/or UE 12b. The above system is described in U.S. Pat. Nos. 5,101,501; 5,103,459; 5,109,390; and 5,416,797, whose entire disclosure is hereby incorporated by reference therein.

A radio channel is a generally hostile medium in nature. It is rather difficult to predict its behavior. Traditionally, the radio channels are modeled in a statistical way using real propagation measurement data. In general, the signal fading in a radio environment can be decomposed into a large-scale path loss component together with a medium-scale slow varying component having a log-normal distribution, and a small-scale fast varying component with a Rician or Rayleigh distribution, depending on the presence or absence of the line-of-sight (LOS) situation between the transmitter and the receiver.

FIG. 2 illustrates these three different propagation phenomena. An extreme variation in the transmission path between the transmitter and receiver can be found, ranging from direct LOS to severely obstructed paths due to buildings, mountains, or foliage. The phenomenon of decreasing received power with distance due to reflection, diffraction around structures, and refraction is known as path loss.

As shown, the transmitted signal is reflected by many obstacles between a transmitter and a receiver, thus creating a multipath channel. Due to the interference among many multipaths with different time delays, the received signal suffers from frequency selective multipath fading. For example, when the 2 GHz carrier frequency band is used and a car having a UE is travelling at a speed of 100 km/h, the maximum Doppler frequency of fading is 185 Hz. While coherent detection can be used to increase link capacity, under such fast fading, the channel estimation for coherent detection is generally very difficult to achieve. Because of fading channels, it is hard to obtain a phase reference for the coherent detection of data modulated signal. Therefore, it is beneficial to have a separate pilot channel.

Typically, a channel estimate for coherent detection is obtained from a common pilot channel. However, a common pilot channel transmitted with an omnidirectional antenna experiences a different radio channel than a traffic channel signal transmitted through a narrow beam. It has been noticed that common control channels are often problematic in the downlink when adaptive antennas are used. The problem can be circumvented by user dedicated pilot symbols, which are used as a reference signal for the channel estimation. The dedicated pilot symbols can either be time or code multiplexed.

FIG. 3 depicts a block diagram of a transmitter and a receiver for time multiplexed pilot symbols for an improved channel estimation method that works satisfactorily under slow-to-fast fading environments. Known pilot symbols are periodically multiplexed with the sequence of the transmitted data. The pilot symbols and data symbols following pilot symbols constitute a slot, as shown in FIG. 3.

Further, in a DS-CDMA transmitter, the information signal is modulated by a spreading code, and in the receiver, it is correlated with a replica of the same code. Thus, low cross-correlation between the desired and interfering users is important to suppress the multiple access interference. Good autocorrelation properties are required for reliable initial synchronization, since large sidelobes of the autocorrelation function may lead to erroneous code synchronization decisions. Furthermore, good autocorrelation properties are important to reliably separate the multipath components.

Since the autocorrelation function of a spreading code should resemble, as much as possible, the autocorrelation function of white Gaussian noise, the DS code sequences are also called pseudo-noise (PN) sequences. The autocorrelation and cross-correlation functions are connected in such a way that it is not possible to achieve good autocorrelation and cross-correlation values simultaneously. This can be intuitively explained by noting that having good autocorrelation properties is also an indication of good randomness of a sequence. Random codes exhibit worse cross-correlation properties than deterministic codes.

Such mobile communication system has gone through different stages of evolution, and various countries used different standards. First generation mobile systems in the 1980s used analog transmission for speech services. Advanced Mobile Phone Service (AMPS) in the United States, Total Access Communication System (TACS) in the United Kingdom, Nordic Mobile Telephones (NMT) in Scandinavia, Nippon Telephone and Telegraph (NTT) in Japan, etc., belonged to the first generation.

Second generation systems using digital transmission were introduced in the late 1980s. They offer higher spectrum efficiency, better data services, and more advanced roaming than the first generation systems. Global System for Mobile Communications (GSM) in Europe, Personal Digital Cellular (PDC) in Japan, and IS-95 in the United States belonged to the second generation.

Recently, third generation mobile radio networks have been under intense research and discussion and will emerge around the year 2000. In the International Telecommunication Union (ITU), the third generation networks are called International Mobile Telecommunications—2000 (IMT-2000) and in Europe, Universal Mobile Telecommunication System (UMTS). IMT-2000 will provide a multitude of services, including multimedia and high bit rate packet data.

Wideband CDMA has emerged as the mainstream air interface solution for the third generation networks. Wideband CDMA systems are currently being standardized by the European Telecommunications Standards Institute (ETSI) of Europe, the Association for Radio Industry and Business (ARIB) of Japan, the TIA Engineering Committees TR45 and TR46 and the T1 committee T1P1 of the United States, and the Telecommunication Technology Association TTA I and TTA II (renamed Global CDMA I and II, respectively) in Korea. The above description and a background of various systems can be found in *WIDEBAND CDMA FOR THIRD GENERATION MOBILE COMMUNICATIONS* by T. Ojanpera et al, published 1998, by Artech House Publishers, whose entire disclosure is hereby incorporated by reference therein.

Recently, ARIB in Japan, ETSI in Europe, T1 in U.S.A., and TTA in Korea have mapped out a third generation mobile communication system based on a core network and radio access technique of an existing global system for mobile communications (GSM) to provide various services including multimedia, such as audio, video and data. They have agreed to a partnership study for the presentation of a technical specification on the evolved next generation mobile communication system and named a project for the partnership study as a third generation partnership project (3GPP).

The 3GPP is classified into three part technical studies. The first part is a 3GPP system structure and service capability based on the 3GPP specification. The second part is a study of a universal terrestrial radio access network (UTRAN), which is a radio access network (RAN) applying wideband CDMA technique based on a frequency division duplex (FDD) mode, and a TD-CDMA technique based on a time division duplex (TDD) mode. The third part is a study of a core network evolved from a second generation GSM, which has third generation networking capabilities, such as mobility management and global roaming.

Among the technical studies of the 3GPP, the UTRAN study defines and specifies the transport and physical channels. This technical specification, TS S1.11 v1.1.0, was distributed on March of 1999, whose entire disclosure is hereby incorporated by reference therein. The physical channel includes the dedicated physical channels (DPCHs) used in the uplink and downlink. Each DPCH is generally provided with three layers, e.g., superframes, radio frames and timeslots. As specified in the 3GPP radio access network (RAN) standard, a superframe has a maximum frame unit of 720 ms period. In view of the system frame numbers, one superframe is composed of seventy-two radio frames. Each radio frame has a period of 10 ms, and a radio frame includes sixteen timeslots, each of which includes fields with corresponding information bits based on the DPCH.

FIG. 4 illustrates a frame structure of an uplink DPCH based on the 3GPP RAN standard. The uplink DPCH is provided with two types of channels, e.g., a dedicated physical data channel (DPDCH) and a dedicated physical control channel (DPCCH). The uplink DPDCH is adapted to transport the dedicated data and the uplink DPCCH is adapted to transport the control information.

The uplink DPCCH for the transport of the control information includes various fields such as a pilot field 21 of $N_{pilot}$ bits, a transmit power-control (TPC) field 22 of $N_{TPC}$ bits, a feedback information (FBI) field 23 of $N_{FBI}$ bits and an optional transport- combination indicator (TFCI) field 24 of $N_{TFCI}$ bits. The pilot field 21 includes pilot bits $N_{pilot}$ for supporting channel estimation for coherent detection. The TFCI field 4 supports the simultaneous provision of a plurality of services by the system. The absence of the TFCI field 4 in the uplink DPCCH signifies that the associated service is a fixed rate service. The parameter k determines the number of bits per uplink DPDCH/DPCCH slot. It is related to the spreading factor SF of the physical channel as $SF=256/2^k$. The spreading factor SF may thus range from 256 down to 4.

FIG. 5 is a table showing various information of the uplink DPCCH, wherein channel bit and symbol rates are those just prior to spreading. (At the time of this technical specification, the exact number of bits of the different uplink DPCCH fields of FIG. 4 ($N_{pilot}$, $N_{TPC}$, $N_{FBI}$, and $N_{TFCI}$) was not determined.)

FIG. 6 is a table illustrating pilot bit patterns of the uplink DPCCH, and more particularly, 6-bit and 8-bit pilot bit patterns for each slot. In FIG. 6, the non-shaded sequence is used for channel estimation, and shaded sequence can be used as frame synchronization words or sequences. The pilot bits other than frame synchronization word, e.g., channel estimation word, have a value of 1.

For example, in the case where each slot includes six pilot bits $N_{pilot}=6$, the sequences formed by slot #1 to slot #16 at bit #1, at bit #2, at bit #4, and at bit #5 are used as the frame synchronization words. In the case where each slot is composed of eight pilot bits ($N_{pilot}=8$), the sequences at bit #1, at bit #3, at bit #5, and at bit #7 are used as the frame synchronization words. In the case where the pilot bits of each sequences slot are either 6 or 8 in number, a total of four is used as the frame synchronization word. As a result, because one radio frame is provided with sixteen timeslots, the number of pilot bits used as the frame synchronization word is 64 bits per frame.

FIG. 7 shows a spreading/scrambling arrangement for the uplink DPCH based on the 3GPP RAN standard. The arrangement of FIG. 7 is provided for the execution of a quadrature phase shift keying (QPSK) operation where the uplink DPDCH and DPCCH are mapped into I and Q channel branches, respectively.

The spreading is an operation for switching all symbols through the respective channel branches to a plurality of chips. The I and Q channel branches are spread respectively at chip rates based on two different orthogonal variable spreading factors (OVSFs), or channelizing codes $C_D$ and $C_C$. The OVSF represents the number of chips per symbol on each channel branch. The spread of two channel branches are summed and then complex-scrambled by a specific complex scrambling code $C_{scramb}$. The complex- scrambled result is separated into real and imaginary and then transmitted after being placed on respective carriers.

FIG. 8 illustrates a frame structure of a downlink DPCH based on the 3GPP RAN standard. The number of pilot bits (or symbols) in the uplink DPCH is 6 or 8 because the uplink DPCH is activated at a fixed rate of 16 Kbps. However, since the downlink DPCH is activated at a variable rate, it has pilot symbol patterns illustrated in FIG. 9.

With reference to FIG. 8, similar to the uplink DPCH, the downlink DPCH is provided with two types of channels, e.g., a dedicated physical data channel (DPDCH) and a dedicated physical control channel (DPCCH). In the downlink DPCH, the downlink DPDCH is adapted to transport the dedicated data and the downlink DPCCH is adapted to transport the control information. The downlink DPCCH for transporting the control information is composed of various fields such as a pilot field 27, TPC field 26 and TFCI field 25. The pilot field 27 includes pilot symbols for supporting the channel estimation for coherent detection.

FIG. 9 is a table illustrating pilot symbol patterns contained in the downlink DPCCH, which are classified according to different symbol rates of the downlink DPCCH. For example, in the case where the symbol rate is 16, 32, 64 or 128 Kbps, each slot includes four pilot symbols for an I channel branch and four pilot symbols for a Q channel branch, totaling eight pilot symbols.

In FIG. 9, the non-shaded sequence is used for channel estimation and shaded sequences can be used as frame synchronization words. The remaining pilot symbols other than the frame synchronization word (e.g., channel estimation) have a value of 11. For example, in the case where the symbol rate is 16, 32, 64 or 128 Kbps, the sequences, formed by pilot symbols from slot #1 to slot #16, at symbol #1 and at symbol #3 are used as the frame synchronization words. Accordingly, because the number of pilot symbols used as the frame synchronization words is 4 per slot, 64 pilot symbols are used in each radio frame.

FIG. 10 illustrates a spreading/scrambling arrangement for the downlink DPCH based on the 3GPP RAN standard. The arrangement of FIG. 10 is provided for the spreading and scrambling of the downlink DPCH and a common control physical channel (CCPCH). A QPSK operation is performed with respect to a pair of symbols of the two channels in such a manner that they are serial-to-parallel converted and then mapped into I and Q channel branches, respectively.

The I and Q channel branches are spread respectively at chip rates based on two equal channelizing codes $C_{ch}$. The spread of the two channel branches are summed and then complex-scrambled by a specific complex scrambling code $C_{scramb}$. The complex-scrambled result is separated into real and imaginary and then transmitted, after being placed on respective carriers. Noticeably, the same scrambling code is used for all physical channels in one cell, whereas different channelizing codes are used for different physical channels. Data and various control information are transported to a receiver through the uplink and downlink DPCHs subjected to the above-mentioned spreading and scrambling.

The TS S1.11 v1.1.0 specification also specified a primary common control physical channel (PCCPCH), which is a fixed rate downlink physical channel used to carry the broadcast channel (BCH), and a secondary common control physical channel (SCCPCH) used to carry the forward access channel (FACH) and the paging channel (PCH) at a constant rate. FIGS. 11A and 11B illustrate the frame structure of PCCPCH and SCCPCH, each having a pilot field. The TS S1.11 v1.1.0 specification recommended the pilot patterns for the PCCPCH and SCCPCH. Further, the TS S1.11 v1.1.0 specification recommended the pilot pattern of the DPCH channel for the diversity antenna using open loop antenna diversity based on space time block coding based transmit diversity (STTD) and diversity antenna pilot patterns for PCCPCH and SCCPCH. Those patterns can be found in the TS S1.11 v1.1.0 specification, and detailed description is being omitted.

For frame synchronization, an autocorrelation function must be performed on the basis of the pilot pattern sequence. In the pilot sequence design, finding an autocorrelation of a sequence with the lowest out-of-phase coefficient is important to decrease the probability of false alarm regarding the synchronization. A false alarm is determined when a peak is detected when there should not be a peak detection.

Optimally, the result of the autocorrelation for a frame with a sequence at a prescribed pilot bit should have same maximum values at zero and middle time shifts of one correlation period, which are different in polarity, and the remaining sidelobes at time shifts other than zero and middle should have a value of zero. However, the various pilot patterns recommended in the TS S1.11 v1.1.0 do not meet this requirement, both in the uplink and downlink.

In an article entitled "Synchronization Sequence Design with Double Thresholds for Digital Cellular Telephone" by Young Joon Song et al. (Aug. 18–20, 1998), the present inventor being a co-author, the article describes a correlator circuit for GSM codes where the out-of-phase coefficients are all zero except one exception at zero and middle shift having a first peak and a second peak, where the first and second peaks are opposite in polarity, but the peaks are not equal to one another. Further, the article describes lowest out-of-phase coefficients of +4 and −4. However, the article does not provide how such sequences and autocorrelation can be used to achieve the above described optimal results, and the article does not provide sufficient disclosure that the sequences achieve or can achieve the lowest autocorrelation sidelobes.

As described above, the pilot patterns used as frame synchronization words or sequences do not achieve the optimal results. Further, the background pilot patterns do not rapidly and accurately perform the frame synchronization. Moreover, the above pilot patterns and frame synchronization sequences do not provide optimal cross-correlation and autocorrelation. Additionally, neither the TS specification nor the article provides a solution of the use of the pilot patterns for slot-by-slot double check frame synchronization scheme, and neither discloses the use of the frame synchronization sequence for channel estimation.

SUMMARY OF THE INVENTION

An object of the present invention is to obviate at least the problems and disadvantages of the related art.

An object of the present invention is to provide frame synchronization words resulting in optimal autocorrelation results.

A further object of the present invention is to eliminate or prevent sidelobes.

A further object of the present invention is to provide maximum values at zero and middle time shifts.

Another object of the present invention is to provide a synchronization word for at least one of rapid and accurate frame synchronization.

Another object of the present invention is to provide a slot-by-slot double check frame synchronization scheme.

Still another object of the present invention is to provide a frame synchronization word which can be used for channel estimation.

Still another object of the present invention is to provide good cross-correlation and autocorrelation simultaneously.

The present invention can be achieved in a whole or in parts by a method for confirming and establishing frame synchronization for sustaining the frame synchronization for a communication channel between a user and a network, the method comprising the steps of (1) establishing a chip synchronization for the communication channel; (2) as the chip synchronization is established, using the chip synchronization for establishing the frame synchronization; (3) determining maintenance of the established frame synchronization; and, (4) restoring the frame synchronization by using pilot bit patterns, when the frame synchronization is failed.

The present invention can be achieved in a whole or in parts by a method for confirming frame synchronization, comprising the steps of: establishing the frame synchronization in an uplink or downlink channel; and, confirming sustenance of the established frame synchronization by using a present pilot sequence, wherein the pilot sequence used in the confirmation of sustenance of the established frame synchronization provides maximum correlation results of opposite polarities at a starting point and a middle point of a frame correlation period.

The present invention can be achieved in a whole or in parts by a method for confirming frame synchronization, comprising the steps of (1) a network side or a user equipment side establishing the frame synchronization by using timing information from an opposite side; (2) confirming the established frame synchronization by using a pilot symbol pattern which provides a correlation value of "0" at points of a correlation period for each received frame except a starting point and a middle point thereof; and, (3) if it is determined in the step (2) that the frame synchronization is failed, carrying out the step (1) again.

The present invention can be achieved in a whole or in parts by a method for synchronizing a frame using an optimal pilot symbol, comprising the steps of: (1) receiving a pilot symbol of each slot in the frame through respective physical channels on a communication link; (2) correlating a received position of each of the pilot symbols to a corresponding pilot sequence; (3) combining and summing more than one results of the correlations, and deriving a final result from the correlations in which sidelobes from the results of the correlations are offset; and (4) synchronizing the frame using the final result.

The pilot symbols are combined into each of the pilot sequences such that the final result of the correlations shows sidelobes with 0" values excluding particular positions of correlation periods. The particular positions are starting points (x=0) of the correlation periods (x) and points of x /an integer. The pilot symbol is a combination of pilot symbols in a form of (a,/a). The pilot sequence provides least correlation resultants at positions excluding the starting points and half of the starting points in the correlation periods. The pilot symbols excluding the pilot symbols used in the correlation is used in a channel estimation for detecting coherent. The pilot symbol of each slot in the frame is transmitted, with the pilot symbol contained in a pilot field of an exclusive physical control channel among respective exclusive channels on the communication link. The pilot sequences different from each other on an up communication link are used in the correlation according to values of bits included in a pilot field of an exclusive physical control channel. The pilot sequences different from each other on a down communication link are used in the correlation according to a symbol rate of an exclusive physical control channel.

The present invention can be also achieved in a whole or in parts by a method for synchronizing a frame using an optimal pilot symbol, comprising the steps of: (1) receiving a pilot symbol of each slot in the frame through respective physical channels on a communication link; (2) correlating a received position of each of the pilot symbols to a corresponding pilot sequence; (3) combining and summing more than one results of the correlations, and deriving a final result from the correlations in which sidelobes from the results of the correlations have minimum values and the results of the correlations at starting points and middle points of correlation periods have maximum values with different polarity; and (4) synchronizing the frame using the final result.

The present invention can be achieved in a whole or in parts by a method of eliminating sidelobes in a communication channel between a base station and a mobile station, comprising the steps of: generating control signals and data signals within the communication channel, the control signals having a first sequence of L-bits and a second sequence of L-bits; generating a first set of prescribed values based on the first sequence, which has a first prescribed relationship with the first set of prescribed values; generating a second set of prescribed values based on the second sequence, which has a second prescribed relationship with the second set of prescribed values; and combining the first and second sets of prescribed values.

The present invention can be achieved in a whole or in parts by a method of establishing a communication channel, the method comprising the steps of: generating a plurality of frames; generating a L-number of slots for each frame, each slot having a pilot signal of N-bits and a corresponding bit in each slot forming a word of L-sequence of pilot bits such that there is N number of words, wherein the number of bit values of two pilot bits which are the same between two adjacent words from 1 to L slots minus the number of bit values of two pilot bits which are different between the two adjacent words from 1 to L is zero or a prescribed number close to zero.

The present invention can be achieved in a whole or in parts by a method of establishing a communication channel having at least one of frame synchronization and channel estimation, the method comprising the steps of: generating a plurality of frames; generating a L-number of slots for each frame, each slot having a pilot signal of N-bits and a corresponding bit in each slot forming a word of L-sequence of pilot bits such that there is N number of words, wherein the words have at least one of the following characteristics: cross-correlation between two adjacent sequences used for frame synchronization is zero at zero time shift, or cross-correlation between a word used for frame synchronization and a word used for channel estimation is zero at all time shifts.

The present invention can be achieved in a whole or in parts by a method of reducing sidelobes for frame synchronization, comprising the steps of: generating a plurality of frame synchronization words, each frame synchronization word having a plurality of bits; performing autocorrelation functions on a pair of frame synchronization words to generate a pair of prescribed value sets; and combining the pair of prescribed value sets such that two peak values equal in magnitude and opposite in polarity are achieved at zero and middle time shifts.

The present invention can be achieved in a whole or in parts by a method of generating pilot signals of a prescribed pattern within a frame having L-number of slots, comprising the steps of: generating N-number of pilot bits for each slot;

and forming N-number of words of L-bit based on above step, wherein a prescribed number of words is used for frame synchronization words and each frame synchronization word has a first prescribed number $b_0$ of bit values of "0" and a second prescribed number $b_1$ of bit values of "1", such that $b_1-b_0$ is equal to zero or a number close to zero.

The present invention can be achieved in a whole or in parts by a communication link between a user equipment and a base station comprising a plurality of layers, wherein one of the layers is a physical layer for establishing communication between the user equipment and the base station and the physical layer has at least one of data and control information, one of the control information being a pilot field of N-bits transmitted for L-number of slots such that N-number of words of L-bit are formed, wherein cross-correlation between two adjacent words used for frame synchronization is zero at zero time shift or cross-correlation between a word used for frame synchronization and a word used for channel estimation is zero at all time shifts.

The present invention can be achieved in a whole or in parts by a correlator circuit for at least one of a user equipment and a base station, comprising: a plurality of latch circuits, each latch circuit latching a word formed by a pilot bit from a plurality of slots; a plurality of correlators, each correlator coupled to a corresponding latch circuit and correlating the word to a set of prescribed values; and a combiner that combines the set from each correlator such that maximum peak values of equal in magnitude and opposite in polarity are formed at zero and middle time shifts.

The present invention can be achieved in a whole or in parts by a communication device comprising: means for transmitting at least one of data and control information; means for receiving at least one of data and control information, wherein the receiving means includes: a plurality of latch circuits, each latch circuit latching a word formed by a pilot bit from a plurality of slots; a plurality of correlators, each correlator coupled to a corresponding latch circuit and correlating the word to a set of prescribed values; a plurality of buffers, each buffer coupled to a corresponding correlator to store the set of prescribed values; and a combiner that combines the set from each buffer such that maximum peaks of equal in magnitude and opposite in polarity are formed at zero and middle time shifts.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 illustrates these three different propagation phenomena;

FIG. 3 depicts a block diagram of a transmitter and a receiver for time multiplexed pilot symbols;

FIG. 12A is a table illustrating the frame synchronization words $C_1$ to $C_{i-th}$ in accordance with a preferred embodiment of the present invention;

FIG. 12B is a table illustrating the autocorrelation function of the sequences of pilot bits;

FIGS. 14A and 14B are tables illustrating the pilot patterns in accordance with a preferred embodiment of the present invention for uplink DPCCH;

FIG. 14C is a table illustrating the mapping relationship between the 8 synchronization words $C_1-C_8$ of FIG. 12A and shaded pilot bit patterns of FIGS. 14A and 14B;

FIG. 14E is a table illustrating the correlation results at points $A_1-A_4$, and the summing of the correlation results at point B of FIG. 14D.

FIG. 14F is a table illustrating various results of the addition of correlation results based on the uplink pilot patterns of the frame synchronization words in accordance with the preferred embodiment of the present invention;

FIG. 15A illustrates the pilot symbol patterns for downlink DPCH;

FIG. 15B illustrates the mapping relationship between the 8 frame synchronization words of FIG. 12A, and shaded pilot symbol pattern of FIG. 15A;

FIG. 16A illustrates pilot symbol pattern of PCCPCH;

FIG. 16B illustrates the mapping relationship between the synchronization words $C_1-C_8$ of FIG. 12A, and the shaded pilot symbol patterns of FIG. 16A;

FIG. 16C illustrates pilot symbol pattern of SCCHPCH;

FIG. 16D illustrates the mapping relationship between the synchronization words $C_1-C_8$ of FIG. 12A, and the shaded pilot symbol patterns of FIG. 16C;

FIG. 19A illustrates pilot symbol patterns of downlink DPCH for the diversity antenna using a space time block coding based transmit diversity (STTD);

FIG. 19B illustrates the mapping relationship between the 8 words $C_1$–$C_8$ of FIG. 12A and shaded pilot symbol patterns of FIG. 19A;

FIG. 19C illustrates the diversity antenna pilot symbol pattern for PCCPCH;

FIG. 19D illustrates the mapping relationship between the words $C_1$–$C_8$ of FIG. 12A and shadowed pilot symbol patterns of FIG. 19C;

FIG. 19E illustrates the pilot symbol pattern for the diversity antenna when STTD encoding is used on the SCCPCH;

FIG. 19F illustrates the mapping relationship between the words $C_1$–$C_8$ of FIG. 12A and shaded pilot symbol patterns of FIG. 19E;

FIG. 20A is a table illustrating frame synchronization words $C_1$–$C_{16}$ (i=16) and autocorrelated function in accordance with another preferred embodiment of the present invention;

FIG. 20B is a table illustrating the autocorrelation function of the pilot bits of each frame synchronization word classified in the PCSP;

FIG. 20C illustrates the pilot bit pattern of uplink DPCCH;

FIG. 20D illustrates a mapping relationship between the alternative frame synchronization words $C_1$–$C_{16}$ of FIG. 20A and the shaded frame synchronization words of FIG. 20C;

FIGS. 20E and 20F illustrate the pilot symbol pattern of downlink DPCH;

FIG. 20G illustrates a mapping relationship between the alternative frame synchronization words $C_1$–$C_{16}$ of FIG. 20A and the shaded frame synchronization words of FIGS. 20E and 20F;

FIG. 20H illustrates the pilot symbol pattern of downlink PCCPCH;

FIG. 20I illustrates a mapping relationship between the alternative frame synchronization words $C_1$–$C_{16}$ of FIG. 20A and the shaded frame synchronization words of FIG. 20H.

FIG. 21 illustrates a preferred embodiment for the new frame synchronization words $C_1$–$C_{i\text{-}th}$;

FIG. 22A illustrates the addition of two auto-correlation functions;

FIG. 22B illustrates the addition of two cross-correlation functions between the two frame synchronization words within the same class;

FIG. 23A illustrates the pilot bit patterns on uplink DPCCH with $N_{pilot}$=2, 3, and 4;

FIG. 23C illustrates the pilot bit patterns on uplink DPCCH with $N_{pilot}$=2, 3, and 4 in accordance with an alternative embodiment compared to FIG. 23A;

FIGS. 23E and 23F illustrate the pilot bit patterns on uplink DPCCH with $N_{pilot}$=5, 6, 7, and 8;

FIGS. 23B and 23D illustrate the mapping relationship between the frame synchronization words of FIG. 21, and shaded frame synchronization words of FIGS. 23A and 23D, respectively;

FIG. 23G illustrates the mapping relationship between the frame synchronization words of FIG. 21, and the shaded frame synchronization words of FIGS. 23E and 23F;

FIG. 24A illustrates the pilot symbol patterns on downlink DPCH when $N_{pilot}$=2, 4, 8, and 16;

FIG. 24B illustrates the mapping relationship between the frame synchronization words $C_1$–$C_8$ of FIG. 21 and shaded pilot symbol patterns of FIG. 24A;

FIG. 24C illustrates the pilot symbol patterns of downlink DPCH for the diversity antenna using STTD;

FIG. 24D illustrates the mapping relationship between the frame synchronization words $C_1$–$C_8$ of FIG. 21 and shaded pilot symbol patterns of FIG. 24C;

FIG. 25A illustrates the pilot symbol patterns for downlink SCCPCH for $N_{pilot}$=8 and 16;

FIG. 25B illustrates the mapping relationship of the frame synchronization words $C_1$–$C_8$ of FIG. 21 and shaded pilot symbol patterns of FIG. 25A;

FIG. 25C illustrates the pilot symbol patterns of downlink SCCPCH for $N_{pilot}$=8 and 16 for the diversity antenna using STTD;

FIG. 25D illustrates the mapping relationship between the frame synchronization words $C_1$–$C_8$ of FIG. 21 and shaded pilot symbol patterns of FIG. 25C;

FIG. 27 is a comparision chart between the embodiments for 15 timeslots and 16 slots;

FIG. 31A illustrates an outline of the synchronization establishment procedures of the dedicated physical channel when there exist no uplink DPCCH/DPDCH.

DETAILED DESCRIPTION OF PREFERRED EMBODIMENTS

Figure 1:
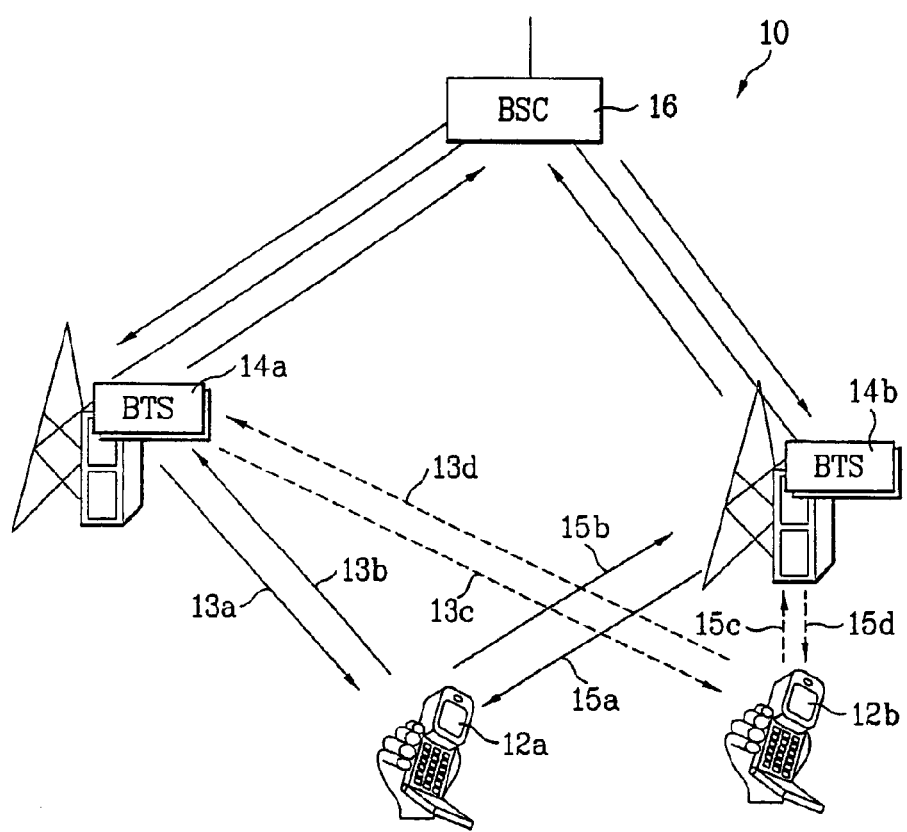
FIG. 1 generally illustrates a system, which uses CDMA modulation techniques in communication between user and base stations.

The new frame synchronization words in accordance with the preferred embodiment have the lowest out-of-phase values of autocorrelation function with two peak values equal in magnitude and opposite in polarity at zero and middle shifts. The frame synchronization words are suitable for frame synchronization confirmation since by simply adding autocorrelation functions of such words, double maximum correlation values equal in magnitude and opposite polarity at zero and middle shifts can be achieved. This property can be used to double-check frame synchronization timing and reduce the synchronization search time.

The UE establishes downlink chip synchronization and frame synchronization based on the Primary CCPCH synchronization timing and the frame offset group, slot offset group notified from the network. The frame synchronization can be confirmed using the frame synchronization word. The network establishes uplink channel chip synchronization and frame synchronization based on the frame offset group and slot offset group. The frame synchronization can also be confirmed using the frame synchronization word.

When long scrambling code is used on uplink channels or downlink channels, failure in frame synchronization confirmation using frame synchronization words always means losing frame and chip synchronizations since the phase of long scrambling code repeats every frame. Whereas in the case of short scrambling code on uplink DPCCH, failure in frame synchronization confirmation does not always implies losing chip synchronization since the length of short scrambling code is 256 and it corresponds to one symbol period of uplink DPCCH with SF=256. Thus, the frame synchronization word of pilot pattern can detect synchronization status and this information can be used in RRC Connection Establishment and Release Procedures of Layer 2.

FIG. 12A is a table illustrating the frame synchronization words $C_1$ to $C_{i-th}$ in accordance with a preferred embodiment of the present invention, where each word comprises L number (L>1) of sequence of pilot bits from a prescribed bit position of the $N_{pilot}$ bits ($N_{pilot}$>0) from each slot of L number of slots. In the preferred first embodiment described hereinafter, the number of synchronization words i equals 8, the number of slots L=16 and the number of pilot bits $N_{pilot}$ in each slot is between 4 and 16, but the present invention is applicable to different variations of i, L, and $N_{pilot}$.

The synchronization words $C_1$–$C_8$ of the preferred embodiment can be divided into 4 classes (E–H, referred to as Preferred Correlation Sequence Pair (PCSP)) according to the autocorrelation function of the synchronization words, as follows:

E={$C_1$, $C_5$}
F={$C_2$, $C_6$}
G={$C_3$, $C_7$}
H={$C_4$, $C_8$}

FIG. 12B is a table illustrating the autocorrelation function of 1 to 16 sequences of pilot bits of each frame synchronization word classified in classes E, F, G and H within one correlation period from a time shift of 0 to 15. As shown in FIGS. 12A and 12B, each class contains 2 sequences, and sequences of the same class have the same autocorrelation function. From FIG. 12B, the synchronization words have the lowest out-of-phase values of autocorrelation function with two peak values equal in magnitude and opposite in polarity at zero and middle shifts. Moreover, the results $R_1$ and $R_2$ of the autocorrelation function are complements of each other. The following relationships between the autocorrelation functions are expressed in equations (1)–(4):

$$R_E(\tau)=R_F(\tau)=R_G(\tau)=R_H(\tau), \tau \text{ is even} \qquad (1)$$

$$R_E(\tau)=-R_F(\tau), \tau \text{ is odd} \qquad (2)$$

$$R_G(\tau)=-R_H(\tau), \tau \text{ is odd} \qquad (3)$$

$$R_i(\tau)+R_i(\tau+8)=0, i \in \{E,F,G,H\}, \text{for all } \tau \qquad (4)$$

From equations (1), (2), and (3), the following equation is obtained.

$$R_E(\tau)+R_F(\tau)=R_G(\tau)+R_H(\tau), \text{ for all } \tau \qquad (5)$$

Figure 13A:
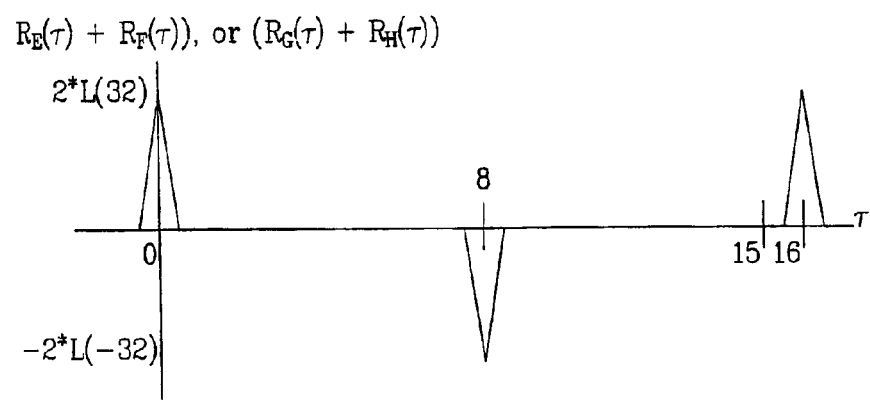
FIG. 13A illustrates addition of two autocorrelation functions.

The addition of two autocorrelation functions $R_E(\tau)$ and $R_F(\tau)$, or $R_G(\tau)$ and $R_H(\tau)$ becomes the function with two peak values equal in magnitude and opposite in polarity at zero and middle shifts, and all zero values except the zero and middle shifts, which is depicted in FIG. 13A, where the peak values equal 2 $\mu$L or $-2*L$. In the preferred embodiment, the peak values of FIG. 13A are 32 and $-32$, since L=16. The other combinations such as ($R_E(\tau)+R_G(\tau)$), ($R_E(\tau)+R_H(\tau)$), ($R_F(\tau)+R_G(\tau)$), and ($R_F(\tau)+R_H(\tau)$) do not have the same value as in FIG. 13A. By using the derived properties of the frame synchronization words, the following property is achieved.

$$\sum_{i=1}^{2\alpha} R_i(\tau) = \alpha \cdot (R_E(\tau) + R_F(\tau)), 1 \leq \alpha \leq 4 \qquad (6)$$

where $R_i(\tau)$ is the autocorrelation function of sequence $C_i$, $1 \leq i \leq 8$.

Figure 13B:
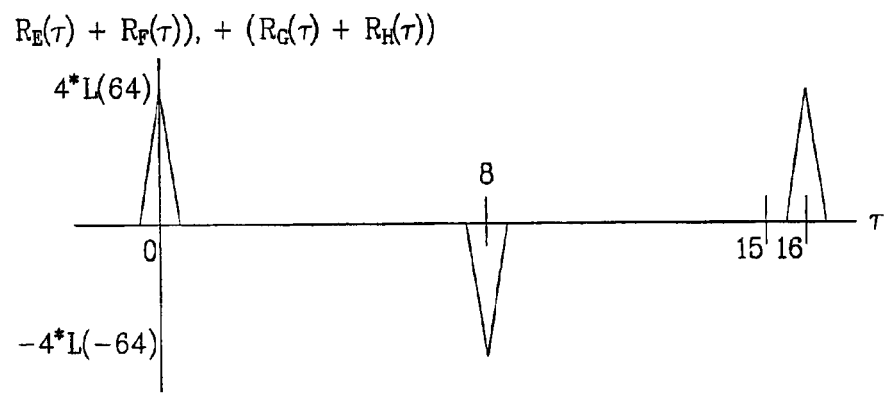
FIG. 13B illustrates addition of the four autocorrelation functions.

The addition of the four autocorrelation functions is illustrated in FIG. 13B, which is the same as FIG. 13B except that the maximum value is doubled to $4*L$ or $-4*L$ (the maximum values being 64 and $-64$ for the preferred embodiment) since ($R_E(\tau)+R_F(\tau)+R_G(\tau)+R_H(\tau)=2(R_E(\tau)+R_F(\tau)$) by equations (5) and (6). This property allows the double-checking of the frame synchronization timing and the reduction of the synchronization search time.

First Embodiment for Uplink DPCCH

FIGS. 14A and 14B are tables illustrating the pilot patterns in accordance with a preferred embodiment of the present invention for uplink DPCCH with $N_{pilot}$=5, 6, 7, and 8. The shaded pattern of FIGS. 14A and 14B are used for frame synchronization (which can also be used for channel estimation), and the pilot bit other than the frame synchronization words (e.g., channel estimation) has a value of 1. FIG. 14C is a table illustrating the mapping relationship between the 8 synchronization words $C_1$–$C_8$ of FIG. 12A and shaded pilot bit patterns of FIGS. 14A and 14B, where frame synchronization words $C_1$, $C_2$, $C_3$, and $C_4$ are the elements of the set {E, F, G, and H}, respectively. The results of FIGS. 13A and 13B are obtained by α=1 and 2 in equation (6), respectively, which allows a double-check of the frame synchronization timing and a reduction of the synchronization time on uplink DPCCH with $N_{pilot}$=5, 6, 7, and 8.

For example, the frame synchronization words at bit #1 ($C_1$), at bit #2 ($C_2$), at bit #4 ($C_3$) and at bit #5 ($C_4$) are used in the autocorrelation process for the frame synchronization when $N_{pilot}$=6. For $N_{pilot}$=8, the frame synchronization words at bit #1 ($C_1$), at bit #3 ($C_2$), at bit #5 ($C_3$) and at bit #7 ($C_4$) are used in the autocorrelation process for the frame synchronization. For $N_{pilot}$=5, 6, 7, and 8 in each slot, a total of four frame synchronization words are used. As a result, since one radio frame has sixteen timeslots, the number of pilot bits used for the frame synchronization is only 64 per frame in the preferred embodiment. As can be appreciated, the number of words used for frame synchronization can vary depending on variations of $N_{pilot}$. For example, when $N_{pilot}$=1, one of the frame synchronization words $C_1$–$C_8$ can be used for both frame synchronization and channel estimation due to the novel feature of the preferred embodiment.

Figures 4, 5:
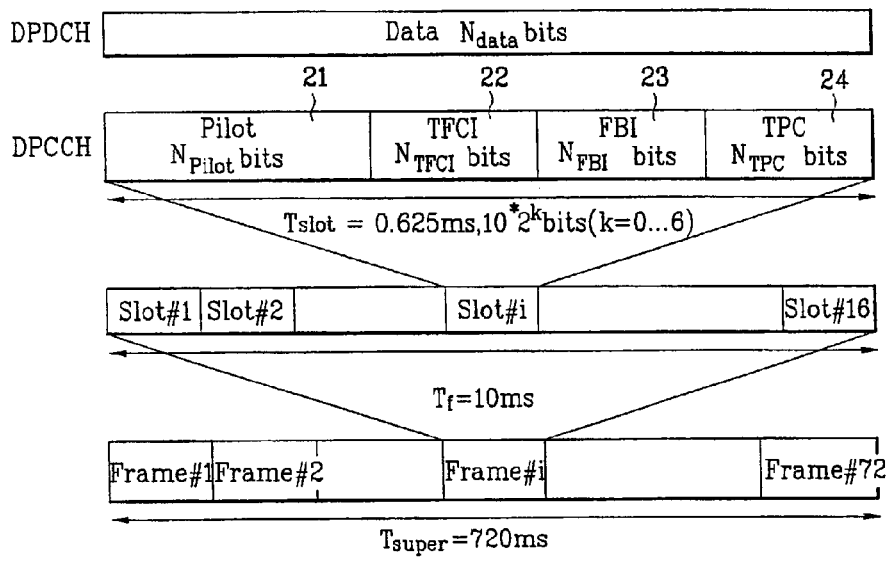
FIG. 4 illustrates a frame structure of an uplink DPCH based on the 3GPP RAN standard.
FIG. 5 is a table showing various information of the uplink DPCCH.
Figures 6, 7:
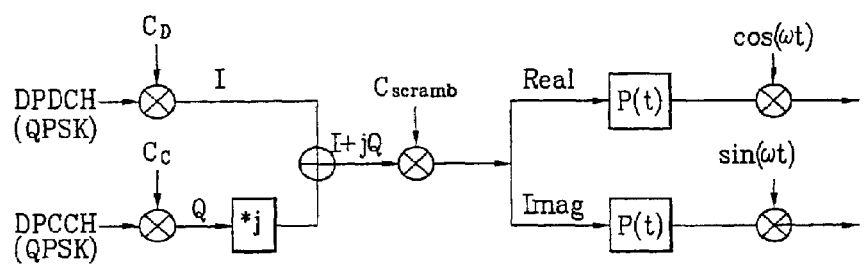
FIG. 6 is a table illustrating pilot bit patterns of the uplink DPCCH.
FIG. 7 shows a spreading/scrambling arrangement for the uplink DPCH based on the 3GPP RAN standard.

With the implementation of the novel pilot patterns, the values for the number of bits per field are shown below in Table 1 and Table 2, with reference to FIG. 4. The channel bit and symbol rates given in Table 1 are the rates immediately before spreading.

TABLE 1

DPDCH fields

| Channel Bit Rate (kbps) | Channel Symbol Rate (ksps) | SF | Bits/ Frame | Bits/ Slot | $N_{data}$ |
|---|---|---|---|---|---|
| 16 | 16 | 256 | 160 | 10 | 10 |
| 32 | 32 | 128 | 320 | 20 | 20 |
| 64 | 64 | 64 | 640 | 40 | 40 |
| 128 | 128 | 32 | 1280 | 80 | 80 |
| 256 | 256 | 16 | 2560 | 160 | 160 |
| 512 | 512 | 8 | 5120 | 320 | 320 |
| 1024 | 1024 | 4 | 10240 | 640 | 640 |

There are two types of Uplink Dedicated Physical Channels; those that include TFCI (e.g. for several simultaneous services) and those that do not include TFCI (e.g. for fixed-rate services). These types are reflected by the duplicated rows of Table 2. The channel bit and symbol rates given in Table 2 are the rates immediately before spreading.

TABLE 2

DPCCH fields

| Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{FBI}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | 6 | 2 | 0 | 2 |
| 16 | 16 | 256 | 160 | 10 | 5 | 1 | 2 | 2 |

Figure 14D:
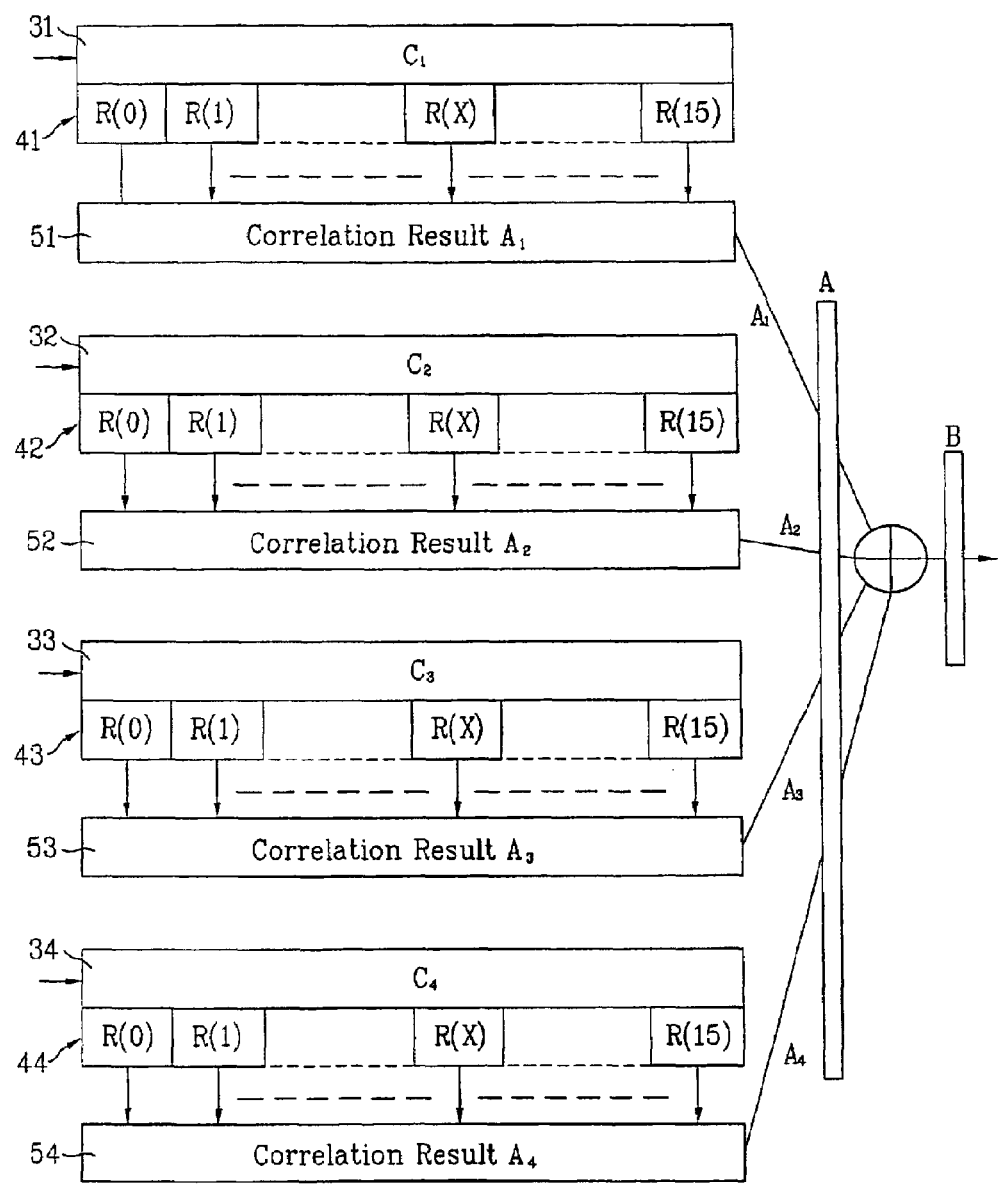
FIG. 14D illustrates a correlation circuit for frame synchronization based on pilot bits of the uplink DPCCH in accordance with a preferred embodiment of the present invention.

FIG. 14D illustrates a correlation circuit for frame synchronization based on pilot bits of the uplink DPCCH in accordance with a preferred embodiment of the present invention when frame synchronization words $C_1$–$C_4$ are used. The frame synchronization words $C_1$–$C_4$ are latched in latch circuits 31–34, respectively. The correlators 41–44 perform correlation function R(x), where x=0 to L−1, of the frame synchronization words $C_1$–$C_4$, respectively, to generate the correlation results $A_1$–$A_4$, which are stored in buffers 51–53.

FIG. 14E is a table illustrating the correlation results at points $A_1$–$A_4$, and the summing of the correlation results at point B. As shown, the result has maximum values of opposite polarity at zero and middle time shifts R(0) and R(8). Further, the remaining sidelobes at time shifts other than zero and middle have values of zero after the addition at point B. The sidelobes are eliminated or minimized, and the results at point B correspond to the optimal results of FIG. 13B.

FIG. 14F is a table illustrating various results of the addition of correlation results of points $A_1$–$A_4$ based on the uplink pilot patterns of the frame synchronization words $C_1$–$C_4$ in accordance with the preferred embodiment of the present invention. The respective addition of the autocorrelation results of points ($A_1$+$A_2$), ($A_3$+$A_4$), ($A_1$+$A_4$) and ($A_2$+$A_3$) exhibit the same characteristics of the optimal results illustrated in FIG. 13A.

Figure 14G:
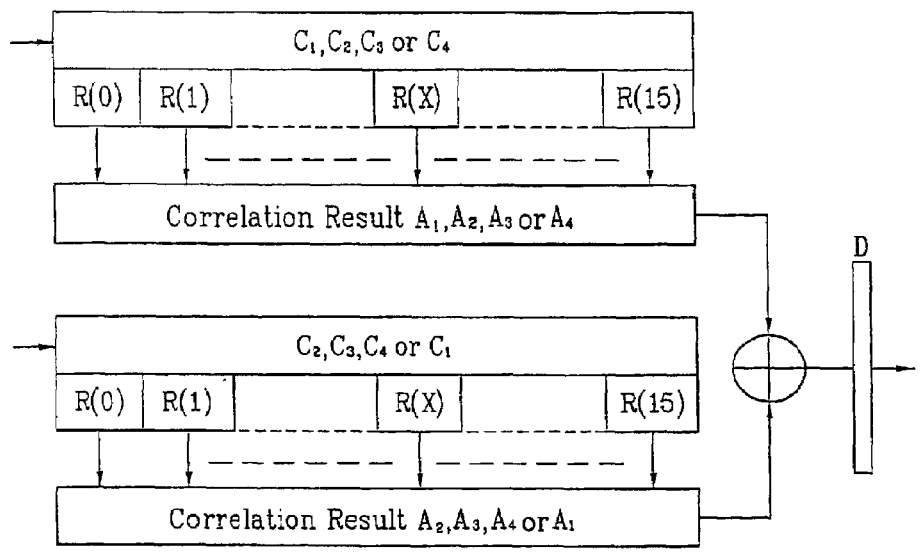
FIG. 14G illustrates a correlator circuit for frame synchronization based on pilot bit sequences of an uplink DPCCH in accordance with an alternative embodiment.

FIG. 14G illustrates a correlator circuit for frame synchronization based on pilot bit sequences of an uplink DPCCH in accordance with an alternative embodiment. The elements are the same as the correlator circuit of FIG. 14D. The frame synchronization words of ($C_1$ and $C_2$), ($C_2$ and $C_3$), ($C_3$ and $C_4$), or ($C_4$ and $C_1$) are correlated and summed to provide the results at point D. The summation result at point D of FIG. 14G is similar to the correlator circuit of FIG. 14D other than the maximum values of opposite polarity being 2 $\mu$L (32) and −2 $\mu$L (−32), rather than 4*L (64) and −4*L (−64), respectively, corresponding to the results of FIG. 14F and optimal results of FIG. 13A.

Figure 14H:
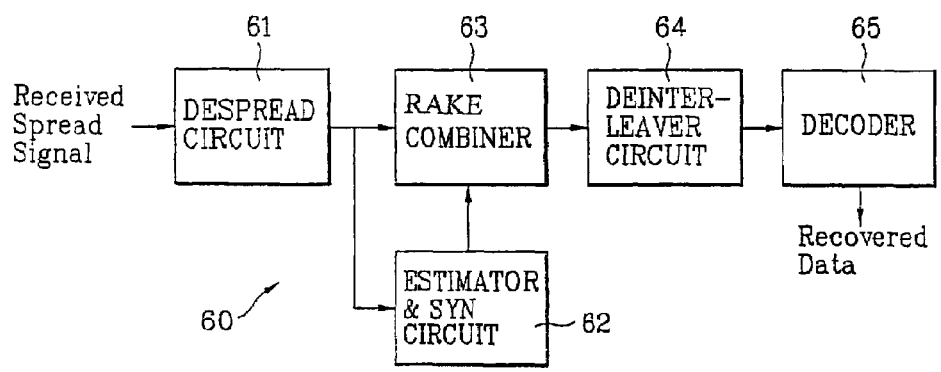
FIG. 14H illustrates the receiver circuit of a base station or a user equipment to recover the received spread signal including the frame synchronization words in the pilot field.

FIG. 14H illustrates the receiver circuit 60 of a base station or a user equipment to recover the received spread signal including the frame synchronization words in the pilot field. After despreading the received spread signal by the despreading circuit 61, the channel estimator and frame synchronizer 62 performs the channel estimation and the frame synchronization based on the pilot field. The Rake combiner 63 uses the results of the channel estimator and frame synchronizer, and after rake combining, the data is deinterleaved by the deinterleaving circuit 64 in the reverse order of the transmitter side. Thereafter, the data is recovered after decoding by a decoder 65.

Figures 14I, 14J:
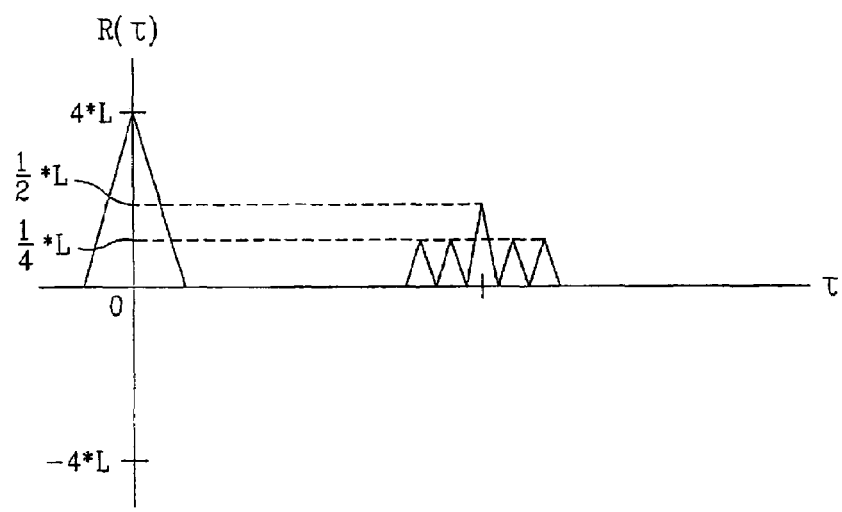
FIG. 14I illustrates results of correlation circuit using the pilot pattern of the technical specification.
FIG. 14J illustrates a time shift graph of the summation of results of FIG. 14I.

The advantages of the present invention can be readily discerned based on comparison of the frame synchronization words previously recommended in TS S1.11 v1.1.0 specification and the frame synchronization words for, e.g., $N_{pilot}$=6. Applying the same principle of equations (1)–(6) and the correlator circuit of FIG. 14D, the results in FIG. 14I are obtained for the pilot pattern indicated in the technical specification. When the summation result at point B is mapped on a time shift graph, the problem of sidelobes is readily apparent, as shown in FIG. 14J. In other words, there is no maximum peak values of opposite polarity at zero and middle time shifts, and sidelobes are present at time shifts other than zero and middle.

As described in the background art, obtaining good cross-correlation and autocorrelation simultaneous is difficult to achieve, where cross-correlation relates to different words at different time shifts and autocorrelation relates to same sequences which are time shifted version. The good cross-correlation and autocorrelation of the present invention is based on unique properties of the frame synchronization words.

The unique characteristics of the frame synchronization words in accordance with the preferred embodiment can be readily discerned in view of FIGS. 12, 14A and 14B. As shown in frame synchronization words $C_1$–$C_8$ of FIG. 12, each word has substantially the same number of 1 and 0. In other words, the number ($b_1$) of pilot bits of a frame synchronization words having a value of 1 minus the number ($b_0$) of pilot bits of the frame synchronization having a value of 0 is equal to zero or close to zero. In the preferred embodiment, when there are even number of slot numbers, there are the same number of pilot bits having a value of 1 and 0 in a single frame synchronization word such that $b_1$–$b_0$ is zero. As can be appreciated, when there are an odd number of pilot bits in a single frame synchronization word, the result of $b_1$–$b_0$ is plus or minus one, e.g., close to zero.

The second characteristic of the frame synchronization words can be discerned by an examination between a pair of adjacent frame synchronization words (shaded patterns of FIGS. 14A and 14B for $N_{pilot}$=5, 6, and 7), or between a pair of adjacent frame synchronization word and channel estimation word (shaded and non-shaded patterns of FIGS. 14A and 14B for $N_{pilot}$=5, 6, 7, and 8). Generally, the number ($b_3$) of bit values which are the same (0, 0 and 1, 1) between a pair of adjacent words (i.e., between two adjacent frame synchronization words, or between a frame synchronization word and a channel estimation word, which are adjacent) minus the number ($b_4$) of bit values which are different (1, 0 or 0, 1) between adjacent words (i.e., between two adjacent frame synchronization words, or between a frame synchronization word and a channel estimation word, which are adjacent) equals zero or a prescribed number close to zero.

In the preferred embodiment, the number ($b_3$) of pilot bit values which are the same between two adjacent words equals the number ($b_4$) of pilot bit value which are different between the two adjacent words, i.e., $b_3$–$b_4$=0. In the preferred embodiment, when the $N_{pilot}$=5, between two synchronization words of $C_1$ at bit #0 and $C_2$ at bit #1, there same number of pilot bit values which are the same (0,0 and 1,1) and pilot bit values which are different (1,0 and 0,1) from slot #1 to slot #16, as shown in FIG. 14A. Similarly, between a synchronization word $C_2$ at bit #1 and a channel estimation word at bit #2, there same number of pilot bit values which are the same (0,0 and 1,1) and pilot bit values which are different (1,0 and 0,1) from slot #1 to slot #16. The same applies between two adjacent words at bit #2 and bit #3, and between two adjacent words at bit #3 and bit #4. The above also applies to adjacent words of $N_{pilot}$=6, 7 and 8. As can be appreciated, when an odd number of slots are used, the result of $b_3$–$b_4$ equals plus or minus one, e.g., close to zero.

As a result of such a characteristic, cross-correlation between two adjacent words used for frame synchronization is zero (orthogonal) at zero time shift. Further, the cross-correlation between a word used for frame synchronization and the sequence used for channel estimation is zero (orthogonal) at all time shifts. In other word, within $N_{pilot}$ number of words of L-bits, there are an even number of words used for frame synchronization, but all words perform channel estimation, wherein between adjacent words used for frame synchronization, there is substantially zero cross-correlation. Moreover, the words used for frame synchronization has substantially zero cross-correlation with words not used for frame synchronization, i.e., channel estimation, at any time shifts.

Further, each $N_{pilot}$ words corresponds to a prescribed number by an autocorrelation function such that when a pair from a set of autocorrelated results corresponding to words used for frame synchronization is combined, two peak values equal in magnitude and opposite in polarity are achieved at zero and middle time shift while sidelobes are substantially eliminated at time shifts other than zero and middle. Autocorrelation in accordance with the present invention can be generally defined as a correlation between a word and its time shifted replica (including replica at zero time shift), where correlation is the number of bit values which are the same between two words minus the number of bit values which are different between the same two words. Further, as shown in FIG. 12B, $R_1$ and $R_2$ are complements of each other.

First Embodiment for Downlink DPCH

FIG. 15A illustrates the pilot symbol patterns for downlink DPCH for $N_{pilot}$=4, 8 and 16, where two pilot bits form a symbol since the left bit is used for the I channel branch and the right bit is used for the Q channel branch. In the preferred embodiment, $N_{pilot}$=4 can be used for 8 ksps (kilo symbols per second); $N_{pilot}$=8 can be used for 16, 32, 64, and 128 ksps; and $N_{pilot}$=16 can be used for 256, 512, and 1024 ksps. The shaded symbols of FIG. 15A can be used for frame synchronization, and the value of pilot symbol other than for frame synchronization word, e.g., channel estimation (channel estimation word), is 11. The results of FIG. 15A is obtained by allowing $\alpha$=1 for $N_{pilot}$=4, $\alpha$=2 for $N_{pilot}$=8, and $\alpha$=4 for $N_{pilot}$=16 in equation (6) for downlink DPCH.

FIG. 15B illustrates the mapping relationship between the 8 frame synchronization words of FIG. 12A, and shaded pilot symbol pattern of FIG. 15A. For example, in the preferred embodiment of $N_{pilot}$=4 the symbol #1 includes two frame synchronization words of $C_1$ (for the I channel branch I-CH, i.e., left sequence of bits from slot #1 to slot #16) and $C_2$ (for the Q channel branch Q-CH, i.e., right sequence of bits from slot #1 to slot #16). For $N_{pilot}$=8 and $N_{pilot}$=16, the correspondence of words to channels for corresponding symbols is self-explanatory in FIG. 15B. Similar to the uplink DPCCH, slot-by-slot double-check of the frame synchronization timing and a reduction of the frame synchronization search time can be achieved by using the autocorrelation property of the pilot symbol pattern based on equation (6).

Because the frame synchronization words of the downlink DPCH is based on frame synchronization words of FIG. 12A, the characteristics described for uplink DPCCH is applicable to downlink DPCH. For example, the number ($b_3$) of bit values which are the same (0,0 and 1,1) between adjacent words (i.e., between synchronization word of I channel branch and synchronization word of Q channel branch of a frame synchronization symbol, or between a channel estimation word of the Q channel branch and a frame synchronization word of the I channel branch, which are adjacent, or between a frame synchronization word of the Q channel branch and a channel estimation word of the I channel branch, which are adjacent) minus the number ($b_4$) of bit values which are different (1,0 and 0,1) between adjacent words (i.e., between synchronization word of I channel branch and synchronization word of Q channel branch of a frame synchronization symbol, or between a channel estimation word of the Q channel branch and a frame synchronization word of the I channel branch, which are adjacent, or between a frame synchronization word of the Q channel branch and a channel estimation word of the I channel branch, which are adjacent) equals zero or a prescribed number close to zero.

For example, for $N_{pilot}=8$, between the symbols #0 and #1, the number of a pair of adjacent bits, i.e., one bit from the Q channel branch of the symbol #0 and one bit from the I channel branch of the symbol #1, having bit values of 1,1 and 0,0 is the same as the number of adjacent bits having bit values of 1,0 and 0,1. In other words, $b_3-b_4=0$. As can be appreciated, if the number of slots L is an odd number, the result of $b_3-b_4$ is plus or minus one, e.g., a prescribed number close to zero.

Figures 8, 9:
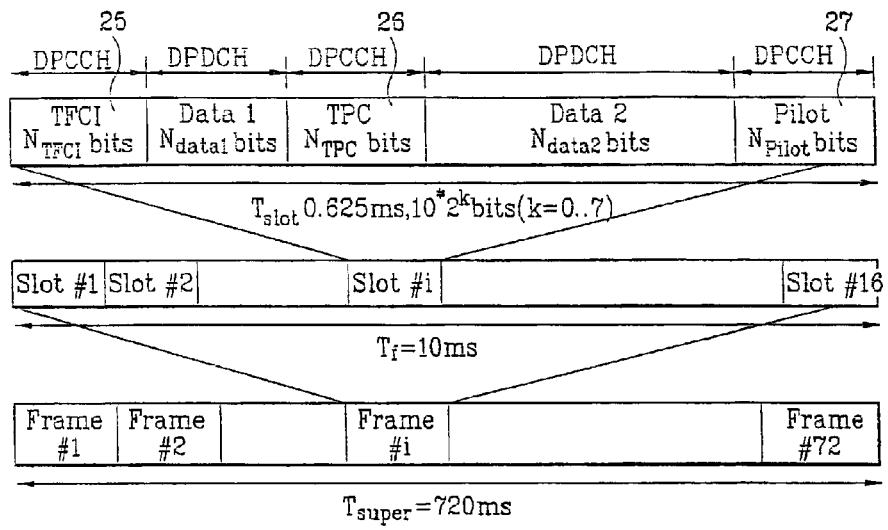
FIG. 8 illustrates a frame structure of a downlink DPCH based on the 3GPP RAN standard.
FIG. 9 is a table illustrating pilot symbol patterns contained in the downlink DPCCH.
Figure 10:
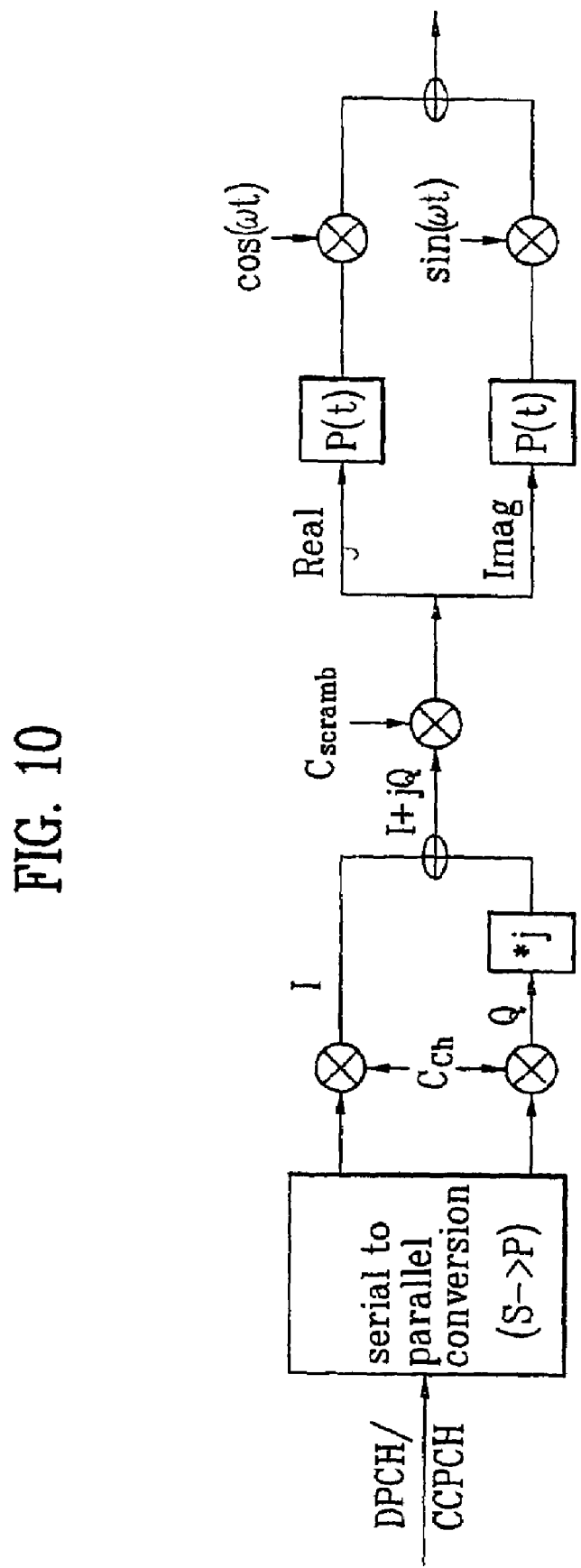
FIG. 10 illustrates a spreading/scrambling arrangement for the downlink DPCH based on the 3GPP RAN standard.

With the implementation of the novel pilot symbols, the below Table 3 shows the number of bits per slot of the various fields with reference to FIG. 8. There are basically two types of downlink Dedicated Physical Channel; those that include TFCI (e.g. for several simultaneous services) and those that do not include TFCI (e.g. for fixed-rate services). These types are reflected by the duplicated rows of Table 3. The channel bit and symbol rates given in Table 3 are the rates immediately before spreading. If there is no TFCI, then the TFCI field is left blank (*).

For $N_{pilot}=4$ in the downlink DPCCH, the correlator circuit of FIG. 14G can be used. In such a case, the I and Q channel frame synchronization words are inputted to the correlator circuit. The summation result would be the same as FIG. 14F, which corresponds to the optimal results of FIG. 13A. In this case, the number of pilot symbols (or pilot bits) used for the frame synchronization is 1 symbol per slot (or 2 bits per slot), and 16 symbols (or 32 pilot bits) are used in each radio frame for the frame synchronization.

Figure 15C:
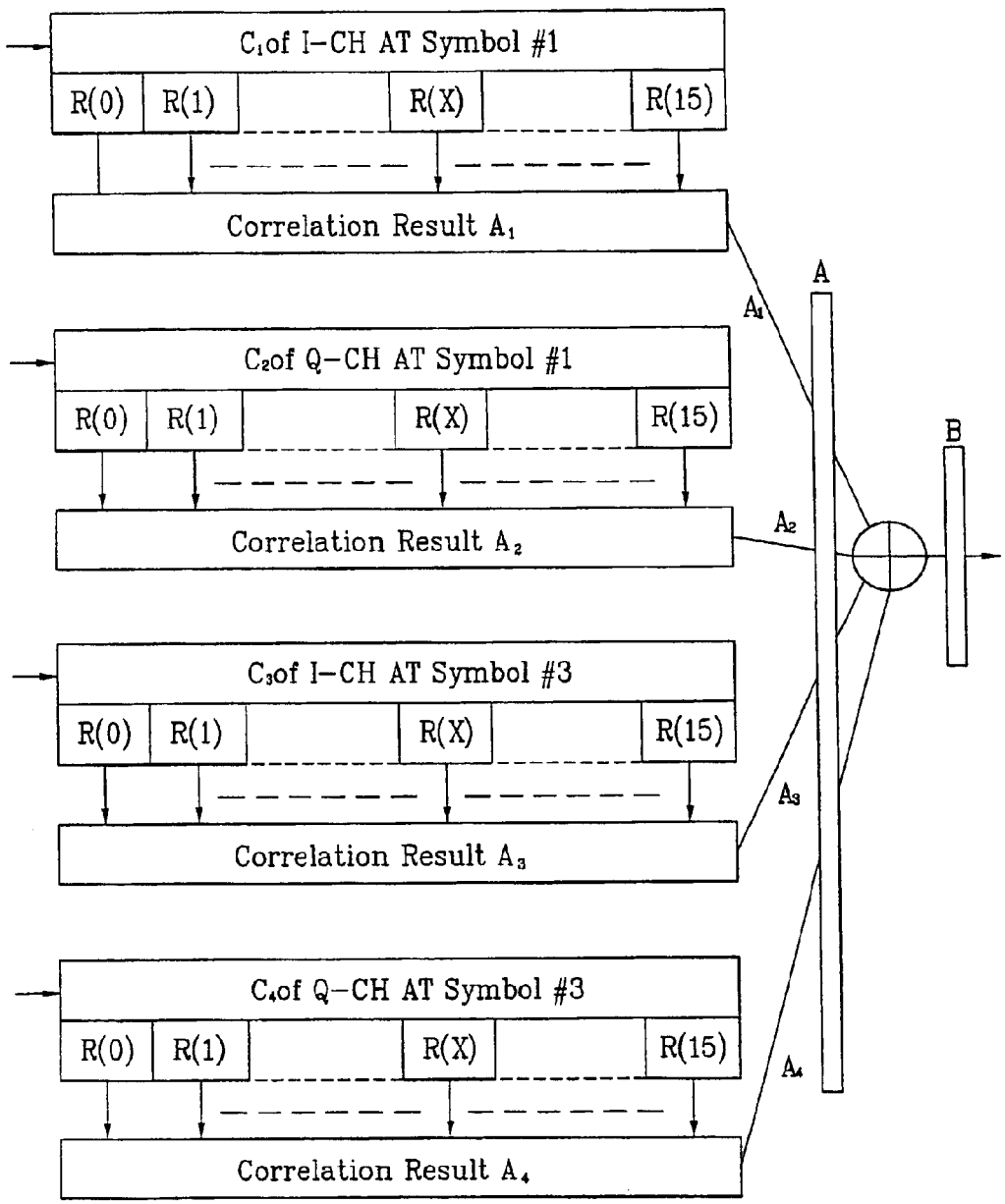
FIG. 15C illustrates a correlation circuit for frame synchronization for downlink DPCCH in accordance with the preferred embodiment.

As per $N_{pilot}=16$ in the downlink DPCCH, the correlation circuit of FIG. 15C can be expanded to accommodate the additional frame synchronization words of the I and Q channel branches of pilot symbol #5 and symbol #7. The summation result would be similar to the optimal results of FIG. 13B, but the maximum peak values of opposite polarity would be 128 (8 $\mu$L) and -128 (-8*L). Further, the number of pilot symbols (or pilot bits) used for the frame synchronization is 4 symbols per slot (or 8 bits per slot), and 64 pilot symbols (or 128 pilot bits) are used in each radio frame for the frame synchronization.

First Embodiment of Downlink PCCPCH and SCCPCH

FIG. 16A illustrates pilot symbol pattern of PCCPCH. The shaded symbols can be used for frame synchronization, and the value of pilot symbol other than for frame synchronization is 11. FIG. 16B illustrates the mapping relationship between the synchronization words $C_1-C_8$ of FIG. 12A, and the shaded pilot symbol patterns of FIG. 16A. A double-check frame of the synchronization timing and the reduction of the synchronization search time can be achieved with $\alpha=1$ or 2 in equation (6).

TABLE 3

DPDCH and DPCCH fields

| Channel Bit Rate (kbps) | Channel Symbol Rate (ksps) | SF | Bits/Frame DPDCH | Bits/Frame DPCCH | TOT | Bits/ Slot | DPDCH Bits/Slot $N_{Data1}$ | DPDCH Bits/Slot $N_{Data2}$ | DPCCH Bits/Slot $N_{TFCI}$ | DPCCH Bits/Slot $N_{TPC}$ | DPCCH Bits/Slot $N_{Pilot}$ |
|---|---|---|---|---|---|---|---|---|---|---|---|
| 16 | 8 | 512 | 64 | 96 | 160 | 10 | 2 | 2 | 0 | 2 | 4 |
| 16 | 8 | 512 | 32 | 128 | 160 | 10 | 0 | 2 | 2 | 2 | 4 |
| 32 | 16 | 256 | 160 | 160 | 320 | 20 | 2 | 8 | 0 | 2 | 8 |
| 32 | 16 | 256 | 128 | 192 | 320 | 20 | 0 | 8 | 2 | 2 | 8 |
| 64 | 32 | 128 | 480 | 160 | 640 | 40 | 6 | 24 | 0 | 2 | 8 |
| 64 | 32 | 128 | 448 | 192 | 640 | 40 | 4 | 24 | 2 | 2 | 8 |
| 128 | 64 | 64 | 960 | 320 | 1280 | 80 | 4 | 56 | 8* | 4 | 8 |
| 256 | 128 | 32 | 2240 | 320 | 2560 | 160 | 20 | 120 | 8* | 4 | 8 |
| 512 | 256 | 16 | 4608 | 512 | 5120 | 320 | 48 | 240 | 8* | 8 | 16 |
| 1024 | 512 | 8 | 9728 | 512 | 10240 | 640 | 112 | 496 | 8* | 8 | 16 |
| 2048 | 1024 | 4 | 19968 | 512 | 20480 | 1280 | 240 | 1008 | 8* | 8 | 16 |

FIG. 15C illustrates a correlation circuit for frame synchronization for downlink DPCCH of $N_{pilot}=8$ in accordance with the preferred embodiment. The operation and components are the same as the correlation circuit of FIG. 14D for uplink DPCCH, except for the reception of I channel branch and Q channel branch synchronization words. The results of points $A_1-A_4$ and point B is the same as FIG. 14E. Similarly, the sidelobes are eliminated or minimized, and the results correspond to the optimal results of FIG. 13B. Because the number of pilot symbols (or pilot bits) used for the frame synchronization is 2 symbols per slot (or 4 bit per slot), 32 pilot symbols (or 64 pilot bits) are used in each radio frame for the frame synchronization.

FIG. 16C illustrates pilot symbol pattern of SCCPCH. The shaded symbols can be used for frame synchronization, and the value of pilot symbol other than for frame synchronization is 11. FIG. 16D illustrates the mapping relationship between the synchronization words $C_1-C_8$ of FIG. 12A, and the shaded pilot symbol patterns of FIG. 16C.

As shown above, the frame synchronization words of PCCPCH and SCCPCH is based on the frame synchronization words $C_1-C_8$, and the disclosure for the uplink DPCCH and the downlink DPCH is applicable. Hence, a detailed description regarding the various characteristics including cross-correlation and autocorrelation, operations and implements are omitted since one of ordinary skill in the art can readily appreciate the present invention based on the uplink DPCCH and downlink DPCH.

As described above, the non-shaded symbols are the pilot symbols not used for frame synchronization comprises symbols of 11, and the shaded symbols are used for frame synchronization. The frame synchronization words of the pilot pattern are used for frame synchronization confirmation, and the summation of autocorrelated values for each frame synchronization words is required. The property of summation of autocorrelated values of frame synchronization words is very important.

Figure 11A:
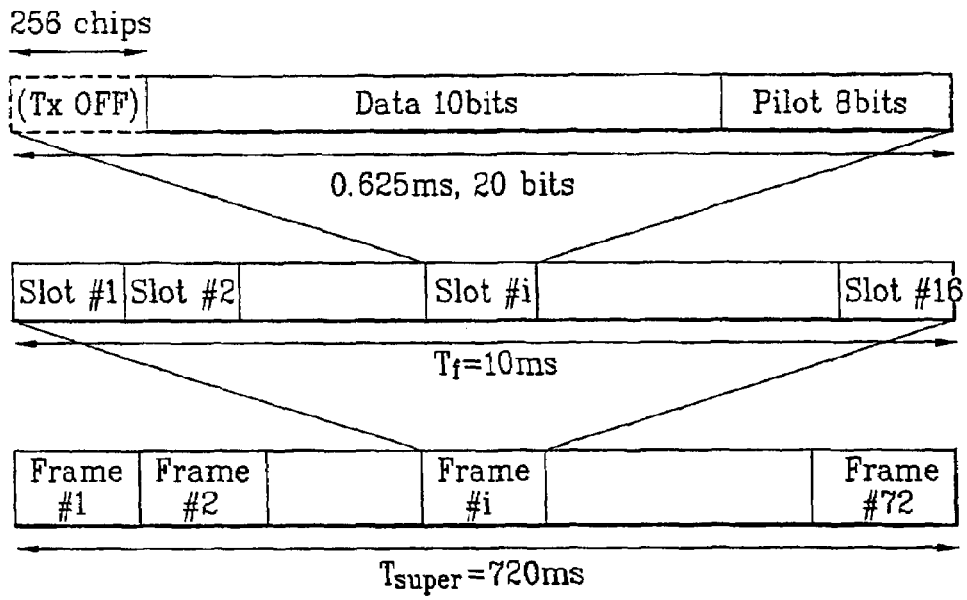
FIGS. 11A and 11B illustrate the frame structure of PCCPCH and SCCPCH, respectively.
Figure 11B:
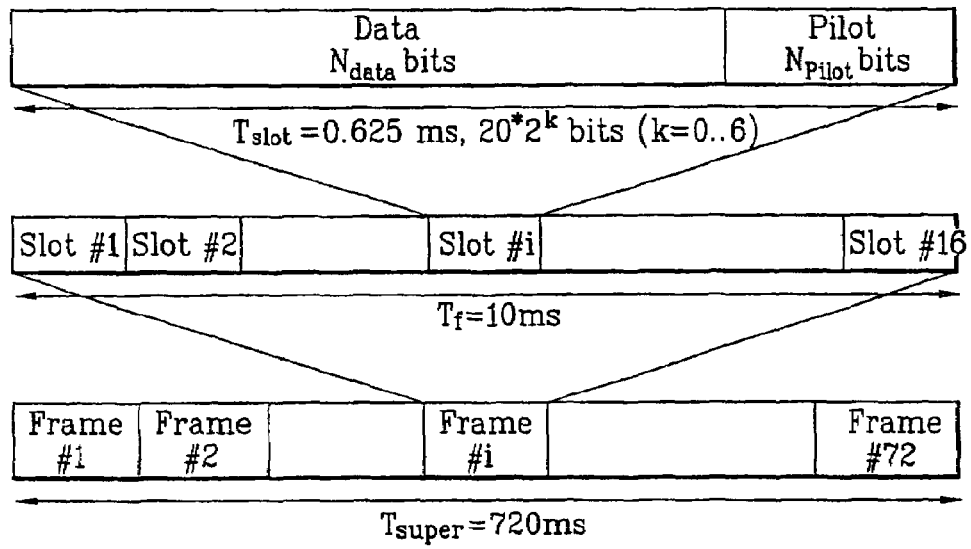

With the implementation of the novel pilot symbols, the values for the number of bits per field are given in Table 4 with reference to FIG. 11B. The channel bit and symbol rates given in Table 4 are the rates immediately before spreading.

TABLE 4

Secondary CCPCH fields

| Channel Bit Rate (kbps) | Channel Symbol Rate (ksps) | SF | Bits/ Frame | Bits/ Slot | $N_{data}$ | $N_{pilot}$ | $N_{TFCI}$ |
| --- | --- | --- | --- | --- | --- | --- | --- |
| 32 | 16 | 256 | 320 | 20 | 12 | 8 | 0 |
| 32 | 16 | 256 | 320 | 20 | 10 | 8 | 2 |
| 64 | 32 | 128 | 640 | 40 | 32 | 8 | 0 |
| 64 | 32 | 128 | 640 | 40 | 30 | 8 | 2 |
| 128 | 64 | 64 | 1280 | 80 | 72 | 8 | 0 |
| 128 | 64 | 64 | 1280 | 80 | 64 | 8 | 8 |
| 256 | 128 | 32 | 2560 | 160 | 152 | 8 | 0 |
| 256 | 128 | 32 | 2560 | 160 | 144 | 8 | 8 |
| 512 | 256 | 16 | 5120 | 320 | 304 | 16 | 0 |
| 512 | 256 | 16 | 5120 | 320 | 296 | 16 | 8 |
| 1024 | 512 | 8 | 10240 | 640 | 624 | 16 | 0 |
| 1024 | 512 | 8 | 10240 | 640 | 616 | 16 | 8 |
| 2048 | 1024 | 4 | 20480 | 1280 | 1264 | 16 | 0 |
| 2048 | 1024 | 4 | 20480 | 1280 | 1256 | 16 | 8 |

Figure 17A:
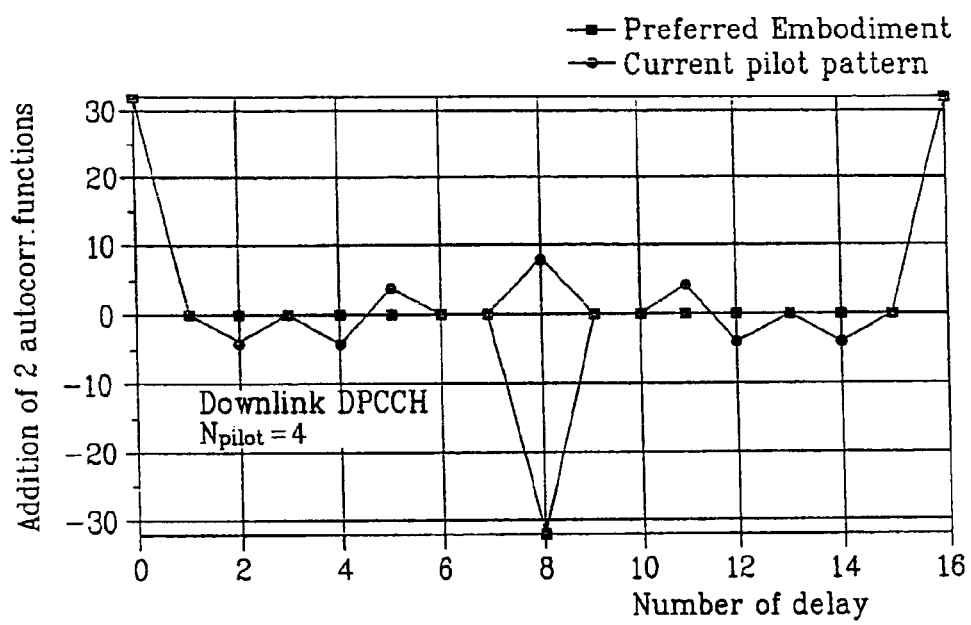
FIGS. 17A–17C illustrate addition of autocorrelation functions of frame synchronization word of the preferred embodiment and current pilot patterns (described in TS S1.11 v1.1.0 specification) for DPCHs and PCCPCH.
Figure 17B:
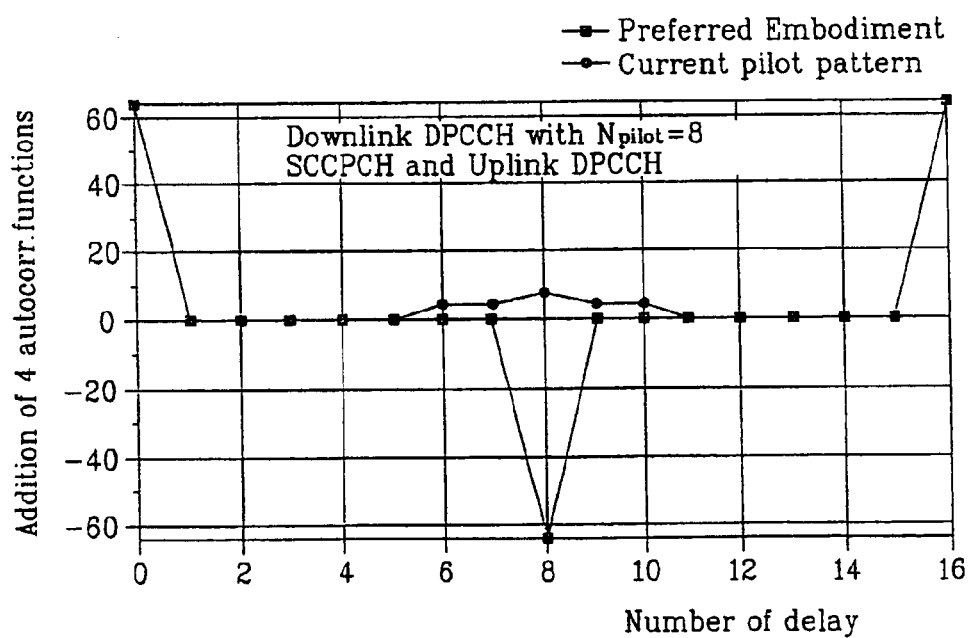
Figures 17C, 18A:
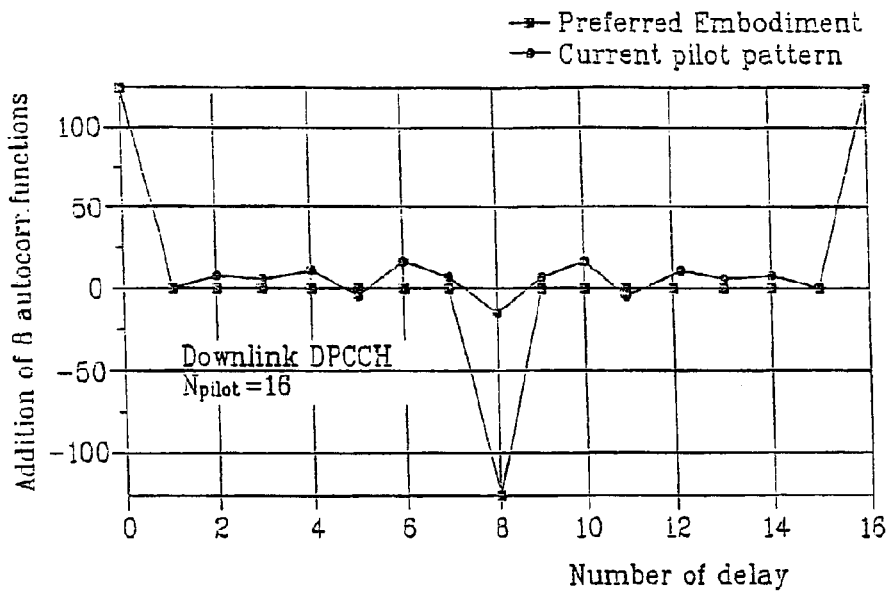
FIG. 18A illustrates the parameters used for obtaining $P_D$, $P_{FA}$, and $P_S$ on uplink DPCCH and downlink DPCH over additive white Gaussian noise (AWGN)

The addition of autocorrelation functions of frame synchronization word of the preferred embodiment and current pilot patterns (described in TS S1.11 v1.1.0 specification) for DPCHs and PCCPCH are depicted in FIG. 17A ($N_{pilot}=4$), FIG. 17B ($N_{pilot}=8$) and FIG. 17C ($N_{pilot}=16$). As shown, the current pilot patterns have non- zero out-of-phase autocorrelation function with peak value at zero shift, whereas the frame synchronization words of the preferred embodiment have zero out-of-phase autocorrelation function with two peak values equal in magnitude and opposite in polarity at zero and middle time shifts (delays).

Correlation to a prescribed frame synchronization word is optimum method for frame synchronization. Since the frame synchronization word of pilot pattern is used for frame synchronization confirmation, the following events and parameters are used to evaluate the performance of frame synchronization confirmation using the frame synchronization words of the preferred embodiment and the current pilot patterns:

$H_1$: The event that the correlator output exceeds the predetermined threshold when the code phase offset between the received shadowed column frame synchronization word and its corresponding receiver stored frame synchronization word is zero.

$H_2$: The event that the correlator output exceeds the predetermined threshold when the code phase offset between the received shadowed column frame synchronization word and its corresponding receiver stored frame synchronization word is not zero.

$H_3$: One event of $H_1$ and no event of $H_2$ for one frame.

$H_4$: The event that the correlator output exceeds the predetermined threshold or is smaller than −1×(predetermined threshold) when the code phase offset between the received shadowed column frame synchronization word and its corresponding receiver stored frame synchronization word is 0 or 8, respectively.

$H_5$: The event that the correlator output exceeds the predetermined threshold or is smaller than −1× (predetermined threshold) when the code phase offset between the received shadowed column frame synchronization word and its corresponding receiver stored frame synchronization word is not 0 and 8.

$H_6$: One event of $H_4$ and no event of $H_1$ for one frame.
$P_D$: Probability of a detection.
$P_{FA}$: Probability of a false alarm.
$P_S$: Probability of a frame synchronization confirmation success for one frame.

From the above definitions, when the current pilot pattern is used for frame synchronization confirmation, the probability of a detection and a false alarm can be expressed as:

$$P_D = Prob(H_1) \quad (7)$$

$$P_{FA} = Prob(H_2) \quad (8)$$

The probability of a frame synchronization confirmation success for one frame becomes $P_S=Prob(H_3)$ and it can be expressed as $$P_S = P_D(1-P_{FA})^{15} \quad (9)$$

Whereas in the case of the frame synchronization words of the preferred embodiment, as has been stated, double thresholds are needed for double-check frame synchronization, and the probability of a detection and a false alarm can be expressed as:

$$P_D = Prob(H_4) \quad (10)$$

$$P_{FA} = Prob(H_5) \quad (11)$$

Similarly, in the case of frame synchronization words of the preferred embodiment, the probability of a frame confirmation success for one frame becomes $P_S=Prob(H_6)$ and it is given by $$P_S = P_D(1-P_{FA})^{14} \quad (12)$$

From equations (9) and (12), the probability of a frame synchronization confirmation is greatly affected by the probability of a false alarm since PS is proportional to $P_D$ and $(1-P^{FA})^{14}$ or $(1-P_{FA})^{15}$ For example, assume that $P_{FA}=10^{-1}$, then $(1-P_{FA})^{14}=0.2288$ and $(1-P_{FA})=0.2059$. Now let $P_{FA}=10$, then $(1-P_{FA})=0.9861$ and $(1-P_{FA})=0.9851$. The performance of frame synchronization can be sufficiently evaluated by selecting the threshold so that the $P_{FA}$ is much smaller than $(1-P_D)$.

Figure 18B:
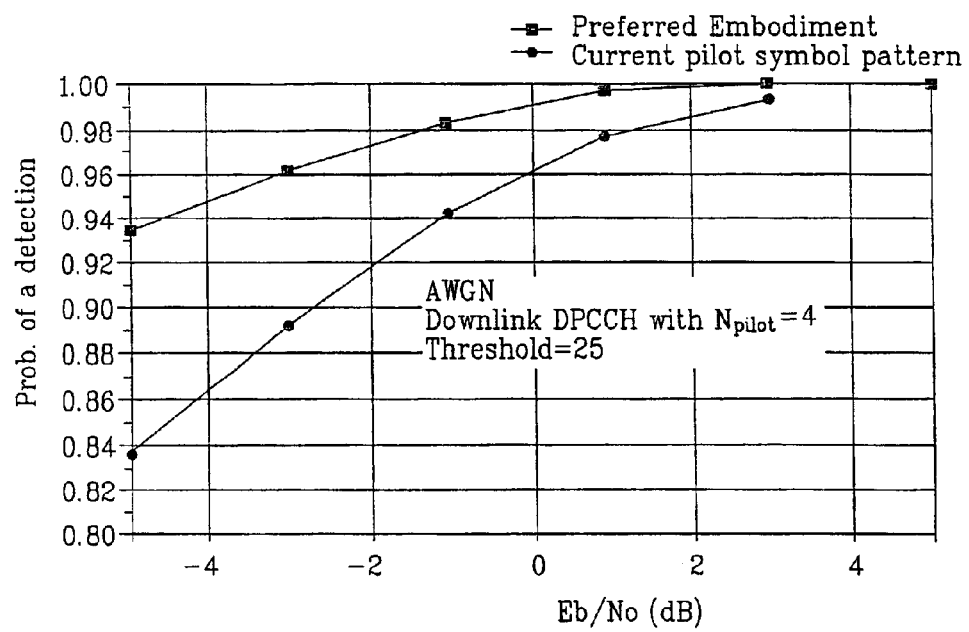
FIG. 18B illustrates the probability of detection $P_D$ on downlink DPCCH over AWGN channel.
Figure 18C:
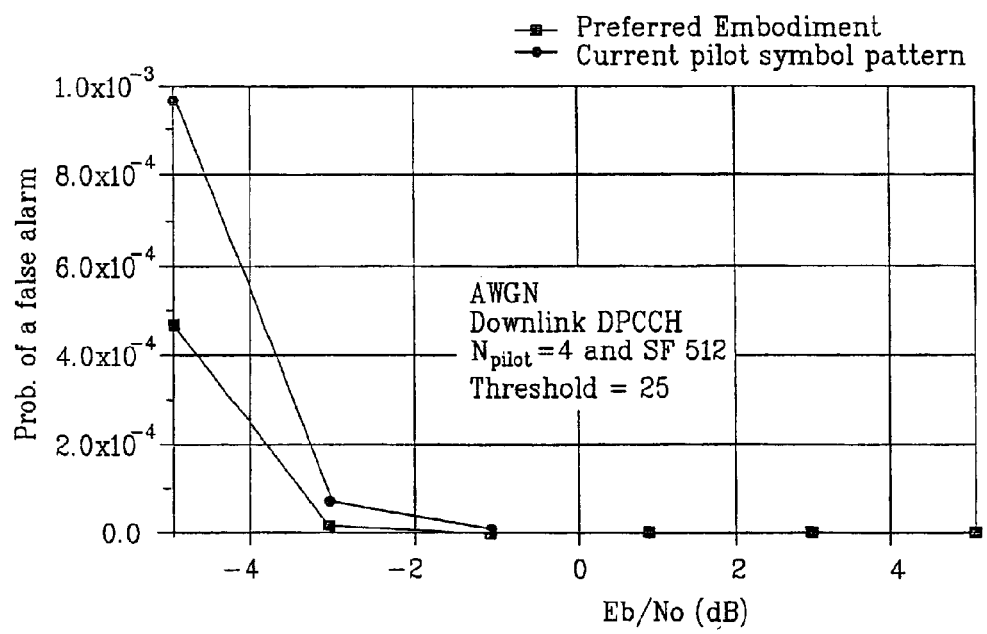
FIG. 18C illustrates the probability of false alarm $P_{FA}$ on downlink DPCCH over AWGN channel.
Figure 18D:
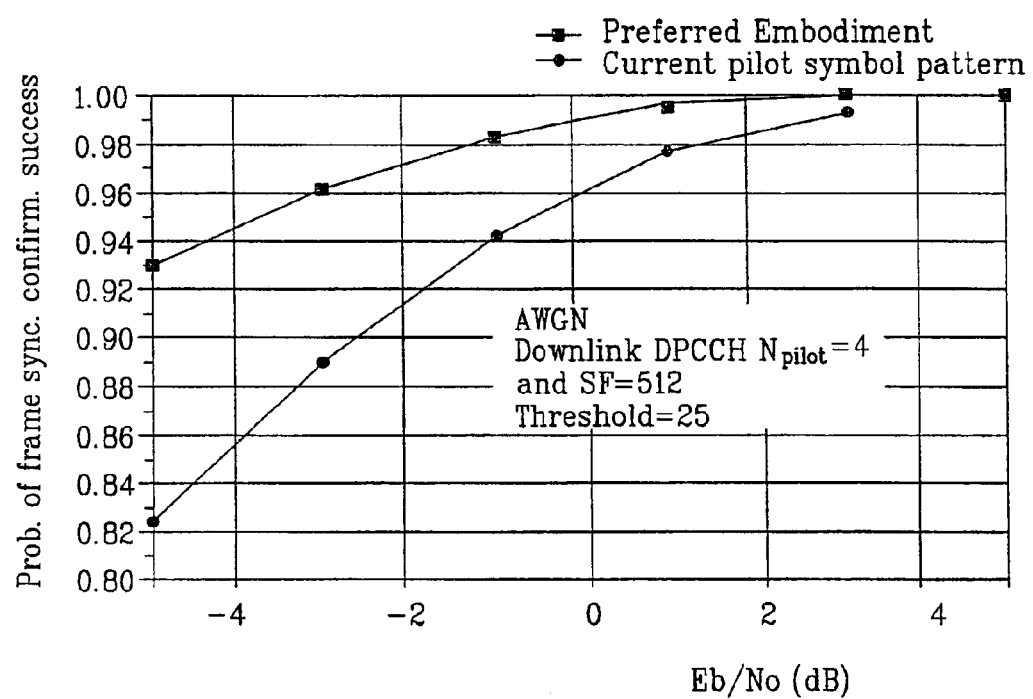
FIG. 18D illustrates the probability of a frame synchronization confirmation success $P_S$ on downlink DPCCH over AWGN channel.

The parameters of FIG. 18A are used for obtaining $P_D$, $P_{FA}$, and $P_S$ on uplink DPCCH and downlink DPCH over additive white Gaussian noise (AWGN). FIG. 18B illustrates the probability of detection PD on downlink DPCCH with $N_{pilot}=4$ over AWGN channel, FIG. 18C illustrates the probability of false alarm PFA on downlink DPCCH with $N_{pilot}=4$ over AWGN channel, and FIG. 18D illustrates the probability of a frame synchronization confirmation success $P_S$ on downlink DPCCH with $N_{pilot}=4$ over AWGN between the pilot pattern of the preferred embodiment and the current pilot pattern, where $P_D$, $P_{FA}$, and $P_S$ are given as a function of $E_b/N_0$ ratio ($E_b$=energy per bit, $N_0$=noise power spectral density).

The $P_D$ and $P_S$ of the pilot patterns of the preferred embodiment are greater than that of current pilot pattern.

Furthermore, the $P_{FA}$ of the pilot patterns in accordance with the preferred embodiment are also smaller than that of the current pilot patterns. The theoretical equations (9) and (12) are identical to simulation results of FIG. 18D. Therefore, there is significant difference between the frame synchronization performance of pilot patterns of the preferred embodiment and that of current pilot pattern. For example, from FIG. 18D, there is 3 dB gain at $P_S$=0.93 by employing the pilot patterns of the preferred embodiment.

The frame synchronization words of the preferred embodiment are especially suitable for frame synchronization confirmation. By adding the autocorrelation functions of shaded frame synchronization words, double maximum values equal in magnitude and opposite polarity at zero and middle shifts are obtained. This property can be used to slot-by-slot and double-check frame synchronization timing and reduce the synchronization search time. The performance of frame synchronization confirmation over AWGN using pilot pattern illustrate the significant differences between the frame synchronization performance of the pilot pattern of the preferred embodiment and the current pilot pattern.

First Embodiment of Downlink DPCH, PCCPCH and SCCPH for STTD Diversity

FIG. 19A illustrates new pilot symbol patterns of Downlink DPCH for the diversity antenna using a space time block coding based transmit diversity (STTD). For the diversity pilot symbol pattern on downlink DPCH, STTD is applied to the shaded pilot symbols #1 and #3 for $N_{pilot}$=8, and the shaded pilot symbols #1, #3, #5, and #7 for $N_{pilot}$=16. The non-shaded pilot symbols #0 and #2 for $N_{pilot}$=8, and non-shaded pilot symbols #0, #2, #4, and #6 for $N_{pilot}$=16 are encoded to be orthogonal to the pilot symbol of FIG. 15A. However, the diversity pilot pattern for downlink DPCH with $N_{pilot}$=4 are STTD encoded since STTD encoding requires two symbols. FIG. 19B illustrates the mapping relationship between the 8 words $C_1$–$C_8$ of FIG. 12A and shaded pilot symbol patterns of FIG. 19A.

FIG. 19C illustrates the new diversity antenna pilot symbol pattern for PCCPCH. The pilot symbols of FIG. 19C are encoded to be orthogonal to the pilot symbols of FIG. 16A. FIG. 19D illustrates the mapping relationship between the words $C_1$–$C_8$ of FIG. 12A and shadowed pilot symbol patterns of FIG. 19C.

FIG. 19E illustrates the new pilot symbol pattern for the diversity antenna when STTD encoding is used on the SCCPCH. For the diversity pilot symbol pattern on SCCPCH, STTD is applied to the shaded pilot symbols #1, and #3 of $N_{pilot}$=8, and shaded pilot symbols #1, #3, #5 and #7 of $N_{pilot}$=16 in FIG. 19E, whereas the non- shaded pilot symbols #0 and #2 of $N_{pilot}$=8, and non-shaded #0, #2, #4, #6 of $N_{pilot}$=16 are encoded to be orthogonal to those of FIG. 16C. FIG. 19F illustrates the mapping relationship between the words $C_1$–$C_8$ of FIG. 12A and shaded pilot symbol patterns of FIG. 19E.

Since the above is based on words $C_1$–$C_8$, the previous discussion regarding the uplink DPCCH and downlink DPCH, PCCPCH and SCCPH is readily applicable. One of ordinary skill in the art can readily appreciate the features for downlink using diversity antenna based on previous disclosure, and a detailed disclosure is omitted.

Alternative Embodiments for Uplink DPCCH and Downlink DPCH and PCCPCH

FIG. 20A is a table illustrating frame synchronization words $C_1$–$C_{16}$ (i=16) and auto correlated function in accordance with another preferred embodiment of the present invention. The frame synchronization words $C_1$–$C_{16}$ can be classified into the PCSP of the first embodiment, as follows:

E={$C_1$, $C_3$, $C_9$, $C_{11}$}
F={$C_2$, $C_4$, $C_{10}$, $C_{12}$}
G {$C_5$, $C_7$, $C_{13}$, $C_{15}$}
H={$C_6$, $C_8$, $C_{14}$, $C_{16}$}

The classification of the alternative frame synchronization words $C_1$–$C_{16}$ are also applicable to equations (1)–(6), and have the same properties and characteristics of the first embodiment. FIG. 20B is a table illustrating the autocorrelation function of the pilot bits of each frame synchronization word classified in the PCSP. In this particular case, each class contains four sequences and the sequences of the same class have the same autocorrelation function.

FIG. 20C illustrates the pilot bit pattern of uplink DPCCH with $N_{pilot}$=6 and 8 and FIG. 20D illustrates a mapping relationship between the alternative frame synchronization words $C_1$–$C_{16}$ of FIG. 20A and the shaded frame synchronization words of FIG. 20C. FIGS. 20E and 20F illustrate the pilot symbol pattern of downlink DPCH with 8, 16, 32, 64, 128, 256, 512, 1024, 2048 and 4096 ksps, and FIG. 20G illustrates a mapping relationship between the alternative frame synchronization words $C_1$–$C_{16}$ of FIG. 20A and the shaded frame synchronization words of FIGS. 20E and 20F. FIG. 20H illustrates the pilot symbol pattern of downlink PCCPCH and FIG. 20I illustrates a mapping relationship between the alternative frame synchronization words $C_1$–$C_{16}$ of FIG. 20A and the shaded frame synchronization words of FIG. 20H.

Since the above is based on alternative words $C_1$–$C_{16}$, which have the same features as the words $C_1$–$C_8$ of the first embodiment, the previous discussion regarding the uplink DPCCH and downlink DPCH, PCCPCH and SCCPH of the first embodiment is readily applicable. One of ordinary skill in the art can readily appreciate the features of this embodiment based on previous disclosure, and a detailed disclosure is omitted.

The frame synchronization words of the preferred embodiment are especially suitable for frame synchronization confirmation. By adding the autocorrelation functions of shaded frame synchronization words, double maximum values equal in magnitude and opposite polarity at zero and middle shifts are obtained. This property can be used to slot-by-slot and double-check frame synchronization timing and reduce the synchronization search time. Further the present invention allows a simpler construction of the correlator circuit for a receiver, thereby reducing the complexity of the receiver. Moreover, the present invention allows accurate establishment of the frame synchronization. Due to various advantages of the present invention, the first preferred embodiment has been accepted by the 3GPP, as shown in TS 25.211 v2.0.1, distributed June 1999, whose entire disclosure is hereby incorporated by reference therein.

Preferred Embodiment for L=15

The above pilot patterns in accordance with preferred embodiments of the present invention have various advantages including frame synchronization confirmation. In the above preferred embodiments, the physical channel of the up- link or down-link has a chip ratio of 4.096 Mcps, which results from the use of a pilot pattern based on a length of 16 slots for the frame synchronization. In other words, the chip ratio is based on a slot length of 2n. However, if the chip ratio changes from 4.096 Mcps to 3.84 Mcps, alternative pilot patterns are needed since one radio frame is based on a slot length of 15 slots. Hence, alternative pilot patterns are needed for 15 slots (L=15) due to OHG harmonization.

FIG. 21 illustrates a preferred embodiment for the new frame synchronization words $C_1$–$C_{i-th}$, which has the autocorrelation function of lowest out-of-phase coefficient and the lowest magnitude of cross-correlation function with minus peak value at middle shift, where i=8. The frame synchronization words are used to design the regular pilot patterns and diversity antenna pilot patterns of uplink DPCH, and downlink DPCH and SCCPCH of the preferred embodiment. By using the two correlation functions, it is possible to double check frame synchronization at zero and middle shifts. When performance evaluation of single-check and double-check frame synchronization confirmation is carried out over AWGN environment, the words $C_1$–$C_8$ of FIG. 21 are suitable for frame synchronization confirmation.

The frame synchronization words $C_1$–$C_8$ have the following two-valued auto-correlation function:

$$R_i(\tau) = \begin{cases} 15, & \tau = 0 \\ -1, & \tau \neq 0, \end{cases} \quad i = 1, 2, \ldots, 8 \quad (13)$$

where $R_i(\tau)$ is the auto-correlation function of frame synchronization word $C_i$. Similar to L=16, the words of FIG. 21 can be divided into 4 classes, as follows:

E={$C_1$, $C_2$}
F={$C_3$, $C_4$}
G={$C_5$, $C_6$}
H={$C_7$, $C_8$}

The two words within the same class are PCSP. The cross-correlation spectrum for the preferred pair {$C_1$, $C_2$}, {$C_3$, $C_4$}, {$C_5$, $C_6$}, or {$C_7$, $C_8$} is $$R_{i,j}(\tau) = \begin{cases} -15, & \tau = 7 \\ 1, & \tau \neq 7 \end{cases} \quad (14)$$

$$R_{j,i}(\tau + 1) = \begin{cases} -15, & \tau = 7 \\ 1, & \tau \neq 7 \end{cases} \quad (15)$$

where $R_{i,j}(\tau)$ is cross-correlation function between two words of preferred pair of E, F, G, H, and i,j=1, 2, 3, . . . , 8. By combining such auto-correlation and cross-correlation functions, the following equations (16) and (17) are obtained:

$$\sum_{i=1}^{\alpha} R_i(\tau) = \begin{cases} \alpha \cdot 15, & \tau = 0 \\ -\alpha, & \tau \neq 0, \end{cases} \quad \alpha = 1, 2, 3, \ldots, 8 \quad (16)$$

$$\sum_{i=1}^{\alpha/2} (R_{2i-1,2i}(\tau) + R_{2i,2i-1}(\tau+1)) = \begin{cases} -\alpha \cdot 15, & \tau = 7 \\ \alpha, & \tau \neq 7, \end{cases} \quad \alpha = 2, 4, 6, 8 \quad (17)$$

Figure 22C:
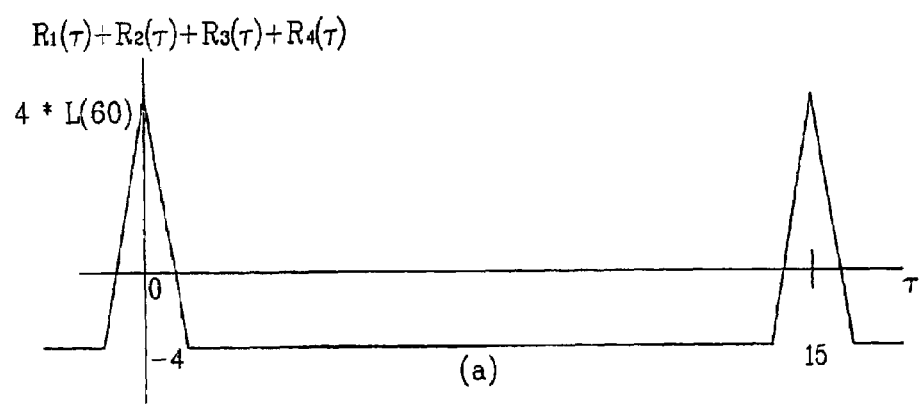
FIG. 22C illustrates the addition of four auto-correlation functions.
Figure 22D:
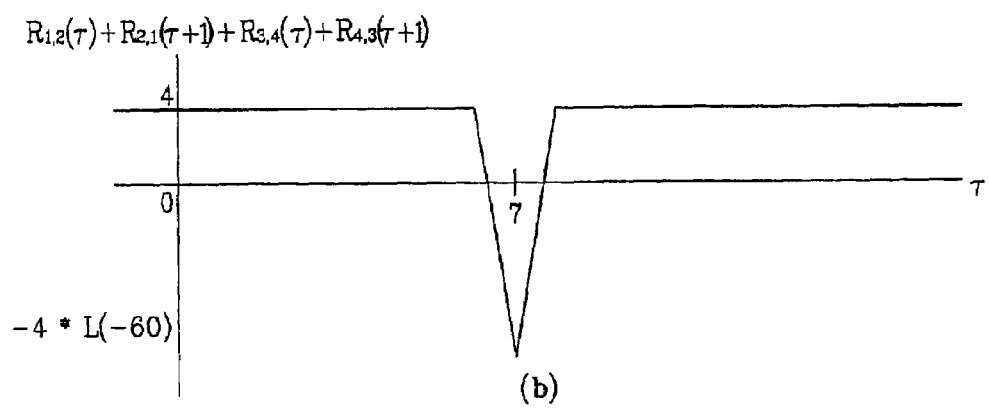
FIG. 22D illustrates the addition of four cross-correlation functions between the four frame synchronization words of two classes.

From equations (16) and (17), when α=2, FIG. 22A illustrates the addition of two auto-correlation functions, and FIG. 22B illustrates the addition of two cross-correlation functions between the two frame synchronization words within the same class. Similarly, from equations (16) and (17), when α=4, FIG. 22C illustrates the addition of four auto-correlation functions, and FIG. 22D illustrates the addition of four cross-correlation functions between the four frame synchronization words of two classes E and F.

Since the auto-correlation function of the frame synchronization words $C_1$–$C_8$ in accordance with this preferred embodiment has the lowest out-of-phase coefficient, single-check frame synchronization confirmation is feasible by applying the positive threshold value at (a) of the auto-correlation function output of FIG. 22C. Furthermore, double-check frame synchronization confirmation is also achieved by setting the negative threshold value at (b) of the cross-correlation function output of FIG. 22D.

FIG. 23A illustrates the pilot bit patterns on uplink DPCCH with $N_{pilot}$=2, 3, and 4, and FIG. 23C illustrates the pilot bit patterns on uplink DPCCH with $N_{pilot}$=2, 3, and 4 in accordance with an alternative embodiment compared to FIG. 23A. Further, FIGS. 23E and 23F illustrate the pilot bit patterns on uplink DPCCH with $N_{pilot}$=5, 6, 7, and 8. The shaded parts of FIGS. 23A, 23C, 23E and 23F can be used for frame synchronization words, and the value of pilot bit other than the frame synchronization word is 1. FIGS. 23B and 23D illustrate the mapping relationship between the frame synchronization words of FIG. 21, and shaded frame synchronization words of FIGS. 23A and 23D, respectively. Further, FIG. 23G illustrates the mapping relationship between the frame synchronization words of FIG. 21, and the shaded frame synchronization words of FIGS. 23E and 23F.

The various description of above for uplink DPCCH when L=16 is readily applicable to this preferred embodiment when L=15, including the correlator circuits (with some modifications) and the generally characteristics. For example, as shown in frame synchronization words $C_1$–$C_8$ of FIG. 21, each word has substantially the same number of 1 and 0. In this preferred embodiment, the result of $b_1$–$b_0$ is plus or minus one, e.g., close to zero. Further, when the number of slots is 15, i.e., odd, the result of $b_3$–$b_4$ equals plus or minus one, e.g., close to zero. Further, since two frame synchronization words are used for $N_{pilot}$=2, 3, and 4 and there are fifteen timeslots in a radio frame, the number of pilot bits used for synchronization is 30 per frame. For $N_{pilot}$=5, 6, 7 and 8, since four synchronization words are used for fifteen timeslots in a radio frame, the number of pilot bits used for synchronization is 60 per frame. Moreover, the result of the addition of two or four auto-correlation functions and cross-correlation functions between two or four frame synchronization words corresponds to FIGS. 22A–22D.

With the implementation of the novel pilot patterns, the values for the number of bits per field are shown below in Table 5 and Table 6 with reference to FIG. 4. The channel bit and symbol rates given in Table 5 are the rates immediately before spreading.

TABLE 5

| | DPDCH fields | | | | |
|---|---|---|---|---|---|
| Channel Bit Rate (kbps) | Channel Symbol Rate (ksps) | SF | Bits/ Frame | Bits/ Slot | $N_{data}$ |
| 15 | 15 | 256 | 150 | 10 | 10 |
| 30 | 30 | 128 | 300 | 20 | 20 |
| 60 | 60 | 64 | 600 | 40 | 40 |
| 120 | 120 | 32 | 1200 | 80 | 80 |
| 240 | 240 | 16 | 2400 | 160 | 160 |
| 480 | 480 | 8 | 4800 | 320 | 320 |
| 960 | 960 | 4 | 9600 | 640 | 640 |

There are two types of Uplink Dedicated Physical Channels; those that include TFCI (e.g. for several simultaneous services) and those that do not include TFCI (e.g. for fixed-rate services). These types are reflected by the duplicated rows of Table 6. The channel bit and symbol rates given in Table 6 are the rates immediately before spreading.

TABLE 6

DPCCH fields

| Channel Bit Rate (kbps) | Channel Symbol Rate (ksps) | SF | Bits/Frame | Bits/Slot | $N_{pilot}$ | $N_{TPC}$ | $N_{TFCI}$ | $N_{FBI}$ |
|---|---|---|---|---|---|---|---|---|
| 15 | 15 | 256 | 150 | 10 | 6 | 2 | 2 | 0 |
| 15 | 15 | 256 | 150 | 10 | 8 | 2 | 0 | 0 |
| 15 | 15 | 256 | 150 | 10 | 5 | 2 | 2 | 1 |
| 15 | 15 | 256 | 150 | 10 | 7 | 2 | 0 | 1 |
| 15 | 15 | 256 | 150 | 10 | 6 | 2 | 0 | 2 |
| 15 | 15 | 256 | 150 | 10 | 5 | 1 | 2 | 2 |

Figures 23H, 23I, 23J:
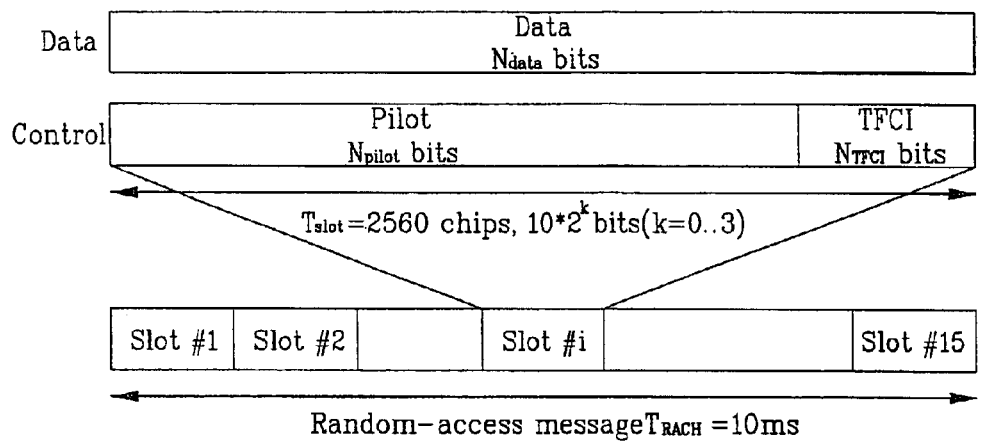
FIG. 23H illustrates the structure of random access channel.
FIG. 23I illustrates the random access message control fields.
FIG. 23J illustrates the pilot bit pattern of the RACH.

The Random Access Channel (RACH) is an uplink transport channel that is used to carry control information from the UE. The RACH may also carry short user packets. The RACH is always received from the entire cell. FIG. 23H illustrates the structure of random access channel. The 10 ms message is split into 15 slots, each of length $T_{slot}$=2560 chips. Each slot has two parts, a data part that carries Layer 2 information and a control part that carries Layer 1 control information. The data and control parts are transmitted in parallel.

The data part includes $10*2^k$ bits, where k=0, 1, 2, 3. This corresponds to a spreading factor of 256, 128, 64, and 32 respectively for the message data part. The control part has 8 known pilot bits to support channel estimation for coherent detection and 2 bits of rate information. This corresponds to a spreading factor of 256 for the message control part.

With the implementation of the novel pilot patterns, the values for the number of bits per field are shown in Table 7 with reference to FIG. 23H.

TABLE 7

Random-access message data fields.

| Channel Bit Rate (kbps) | Channel Symbol Rate (ksps) | SF | Bits/Frame | Bits/Slot | $N_{data}$ |
|---|---|---|---|---|---|
| 15 | 15 | 256 | 150 | 10 | 10 |
| 30 | 30 | 128 | 300 | 20 | 20 |
| 60 | 60 | 64 | 600 | 40 | 40 |
| 120 | 120 | 32 | 1200 | 80 | 80 |

FIG. 23I illustrates the random access message control fields and there is always 8 pilot symbols per slot for channel estimation. Due to the unique characteristics of the frame synchronization words in accordance with the preferred embodiment, the frame synchronization words $C_1$–$C_8$ can be used in the pilot bit pattern of the RACH for channel estimation. FIG. 23J illustrates the pilot bit pattern of the RACH, and the mapping relationship is the same as the mapping relationship illustrated in FIG. 23G for $N_{pilot}$=8. Due to the novel characteristics of the frame synchronization words $C_1$–$C_8$, which can also be used solely for channel estimation, it is easy to reuse the pilot patterns, which allows commonality between different uplink channels.

FIG. 24A illustrates the pilot symbol patterns on downlink DPCH when $N_{pilot}$=2, 4, 8, and 16. The shaded parts of FIG. 24A can be used for frame synchronization symbols, each symbol having one frame synchronization word for the I channel branch and another frame synchronization word for the Q channel branch, and the value of pilot symbol other than the frame synchronization word is 11. FIG. 24B illustrates the mapping relationship between the frame synchronization words $C_1$–$C_8$ of FIG. 21 and shaded pilot symbol patterns of FIG. 24A.

FIG. 24C illustrates the pilot symbol patterns of downlink DPCH for the diversity antenna using STTD. For the diversity pilot symbol pattern on downlink DPCH, STTD is applied to the shaded pilot symbols #1 and #3 for $N_{pilot}$=8, and #1, #3, #5, and #7 for $N_{pilot}$=16. The non-shaded pilot symbols of #0 and #2 for $N_{pilot}$=8 and 0#, #2, #4 and #6 for $N_{pilot}$=16 are encoded to be orthogonal to the pilot symbol of FIG. 24A. However, the diversity pilot pattern for downlink DPCH with $N_{pilot}$=4 are STTD encoded since STTD encoding requires two symbols. Since the STTD encoded pilot symbol pattern is orthogonal to ordinary pilot symbol pattern, the STTD encoded pilot pattern can also be used for antenna verification of feedback mode diversity. FIG. 24D illustrates the mapping relationship between the frame synchronization words $C_1$–$C_8$ of FIG. 21 and shaded pilot symbol patterns of FIG. 24C.

With the implementation of the novel pilot patterns, the below Table 8 shows the number of bits per slot of the various fields with reference to FIG. 8. There are basically two types of downlink Dedicated Physical Channel; those that include TFCI (e.g. for several simultaneous services) and those that do not include TFCI (e.g. for fixed-rate services). These types are reflected by the duplicated rows of Table 8. The channel bit and symbol rates given in Table 8 are the rates immediately before spreading. If there is no TFCI, then the TFCI field is left blank (*).

TABLE 8

DPDCH and DPCCH fields

| Channel Bit Rate (kbps) | Channel Symbol Rate (ksps) | SF | Bits/Frame DPDCH | Bits/Frame DPCCH | Bits/Frame TOT | Bits/Slot | DPDCH Bits/Slot $N_{Data1}$ | DPDCH Bits/Slot $N_{Data2}$ | DPCCH Bits/Slot $N_{TFCI}$ | DPCCH Bits/Slot $N_{TPC}$ | DPCCH Bits/Slot $N_{Pilot}$ |
|---|---|---|---|---|---|---|---|---|---|---|---|
| 15 | 7.5 | 512 | 60 | 90 | 150 | 10 | 2 | 2 | 0 | 2 | 4 |
| 15 | 7.5 | 512 | 30 | 120 | 150 | 10 | 0 | 2 | 2 | 2 | 4 |

TABLE 8-continued

DPDCH and DPCCH fields

| Channel Bit Rate (kbps) | Channel Symbol Rate (ksps) | SF | Bits/Frame DPDCH | Bits/Frame DPCCH | Bits/Frame TOT | Bits/Slot | DPDCH Bits/Slot $N_{Data1}$ | DPDCH Bits/Slot $N_{Data2}$ | DPCCH Bits/Slot $N_{TFCI}$ | DPCCH Bits/Slot $N_{TPC}$ | DPCCH Bits/Slot $N_{Pilot}$ |
|---|---|---|---|---|---|---|---|---|---|---|---|
| 30 | 15 | 256 | 150 | 150 | 300 | 20 | 2 | 8 | 0 | 2 | 8 |
| 30 | 15 | 256 | 120 | 180 | 300 | 20 | 0 | 8 | 2 | 2 | 8 |
| 60 | 30 | 128 | 450 | 150 | 600 | 40 | 6 | 24 | 0 | 2 | 8 |
| 60 | 30 | 128 | 420 | 180 | 600 | 40 | 4 | 24 | 2 | 2 | 8 |
| 120 | 60 | 64 | 900 | 300 | 1200 | 80 | 4 | 56 | 8* | 4 | 8 |
| 240 | 120 | 32 | 2100 | 300 | 2400 | 160 | 20 | 120 | 8* | 4 | 8 |
| 480 | 240 | 16 | 4320 | 480 | 4800 | 320 | 48 | 240 | 8* | 8 | 16 |
| 960 | 480 | 8 | 9120 | 480 | 9600 | 640 | 112 | 496 | 8* | 8 | 16 |
| 1920 | 960 | 4 | 18720 | 480 | 19200 | 1280 | 240 | 1008 | 8* | 8 | 16 |

FIG. 25A illustrates the pilot symbol patterns for downlink SCCPCH for $N_{pilot}$=8 and 16, and FIG. 25B illustrates the mapping relationship of the frame synchronization words $C_1$–$C_8$ of FIG. 21 and shaded pilot symbol patterns of FIG. 25A. Further, FIG. 25C illustrates the pilot symbol patterns of downlink SCCPCH for $N_{pilot}$=8 and 16 for the diversity antenna using STTD, and FIG. 25D illustrates the mapping relationship between the frame synchronization words $C_1$–$C_8$ of FIG. 21 and shaded pilot symbol patterns of FIG. 25C.

With the implementation of the novel pilot patterns, the values for the number of bits per field are given in Table 9 with reference to FIG. 11B. The channel bit and symbol rates given in Table 9 are the rates immediately before spreading. In the Secondary Common Control Physical Channel, it is possible to have burst transmission based on radio frame units. When burst transmission is performed, pilot symbols shall be added to the head of the burst. The number of symbols and the symbol pattern of the pilot symbols to be attached shall take the pattern of Slot #15.

TABLE 9

Secondary CCPCH fields with pilot bits

| Channel Bit Rate (kbps) | Channel Symbol Rate (ksps) | SF | Bits/Frame | Bits/Slot | $N_{data}$ | $N_{pilot}$ | $N_{TFCI}$ |
|---|---|---|---|---|---|---|---|
| 30 | 15 | 256 | 300 | 20 | 12 | 8 | 0 |
| 30 | 15 | 256 | 300 | 20 | 10 | 8 | 2 |
| 60 | 30 | 128 | 600 | 40 | 32 | 8 | 0 |
| 60 | 30 | 128 | 600 | 40 | 30 | 8 | 2 |
| 120 | 60 | 64 | 1200 | 80 | 72 | 8 | 0 |
| 120 | 60 | 64 | 1200 | 80 | 64 | 8 | 8 |
| 240 | 120 | 32 | 2400 | 160 | 152 | 8 | 0 |
| 240 | 120 | 32 | 2400 | 160 | 144 | 8 | 8 |
| 480 | 240 | 16 | 4800 | 320 | 304 | 16 | 0 |
| 480 | 240 | 16 | 4800 | 320 | 296 | 16 | 8 |
| 960 | 480 | 8 | 9600 | 640 | 624 | 16 | 0 |
| 960 | 480 | 8 | 9600 | 640 | 616 | 16 | 8 |
| 1920 | 960 | 4 | 19200 | 1280 | 1264 | 16 | 0 |
| 1920 | 960 | 4 | 19200 | 1280 | 1256 | 16 | 8 |

As can be appreciated, the various description of above for downlink DPCH when L=16 is readily applicable to this preferred embodiment when L=15, including the correlator circuits (with some modifications) and the generally characteristics. Moreover, the result of the addition of two or four auto-correlation functions and cross-correlation functions between two or four frame synchronization words corresponds to FIGS. 22A–22D.

In order to evaluate the performance of the frame synchronization words in accordance with the preferred embodiment for 15 slots per frame, the following events and parameters are first defined:

$H_1$: The event that the auto-correlator output exceeds the predetermined threshold at zero slot offset.

$H_2$: The event that the auto-correlator output exceeds the predetermined threshold at zero slot offset or the cross-correlator output is smaller than $-1\times$(predetermined threshold) at 7 slot offset.

$H_3$: The event that the auto-correlator exceeds the predetermined threshold at slot offset except zero.

$H_4$: The event that the cross-correlator output is smaller than $-1\times$(predetermined threshold) at slot offset except 7.

$P_S$: Probability of a frame synchronization confirmation success.

$P_{FA}$: Probability of a false alarm.

The frame synchronization is confirmed if the output of the correlator using the frame synchronization word exceeds the predetermined threshold. The success of the frame synchronization confirmation is determined when the successive $S_R$ frame synchronization is confirmed. Otherwise, the frame synchronization confirmation failure is determined. Thus, the probability of a frame synchronization confirmation success is defined by $$P_S = \begin{cases} (Prob(H_1))^{S_R}, & \text{single check} \\ (Prob(H_2))^{S_R}, & \text{double check} \end{cases} \quad (18)$$

The probability of a false alarm can be expressed as $$P_{FA} = Prob(H_3) = Prob(H_4) \quad (19)$$

Figures 26A, 26B:
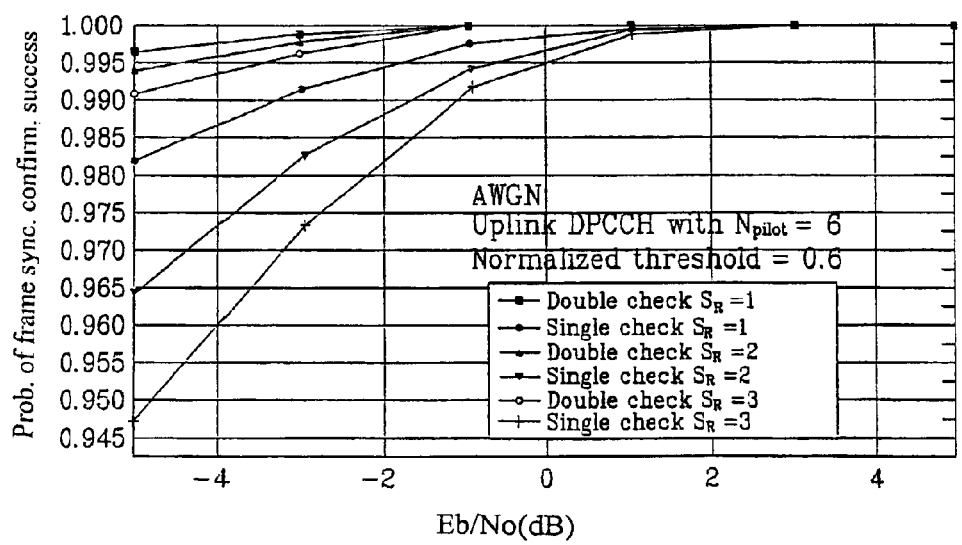
FIG. 26A illustrates the parameters used to evaluate the performance of the pilot bit pattern on uplink DPCCH over AWGN.
FIG. 26B illustrates the probability of frame synchronization confirmation success $P_S$ on uplink DPCCH with $N_{pilot}$=6 over AWGN channel.
Figure 26C:
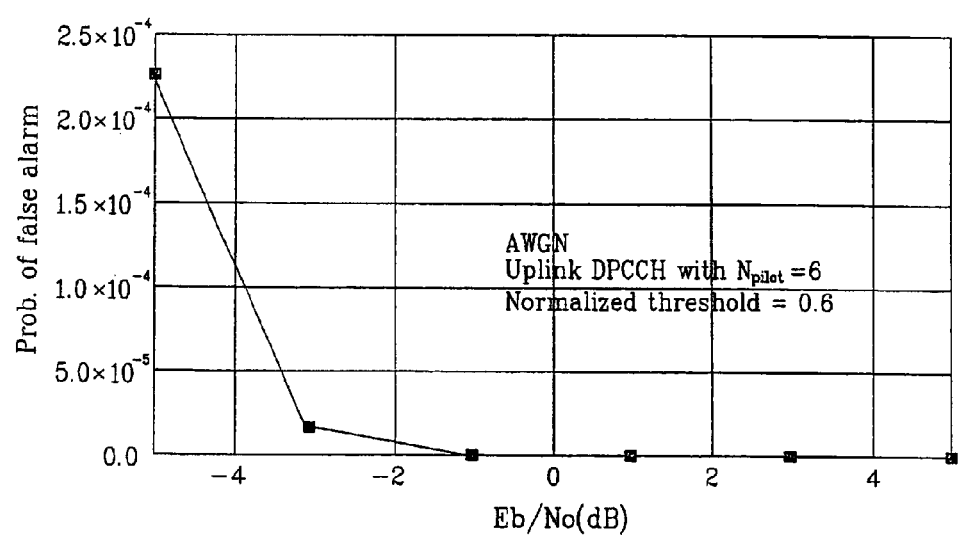
FIG. 26C illustrates the probability of a false alarm PFA on uplink DPCCH with $N_{pilot}$=6 over AWGN channel.

The parameters of FIG. 26A are used to evaluate the performance of the pilot bit pattern on uplink DPCCH over AWGN. FIG. 26B illustrates the probability of frame synchronization confirmation success $P_S$ on uplink DPCCH with $N_{pilot}$=6 over AWGN channel. Further, FIG. 26C illustrates the probability of a false alarm $P_{FA}$ on uplink DPCCH with $N_{pilot}$=6 over AWGN channel. The $P_S$ and $P_{FA}$ are given as a function of $E_b/N_0$ ratio ($E_b$=energy per bit, $N_0$=noise power spectral density).

The $P_S$ of single-check and double-check frame synchronization confirmation with $S_R$=3 on uplink DPCCH is smaller than 0.945 and 0.99 at −5 dB, respectively. Further, about 4 dB gain is obtained by employing double-check method compared to single-check method. From FIG. 26C, the probability of a false alarm with normalized threshold=0.6 at −5 dB is smaller than $2.5 \times 10^{-4}$. The pilot pattern can be used for frame synchronization confirmation since perfect frame synchronization confirmation success with zero false alarm was detected at $E_b/N_0=0$ dB when double-check frame synchronization confirmation method was used.

FIG. 27 is a comparision chart between the embodiments for 15 timeslots and 16 slots. Including the various advantages for L=16, the pilot bit/symbol patterns for L=15 in accordance with the preferred embodiment have additional advantages. By using this property/characteristics of the frame synchronization words, double-check frame synchronization scheme can be obtained. There is significant gain about 4 dB by employing the double-check frame synchronization confirmation method compared to single-check method. However, in the case of 15 slots, the complexity of the correlator circuit is doubled since an auto-correlator for positive peak detection and a cross-correlator for negative peak detection are used.

Since the auto-correlation function of the frame synchronization words of the 15 slots has the lowest out-of-phase coefficient, the single-check frame synchronization confirmation method can also be employed; whereas, in the case of 16 slots, there is some problems due to +4 or −4 out-of-phase coefficients. The pilot patterns of 15 slots is very suitable for frame synchronization confirmation since perfect frame synchronization confirmation success with zero false alarm was detected at $E_b/N_0=0$ dB on uplink DPCH when double-check frame synchronization confirmation method was used. Due to the various advantageous of the preferred embodiment, the pilot bit/symbol patterns of 15 slots have been again accepted by the 3GPP.

STTD Encoding for Downlink

The 3GPP RAN has a description in TS s1.11 v1.1.0 on a downlink physical channel transmit diversity on application of a open loop transmit diversity and a closed loop transmit diversity in different downlink physical channels. The open loop transmit diversity uses STTD encoding based on spatial or temporal block coding. As described above, the present invention suggest new downlink pilot patterns using the STTD encoding into consideration. The STTD encoding is used optionally at the base station and preferably required at the user equipment.

Figure 28A:
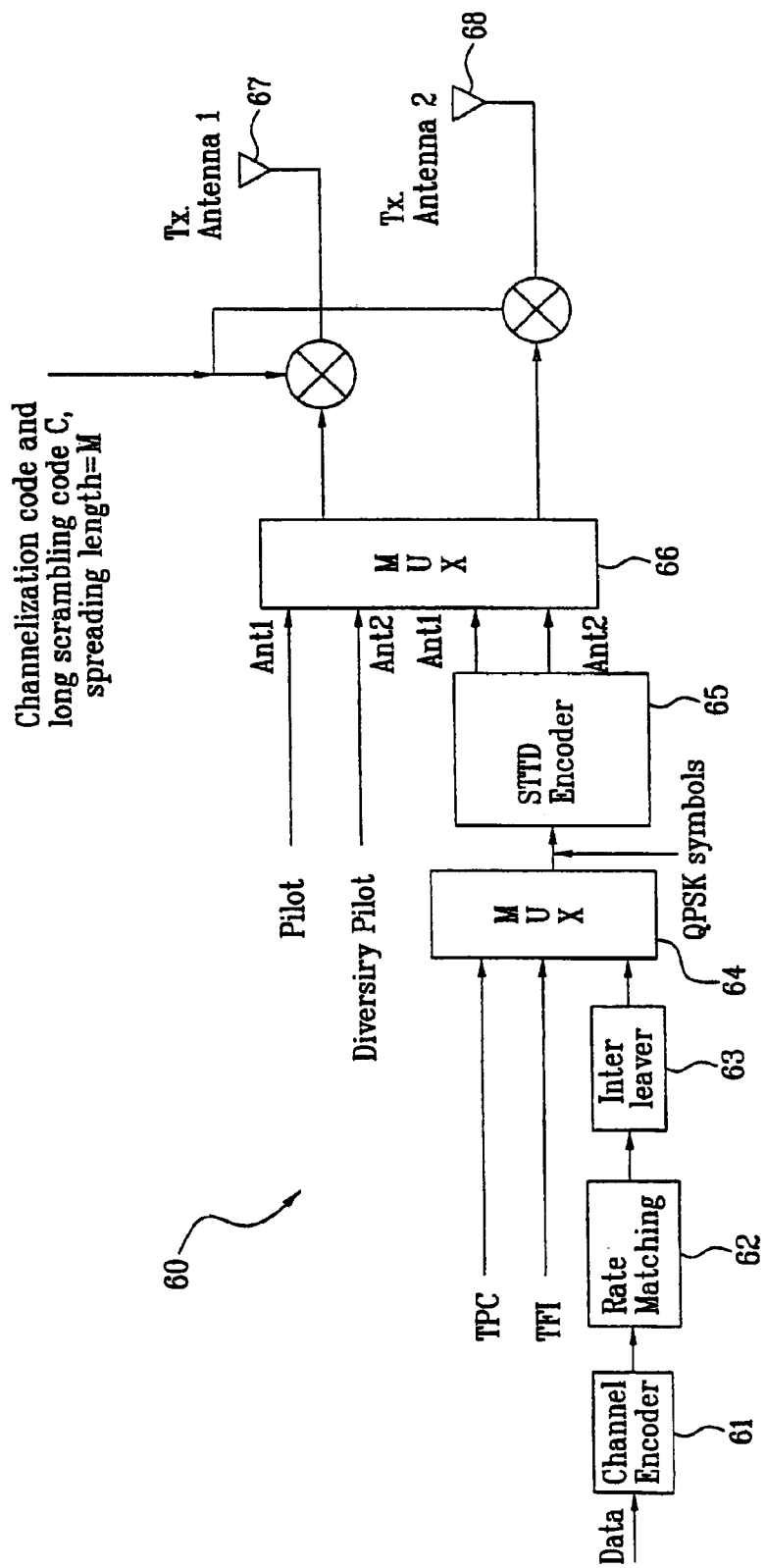
FIG. 28A is a block diagram of an STTD transmitter according to the 3GPP RAN standards.

FIG. 28A illustrates a block diagram of an STTD transmitter 60 according to the 3GPP RAN standards for open loop transmit diversity. A data provided to the STTD transmitter in a non-diversity mode passes through a channel encoder 61 for channel coding, a rate matcher 62 for rate matching, and an interleaver 63 for interleaving, and therefrom to a first multiplexer 64. The multiplexer 64 multiplexes a final interleaved data, a TFCI field, and a TPC field. The STTD encoder 65 provides data patterns to be respectively transmitted through a first transmission antenna 67 and a second transmission antenna 68 to a second multiplexer 66. In other words, the second multiplexer 66 has symbols $S_1$ and $S_2$ by QPSK provided thereto together with symbols $-S_2^*$ and $S_1^*$ produced to be orthogonal to the symbols $S_1$ and $S_2$.

Figure 28B:
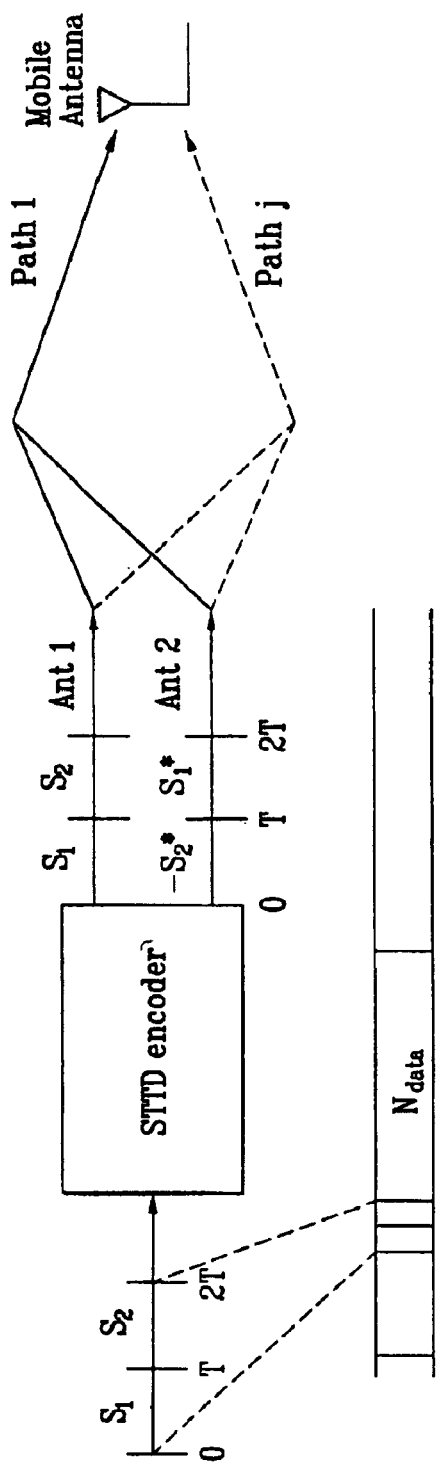
FIG. 28B illustrates an STTD encoding based on the STTD transmitter of FIG. 28A.

FIG. 28B explains an STTD encoding of an STTD transmitter 60 according to the 3 GPP RAN standards. For example, it is assumed that QPSK symbols provided to the STTD encoder 65 is "$S_1$=1 1" in a first symbol period 0 T, and "$S_2$=1 0" in a second symbol period T 2T. The symbols produced to be orthogonal to the QPSK symbols at the STTD encoder 65 is "0 0" in the first symbol period 0 T, and "1 0" in the second symbol period T 2T.

The symbols produced according to the STTD encoding have the following characteristics. The symbols "0 0" produced in the first symbol period 0 T are symbols converted from QPSK symbols $S_2$ in the second symbol period T 2T provided to the STTD encoder 65, and the symbols "1 0" produced in the second symbol period T 2T are symbols converted from the QPSK symbols $S_1$ in the first symbol period 0 T provided to the STTD encoder 65.

The symbols "$-S_2^*$" and "$S_1^*$" are produced in respective symbol periods through shifting, complementary and conversion process according to the STTD encoding. Eventually, since the symbols "$-S_2^*$" and "$S_1^*$=0 0, 1 0" and the QPSK symbols $S_1$ and $S_2$=1 1, 1 0 provided to the STTD encoder 65 have correlation values "0", they are orthogonal to each other.

The STTD encoded pilot symbol patterns of FIG. 19A are orthogonal to the pilot symbol patterns of FIG. 15A and a method for producing the pilot symbol patterns of FIG. 19A by applying the STTD encoding principle to the pilot symbol patterns of FIG. 15A will be explained with reference to FIG. 28B.

The STTD encoding is preferably carried out in units of two symbols as bundles. In other words, if it is assumed that the two symbols are "$S_1$=A+jB" and "$S_2$=C+jD", the STTD encoding is carried out with $S_1$ and $S_2$ tied as a unit. In this instance, "A" and "C" are pilot bits for the I channel branch and "B" and "C" are pilot bits for the Q channel branch. An STTD encoding of "$S_1$ $S_2$" produces "$-S_2^* S_1^*$" (where * denotes a conjugate complex). At the end of the encoding, the STTD encoded two symbols will be "$-S_2^*=-C+jD$" and "$S_1^*=A-jB$".

Specifically, when the symbol rate is 8 ksps ($N_{pilot}=4$) of FIG. 15A, "$S_1=1+j$, $S_2=C_1+jC_2$" of respective symbol #0 and symbol #1 are STTD encoded into "$-S_2^*=-C_1+jC_2$" of symbol #0 and "$S_1^*=1-j0$" of symbol #1. When symbol rate is 16, 32, 64 or 128 ksps ($N_{pilot}=8$) in FIG. 15A, "$S_1=C_1+jC_2$, $S_2=C_3+jC_4$" at symbol #1 and symbol #3 are STTD encoded into "$-S_2^*=-C_3+jC_4$" of symbol #1 and "$S_1^*=C_1-jC_2$" of symbol #3 of FIG. 19A. The non-shaded symbol #0 and symbol #2 in FIG. 19A are made orthogonal to the non-shaded symbol #0 and symbol #2 in FIG. 15A. In other words, "11", "11" in FIG. 15A are made to be "11", "00" in FIG. 19A.

When the symbol rate is 256, 512, 1024 ksps ($N_{pilot}=16$), there are four shaded pilot symbols. Therefore, the pilot symbols are STTD encoded by two shaded symbols, e.g., "$S_1=C_1+jC_2$, $S_2=C_3+jC_4$" of shaded symbol #1 and symbol #3 of FIG. 19A, are STTD encoded into "$-S_2^*=-C_3+jC_4$" of symbol #1 and "$S_1^*=C_1-jC_2$" of symbol #3 of FIG. 19A, and "$S_1=C_5+jC_6$, $S_2=C_7+jC_8$" of a third and a fourth shaded symbol #5 and symbol #7 of FIG. 15A, are STTD encoded into "$-S_2^*=-C_7+jC_8$" of symbol #5 and "$S_1^*=C_5-jC_6$" of symbol #7 of FIG. 19A. The non-shaded symbol #0, symbol #2, symbol #4, and symbol #6 of FIG. 19A, are orthogonal to the non-shaded symbol #0, symbol #2, symbol #4, and symbol #6 of FIG. 15A. That is, "11", "11", "11", "11" of FIG. 15A are made into "11", "00", "11", "00" of FIG. 19A.

The symbols of FIG. 19A which is produced by applying the STTD encoding to the pilot symbol patterns in FIG. 15A have the following characteristics. In FIG. 15A, when the symbol rate is 8 ksps ($N_{pilot}=4$), 16, 32, 64, or 128 ksps ($N_{pilot}=8$), or 256, 512, or 1024 ksps ($N_{pilot}=16$), the shaded column sequences are classed into four PCSP 'E', 'F', 'G' or 'H' starting from the lowest symbol number, and the column sequences comprises words $C_1$, $C_2$, $C_3$, and $C_4$ and $C_5$, $C_6$, $C_7$, and $C_8$ in accordance with the preferred embodiment in an order corresponding to the classes, to express each PCSP as E={$C_1$, $C_5$}, F={$C_2$, $C_6$}, G={$C_3$, $C_7$}, and H={$C_4$, $C_8$}, as described above. Since the pilot symbol patterns of FIG. 19A are the pilot symbol patterns in FIG. 15A after the STTD encoding, when the symbol rate is 256, 512, or 1024 ksps ($N_{pilot}$=16), the column sequences are arranged in "$-C_3$, $C_4$, $C_1$, and $-C_2$" and "$-C_7$, $C_8$, $C_5$, $-C_6$" when the shaded column sequences are classed in 'E', 'F', 'G' and 'H' starting from the lowest symbol number. Hence, E={$-C_3$, $-C_7$}, F={$C_4$, $C_8$}, G={$C_1$, $C_5$}, and H={$-C_2$, $-C_6$}. Compare FIGS. 15B and 19B.

As per the non-shaded pilot symbol patterns, when each slot has 4 pilot bits, "10" is allocated to all slots of symbol #1. When each slot has 8 pilot bits, "11" is allocated to all slots of symbol #0, and "00" to all slots of symbol #2. When each slot has 16 pilot bits, "11" is allocated to all slots of symbol #0, "00" to all slots of slot #2, "11" is allocated to all slots of symbol #4, and "00" to all slots of symbol #6. Accordingly, cross correlation of the non-shaded symbols of FIG. 19A, i.e., the column sequences having "10($N_{pilot}$=4 bits)", "11($N_{pilot}$=8 bits and $N_{pilot}$=16 bits)", or "00($N_{pilot}$=8 bits and $N_{pilot}$=16 bits)", with the shaded column sequences have values "0" for all time shifts "τ". Further, when a slot has 4, 8, or 16 pilot bits, the present invention arranges the pilot symbol patterns such that a cross correlation of a word of I channel branch and a word of a Q channel branch in every symbol number is "0" at a time shift "τ=0".

The above description of STTD encoding is readily applicable to downlink PCCPCH (compare FIGS. 16A and 19C) and downlink Secondary CCPCH (compare FIGS. 16C and 19E) for 16 slots. Further, the STTD encoding is readily applicable to downlink DPCH (compare FIGS. 24A and 24C) and downlink SCCPCH (compare FIGS. 25A and 25C) for 15 slots. Frame Synchronization Confirmation and Establishment There are generally two types of synchronizations, i.e., frame synchronization and chip synchronization. In frame synchronization, one frame includes 15 or 16 slots, as described above. To confirm frame synchronization, the user equipment or base station transmits frame synchronization word, e.g., pilot patterns of the preferred embodiment, and the period for synchronization is one frame. In chip synchronization, a scrambling code comprises chips, and chip synchronization indicates synchronization of the scrambling code, where chip is a smaller unit of signal than data symbol. Generally, multiple chips comprise one symbol. Since the minimum unit of data is a symbol, chip by itself does not contain any information, but scrambling code used to scramble the data symbols.

There are two types of scrambling codes, i.e., a short scrambling code with a duration of one symbol and a long scrambling code with a duration of one frame. When a long scrambling code is used, frame synchronization is equivalent to chip synchronization, i.e, when there is frame synchronization, there is chip synchronization or vice versa. As for short scrambling code, frame synchronization is not equivalent to chip synchronization since there can be chip synchronization without frame synchronization. However, when frame synchronization is accomplished, there is also chip synchronization for short scrambling code. In the preferred embodiment, either short or long scrambling code can be used in the uplink, and long scrambling code is used for the downlink. The chip or frame synchronization can be accomplished using a correlator, described above, or matched filter, described in co-pending application Ser. Nos. 09/373,703; 09/376,373; 09/525,444; 09/525,447 and 09/535,448, in a user terminal or a base station.

Figure 29:
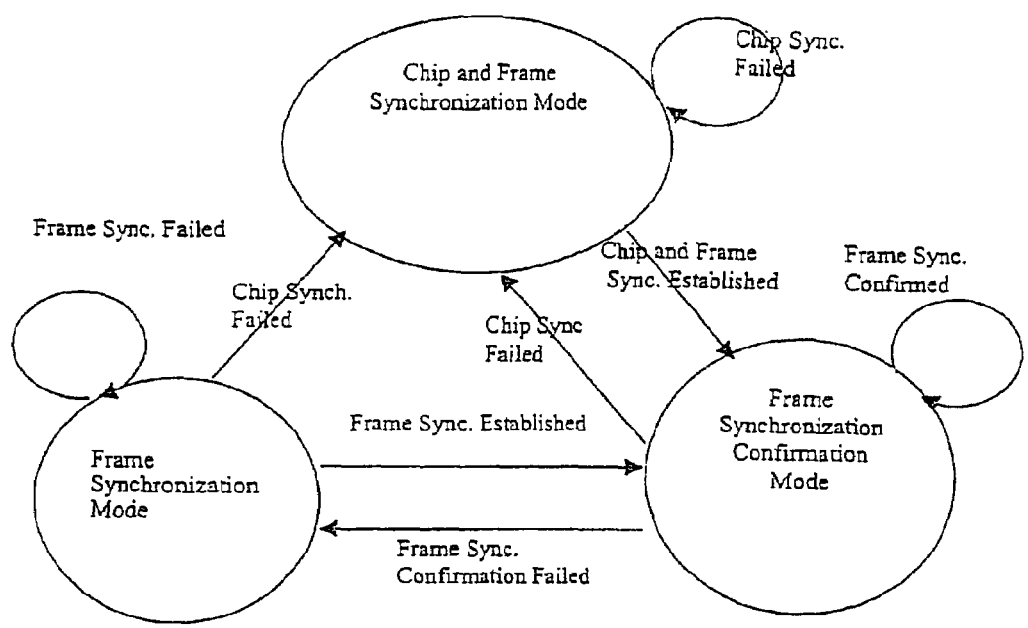
FIG. 29 illustrates the procedures for confirming and establishing frame synchronization of an uplink channel using short scrambling code.

FIG. 29 illustrates the procedures for confirming and establishing frame synchronization of an uplink channel using short scrambling code. As shown therein, the network side, e.g., base station, operates in three modes, i.e., frame synchronization confirmation (FSC) mode, frame synchronization (FS) mode, and chip and frame synchronization (CFS) mode, depending on frame synchronization and/or chip synchronization.

In the FSC mode, the network side uses the frame synchronization words, described above for L=15 and L=16, to confirm frame synchronization. If the frame synchronization is established but chip synchronization becomes out-of-phase, i.e., chip synchronization fails, the network side goes to the CFS mode.

During the CFS mode, the network side uses the frame synchronization words to check the chip synchronization failure. In a case of initial power-on time of the user equipment, the network side uses the frame offset information and/or slot offset information from the user equipment to establish the frame synchronization and chip synchronization in the CFS mode. Once both chip and frame synchronizations are established, the network side goes to the FSC mode.

If the chip synchronization is established and the frame synchronization words become out-of-phase during the FSC mode, resulting in frame synchronization being not established, the network side goes to FS mode and checks the failure of the frame synchronization until frame synchronization is established using the frame synchronization words of the pilot pattern. Upon establishment of the frame synchronization, the network side goes to the FSC mode. However, if the chip synchronization fails during the FS mode, the network side goes to the CFS mode, as described above.

Figure 30:
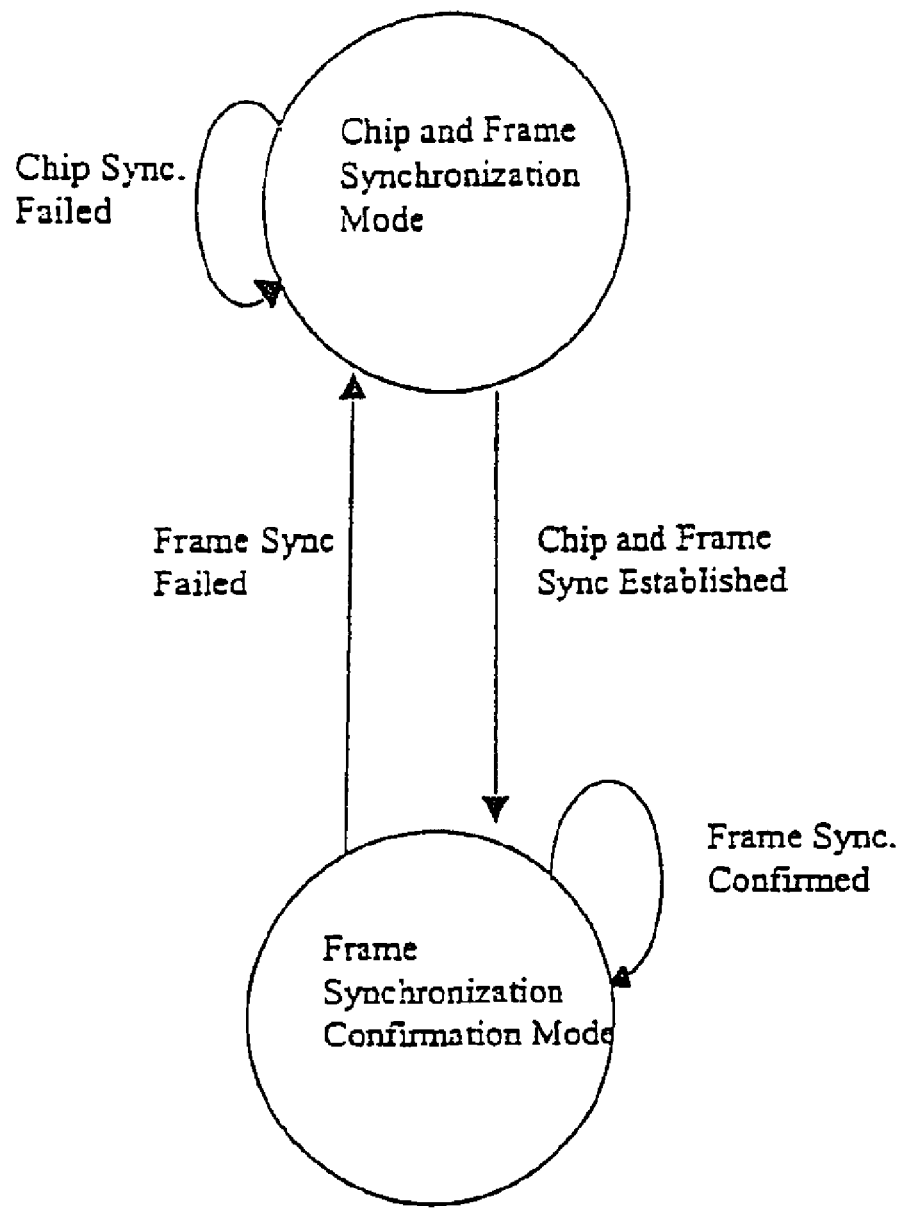
FIG. 30 illustrates the procedures for confirming and establishing frame synchronization of a downlink or an uplink channel using long scrambling code.

FIG. 30 illustrates the procedures for confirming and establishing frame synchronization of a downlink channel using long scrambling code. As discussed above, frame synchronization is equivalent to chip synchronization, i.e, when there is frame synchronization, there is chip synchronization or vice versa, when long scrambling code is used. Hence, the user equipment operates in either chip and frame synchronization (CFS) mode or frame synchronization confirmation (FSC) mode.

In the FSC mode, the user equipment confirms frame synchronization using the frame synchronization symbols of the pilot signal. When the frame synchronization symbol goes out-of-phase, both frame synchronization and chip synchronization goes out- of-phase, and the user equipment goes to the CFS mode. In the CFS mode, the frame synchronization symbols are used to establish chip synchronization, which leads to frame synchronization. Upon chip and frame synchronization, the user equipment goes to FSC mode. During the initial power-on time of the user equipment, the user equipment uses the timing of a primary CCPCH, frame offset information and/or slot offset information, which is received from the network side, to establish the chip synchronization.

As described above, long scrambling code can be also used for the uplink. In such a case, the above procedure for downlink is readily applicable to the network side.

The above procedures are readily applicable to two cases. In the first case, there exists no uplink DPCCH/DPDCH which corresponds to the case when a dedicated physical channel is initially set up on a frequency. In the second case, there already exists DPCCH/DPDCH in the uplink and a corresponding dedicated physical channel needs to be set up in the downlink which corresponds to the case when a new cell has been added to the active set in soft handover and needs the downlink transmission.

FIG. 31A illustrates an outline of the synchronization establishment procedures of the dedicated physical channel when there exists no uplink DPCCH/DPDCH. The procedures are as follows:

A1) The user equipment UE starts the downlink synchronization establishment process.

B1) The network starts the transmission of downlink channels. The TPC commands transmitted by the network follows a predetermined pattern. The DPDCH is preferably transmitted only when there is data to be transmitted to the UE.

A2) The UE establishes downlink chip synchronization and frame synchronization based on the Primary CCPCH synchronization timing and the frame offset group, slot offset group notified from the network. The frame synchronization could be confirmed using the frame synchronization word. The success of the frame synchronization confirmation is determined when the successive SR frame synchronization is confirmed. Otherwise, the frame synchronization confirmation failure is determined.

B2) The network starts the uplink synchronization establishment process.

A3) The synchronization status information is reported to the upper layer.

A4) The UE starts the transmission of uplink channels at the frame timing delayed by the slot offset from the downlink channel. The DPDCH is preferably transmitted only when there is data to be transmitted to the network. The transmission power of uplink channels follows the TPC commands transmitted by the network. TPC commands transmitted by the UE are based on downlink SIR measurements.

B3) The network establishes uplink channel chip synchronization and frame synchronization based on the frame offset group and slot offset group. Frame synchronization could be confirmed using the frame synchronization word. The success of the frame synchronization confirmation is determined when the successive SR frame synchronization is confirmed. Otherwise, the frame synchronization confirmation failure is determined.

B4) The transmission power of the downlink channels follow the TPC commands transmitted by the UE.

B5) The synchronization status information is reported to the upper layer.

As described above, the uplink synchronization B2 and B3 are established using the procedures of FIG. 29 when short scrambling code is used. The uplink and downlink procedures B2, B3, A1 and A2 are established using the procedures of FIG. 30 when long scrambling code is used.

Figure 31B:
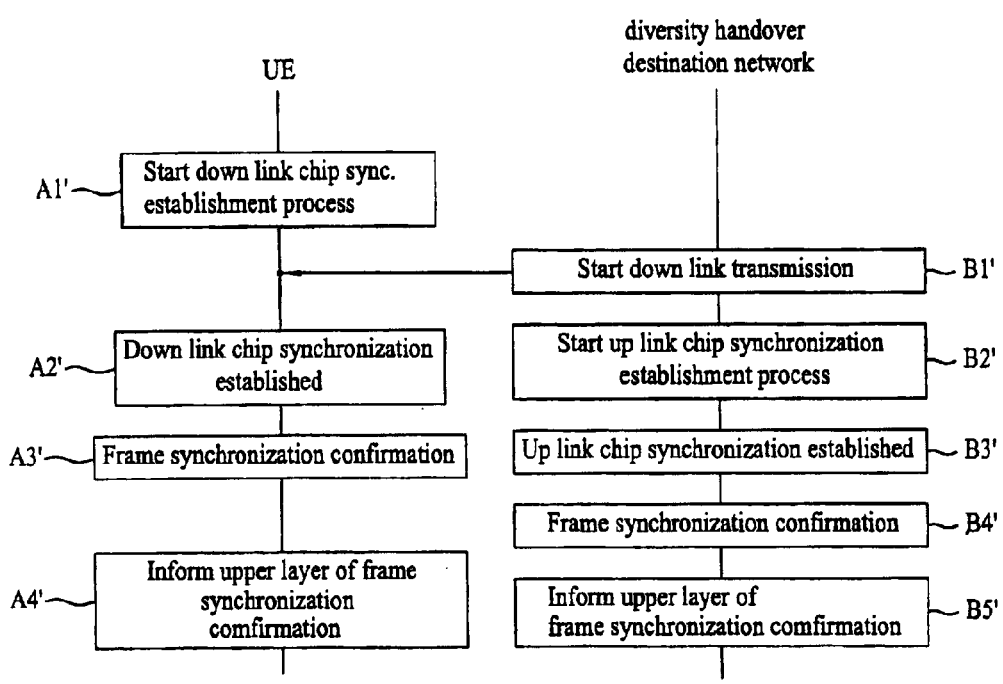
FIG. 31B illustrates an outline of the synchronization establishment procedures of the dedicated physical channel when there already exists DPCCH/DPDCH in the uplink and a corresponding dedicated physical channel needs to be set up in the downlink, i.e., the synchronization establishment flow upon intra/inter-cell diversity handover.

FIG. 31B illustrates an outline of the synchronization establishment procedures of the dedicated physical channel when there already exists DPCCH/DPDCH in the uplink and a corresponding dedicated physical channel needs to be set up in the downlink, i.e., the synchronization establishment flow upon intra/inter-cell diversity handover. At the start of diversity handover, the uplink dedicated physical channel transmitted by the UE, and the downlink dedicated physical channel transmitted by the diversity handover source node B will have their radio frame number and scrambling code phase counted up continuously as usual, and they will not change. The procedures are as follows:

A1') The UE starts the chip synchronization establishment process of downlink channels from the handover destination. The uplink channels being transmitted will preferably continue transmission without any operations performed.

B1'–B$_5$') The network starts the transmission of downlink dedicated physical channels and starts the synchronization establishment process of uplink dedicated physical channel transmitted by the UE. Frame synchronization could be confirmed using the frame synchronization word. The success of the frame synchronization confirmation is determined when the successive SR frame synchronization is confirmed. Otherwise, the frame synchronization confirmation failure is determined. Then after, the synchronization status information is reported to the upper layer.

A2'–A4') Based on the handover destination Primary CCPCH reception timing, the UE establishes chip synchronisation of downlink channels from handover destination node B. Frame synchronization could be confirmed using the frame synchronization word. The success of the frame synchronization confirmation is determined when the successive $S_R$ frame synchronization is confirmed. Otherwise, the frame synchronization confirmation failure is determined. Thereafter, synchronization status information is reported to the upper layer.

As described above, the uplink synchronization steps B2'–B4' are established using the procedures of FIG. 29 when short scrambling code is used. The uplink and downlink procedures B2'–B4" and A1'–A3' are established using the procedures of FIG. 30 when long scrambling code is used.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A communication device, comprising:
   means for establishing frame synchronization for at least one of a radio link or a channel; and
   means for generating at least one frame synchronization word, said at least one word comprises at least one of the following pilot bit pattern, each bit of each pilot bit pattern being provided within a corresponding slot of a frame having 15 slots:

| Slot No | 1 2 3 4 ... 15 |
|---|---|
| Pilot bit pattern 1 = | (1 0 0 0 1 1 1 1 0 1 0 1 1 0 0) |
| Pilot bit pattern 2 = | (1 0 1 0 0 1 1 0 1 1 1 1 0 0 0 0) |
| Pilot bit pattern 3 = | (1 1 0 0 0 1 0 0 1 1 0 1 0 1 1) |
| Pilot bit pattern 4 = | (0 0 1 0 1 0 0 0 0 1 1 1 0 1 1) |
| Pilot bit pattern 5 = | (1 1 1 0 1 0 1 1 0 0 1 0 0 0 1) |
| Pilot bit pattern 6 = | (1 1 0 1 1 1 0 0 0 0 1 0 1 0 0) |
| Pilot bit pattern 7 = | (1 0 0 1 1 0 1 0 1 1 1 1 0 0 0) |
| Pilot bit pattern 8 = | (0 0 0 0 1 1 1 0 1 1 0 0 1 0 1) | wherein the at least one synchronization word has maximum correlation results of opposite polarities at time shifts of zero and seven of a correlation period.

2. The communication device of claim 1, wherein the maximum correlation result at time shift of zero is a result of autocorrelation.

3. The communication device of claim 2, wherein the maximum correlation result at time shift of seven is a result of cross-correlation.

4. The communication device of claim 1, wherein the at least one frame synchronization word allows confirmation of frame synchronization.

5. The communication device of claim 1, further comprising means for transmitting the at least one frame synchronization word within the frame of a dedicated physical control channel.

6. The communication device of claim 1, wherein a correlation result is the same at time shift of 15 as time shift of 0.

7. The communication device of claim 1, further comprising means for establishing chip synchronization for at least one of the radio link or the channel.

8. The communication device of claim 1 or 7, wherein the establishing means establishes at least one of chip or frame synchronization using offset information of a common control physical channel.

* * * * *

UNITED STATES PATENT AND TRADEMARK OFFICE
CERTIFICATE OF CORRECTION

PATENT NO. : 7,012,906 B1 Page 1 of 1
APPLICATION NO. : 09/525446
DATED : March 14, 2006
INVENTOR(S) : Young-Joon Song It is certified that error appears in the above-identified patent and that said Letters Patent is hereby corrected as shown below:

Title page, Items (63) and (60), should read:

-- (63)      Related U.S. Application Data

This application is a Continuation-in-part application No. No. 09/373,703, filed on Aug. 13, 1999, now Pat. No. 6,791,960, and a continuation-in-part of application No. 09/376,373, filed on Aug. 18, 1999, now Patent No. 6,721,299, and this application is also a continuation-in-part of application Nos. 09/525,444, 09/525,447, and 09/525,448 all filed on March 14, 2000.

(60)     Provisional application No. 60/136,763, filed on May 28, 1999. --.

Signed and Sealed this

Fourth Day of July, 2006

JON W. DUDAS
*Director of the United States Patent and Trademark Office*